(12) United States Patent
Kotake et al.

(10) Patent No.: US 11,296,789 B2
(45) Date of Patent: Apr. 5, 2022

(54) OPTICAL RECEIVER AND OPTICAL SPACE COMMUNICATION SYSTEM

(71) Applicants: NEC Corporation, Tokyo (JP); NEC Space Technologies, Ltd., Fuchu (JP)

(72) Inventors: Hideaki Kotake, Tokyo (JP); Yoichi Hashimoto, Tokyo (JP); Seiichirou Miyaki, Tokyo (JP); Kazushi Kondo, Tokyo (JP)

(73) Assignees: NEC CORPORATION, Tokyo (JP); NEC Space Technologies, Ltd., Tokyo (JP)

( * ) Notice: Subject to any disclaimer, the term of this patent is extended or adjusted under 35 U.S.C. 154(b) by 0 days.

(21) Appl. No.: 17/296,034

(22) PCT Filed: Nov. 22, 2019

(86) PCT No.: PCT/JP2019/045840
§ 371 (c)(1),
(2) Date: May 21, 2021

(87) PCT Pub. No.: WO2020/110956
PCT Pub. Date: Jun. 4, 2020

(65) Prior Publication Data
US 2022/0021451 A1    Jan. 20, 2022

(30) Foreign Application Priority Data

Nov. 29, 2018   (JP) .............................. JP2018-223133

(51) Int. Cl.
*H04B 10/118*   (2013.01)
*H04B 10/61*    (2013.01)
(52) U.S. Cl.
CPC ......... *H04B 10/118* (2013.01); *H04B 10/612* (2013.01); *H04B 10/613* (2013.01)

(58) Field of Classification Search
CPC ... H04B 10/118; H04B 10/612; H04B 10/613
(Continued)

(56) References Cited

U.S. PATENT DOCUMENTS

| 5,359,412 | A  | * | 10/1994 | Schulz | ................... | H04B 10/67 |
|---|---|---|---|---|---|---|
| | | | | | | 250/227.19 |
| 6,271,959 | B1 | * | 8/2001 | Kim | ....................... | H04B 10/67 |
| | | | | | | 356/477 |

(Continued)

FOREIGN PATENT DOCUMENTS

| EP | 0967743 A2 | 12/1999 |
|---|---|---|
| EP | 1672311 A1 | 6/2006 |

(Continued)

OTHER PUBLICATIONS

International Search Report of PCT Application No. PCT/JP2019/045840 dated Feb. 4, 2020.

(Continued)

*Primary Examiner* — Abbas H Alagheband
(74) *Attorney, Agent, or Firm* — Sughrue Mion, PLLC

(57) ABSTRACT

To provide a technology in which a differential phase modulation manner can be applied to a space environment for satellite mounting, the optical receiver 10 includes a digital signal processing unit has: a level fluctuation frequency suppression unit 320 which suppresses a level fluctuation frequency component of the peak signal; an optical delay interference control unit 330 which generates an optical delay interference control signal, which is overdrive-amplified, on the basis of the peak signal of which the level fluctuation frequency component is suppressed and applies the generated optical delay interference control signal to the optical delay interferometer 210; and a data recovery unit 310 which recovers output data on the basis of the main signal from the wideband balanced optical detector 240.

14 Claims, 34 Drawing Sheets

(58) Field of Classification Search
USPC .......................................................... 398/121
See application file for complete search history.

(56) References Cited

U.S. PATENT DOCUMENTS

| | | | | |
|---|---|---|---|---|
| 6,807,321 | B2* | 10/2004 | Madsen | G02B 6/278 |
| | | | | 385/11 |
| 7,324,713 | B2* | 1/2008 | Jang | H04B 10/677 |
| | | | | 385/1 |
| 7,734,194 | B2* | 6/2010 | Yonenaga | H04B 10/58 |
| | | | | 398/208 |
| 8,165,473 | B2* | 4/2012 | Kagawa | H04B 10/5053 |
| | | | | 398/183 |
| 2005/0088659 | A1* | 4/2005 | Schlenk | H04B 10/676 |
| | | | | 356/477 |
| 2006/0133712 | A1* | 6/2006 | Jang | H04B 10/677 |
| | | | | 385/1 |
| 2007/0047954 | A1 | 3/2007 | Mamyshev | |
| 2007/0047964 | A1 | 3/2007 | Ooi et al. | |
| 2007/0216988 | A1 | 9/2007 | Caplan | |
| 2009/0034967 | A1* | 2/2009 | Tao | H04B 10/677 |
| | | | | 398/33 |
| 2010/0284703 | A1* | 11/2010 | Suzuki | H04B 10/6933 |
| | | | | 398/212 |

FOREIGN PATENT DOCUMENTS

| | | |
|---|---|---|
| JP | 2007020138 A | 1/2007 |
| JP | 5339088 B2 | 11/2013 |
| WO | 2012/171383 A1 | 12/2012 |

OTHER PUBLICATIONS

D. O. Caplan et al., "Multi-rate DPSK Optical Transceivers for Free-Space Applications", Proceedings of SPIE, Free-Space Laser Communication and Atmospheric Propagation XXVI, Feb. 2-4, 2014, San Francisco, California, United States, vol. 8971, 2014, pp. 89710K-1-89710K-13.

H. G. Rao et al., "Electronics Design of a Multi-Rate DPSK Modem for Free-Space Optical Communications", Proceedings of SPIE, Free-Space Laser Communication and Atmospheric Propagation XXVI, Feb. 2-4, 2014, San Francisco, California, United States, vol. 8971, 2014, pp. 89710Y-1-89710Y-16

English translation of Written opinion for PCT Application No. PCT/JP2019/045840 dated Feb. 4, 2020.

Extended European Search Report for EP Application No. 19889275.4 dated Dec. 23, 2021.

\* cited by examiner

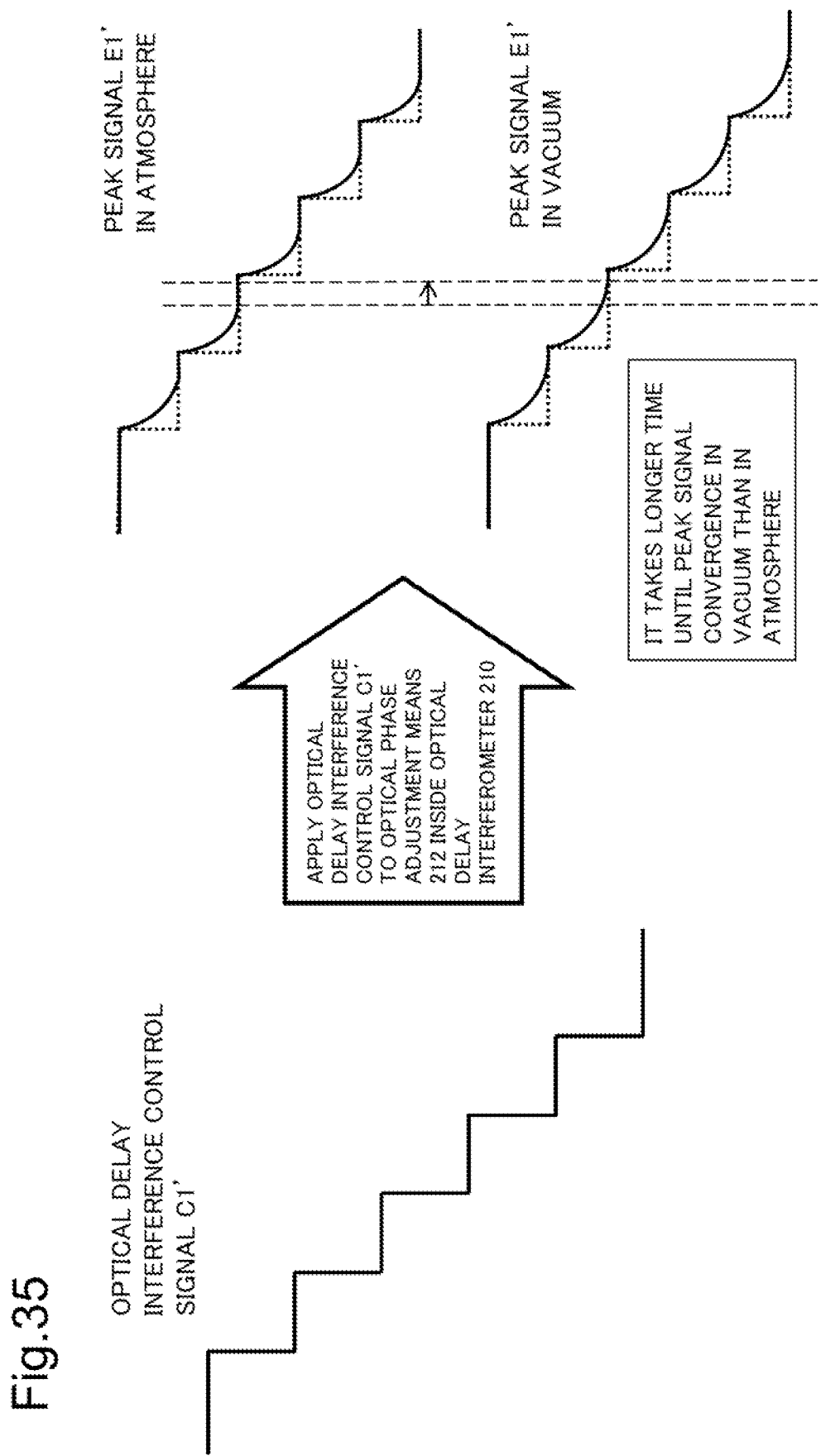

OPTICAL RECEIVER AND OPTICAL SPACE COMMUNICATION SYSTEM

This application is a National Stage Entry of PCT/JP2019/045840 filed on Nov. 22, 2019, which claims priority from Japanese Patent Application 2018-223133 filed on Nov. 29, 2018, the contents of all of which are incorporated herein by reference, in their entirety.

TECHNICAL FIELD

The present invention relates to an optical receiver and an optical space communication system, and particularly relates to an optical receiver and an optical space communication system that receive an optical phase modulation signal and are equipped with a satellite.

BACKGROUND ART

In recent years, needs for an increase in capacity of satellite communication have been increasing due to an increase in observation data of an earth observation satellite, and a broadband satellite communication service being found in a high throughput satellite and the like. As a technique for responding to the needs, an expectation on an optical space communication technique (inter-satellite optical communication technique, ground-satellite optical communication technique) for satellite mounting has been increasing.

In order to achieve the optical space communication for satellite mounting, an acquisition and tracking device for a propagating light beam, an optical amplifier, and an optical transceiver are required. Particularly, in order to establish communication at a distance of tens of thousands of kilometers, a high-sensitivity optical transceiver needs to be used. As seen in NPLs 1 and 2, a differential binary phase modulation/demodulation (DPSK: differential phase shift keying) method has been used as a modulation/demodulation method of such an optical transceiver. By using the differential binary phase modulation/demodulation method, higher sensitivity can be achieved than an intensity modulation/direct detection (IM/DD) method that has been used for satellite mounting.

Further, PTL 1 discloses an optical reception circuit of a differential phase modulation/demodulation method. The optical reception circuit in PTL 1 includes a one-bit delay interferometer, a differential amplifier in which two photodiodes are connected to two respective inputs, and two emitter followers or source follower circuits connected to two respective outputs of the differential amplifier. Further, in the optical reception circuit disclosed in PTL 1, one pair of optical signals having a differential phase being modulated is input to the one-bit delay interferometer, and the one-bit delay interferometer includes a one-bit delay element in one of a pair of waveguides, and outputs, to each of two photodiodes, one pair of two optical signals according to a phase difference between bits adjacent to each other. A difference between two input signals is output and demodulated in the differential amplifier, and a demodulation signal of a normal phase and a reversed phase being demodulated is output.

CITATION LIST

Patent Literature

[PTL 1] Japanese Patent No. 5339088

Non Patent Literature

[NPL 1] D. O. Caplan, et al, "Multi-rate DPSK Optical Transceivers for Free-Space Applications", SPIE Photonics West LASE, 89710K, 2014

[NPL 2] H. G. Rao, et al, "Electronics Design of a Multi-Rate DPSK Modem for Free-Space Optical Communications", SPIE Photonics West LASE, 89710Y, 2014

SUMMARY OF INVENTION

Technical Problem

However, in the configuration of the one-bit delay interferometer described above, when an environmental temperature fluctuates, a delay amount between one pair of optical signals output from the one-bit delay interferometer fluctuates, and thus there is a risk that a peak of a differential signal thereof may decrease. Temperature control is performed on the one-bit delay interferometer in a space environment, but a heat transmission characteristic from a heater to the one-bit delay interferometer in a vacuum environment becomes poorer than that in an environment in an atmosphere, and thus it takes a long time until a temperature converges. Thus, there is a risk that a peak of a differential signal of one pair of optical signals output from the one-bit delay interferometer may decrease in a space environment, and demodulation may become unstable. In this way, it is difficult to apply a differential phase modulation/demodulation method to a space environment for satellite mounting in the space environment.

An object of the present invention is to provide, in an optical receiver of a differential phase modulation/demodulation method and an optical space communication system, a technique being able to suppress a peak fluctuation of a differential signal of adjacent bits, and apply the differential phase modulation/demodulation method to a space environment for satellite mounting.

Solution to Problem

An optical receiver according to the present invention is an optical receiver that receives an optical phase modulation signal, and includes: a differential light detection unit including an optical delay interferometer that outputs a first optical signal and a second optical signal interfering with each other by controlling, to one bit, a delay between two optical signals acquired by splitting the optical phase modulation signal, a first optical detector that performs differential light detection on the first optical signal and the second optical signal, and outputs a first main signal, and a peak signal detection unit that outputs a peak signal indicating intensity of differential light of the first optical signal and the second optical signal; and a digital signal processing unit including a level fluctuation frequency suppression unit that suppresses a level fluctuation frequency component of the peak signal, an optical delay interference control unit that generates, based on a peak signal having the level fluctuation frequency component being suppressed, an optical delay interference control signal on which overdrive amplification is performed, and applies the generated optical delay interference control signal to the optical delay interferometer, and a data recovery unit that recovers output data, based on the first main signal from the optical detector.

An optical space communication system according to the present invention includes: an optical reception device including the optical receiver described above; and an optical transmission device that transmits the optical phase modulation signal, wherein the optical transmission device includes an optical transmitter that outputs the optical phase modulation signal, and an acquisition and tracking device that performs acquisition and tracking of the optical phase modulation signal, and the optical transmitter includes a digital signal processing unit including a transmission control unit that outputs a laser drive current value causing an optical wavelength that cancels out a Doppler frequency generated on a satellite orbit, a signal generation unit that generates an input signal, based on input data, and a clock generation unit that generates a clock signal, and an optical transmission unit including a laser drive current control unit that performs control of a laser drive current, based on the laser drive current value, a transmission laser unit that outputs laser light by the laser drive current, and an optical modulation unit that performs modulation on the laser light, based on the input signal and the clock signal, and outputs the optical phase modulation signal.

Advantageous Effects of Invention

The present invention is able to, in an optical receiver of a differential phase modulation/demodulation method and an optical space communication system, suppress a peak fluctuation of a differential signal of adjacent bits, and apply the differential phase modulation/demodulation method to a space environment for satellite mounting.

BRIEF DESCRIPTION OF DRAWINGS

FIG. 35 is a diagram illustrating the peak signal E1' in an atmosphere and in a vacuum when the optical delay interference control signal C1' decreasing is applied to the optical phase adjustment unit inside the optical delay interferometer in the comparison example

EXAMPLE EMBODIMENT

First Example Embodiment

Figure 1:
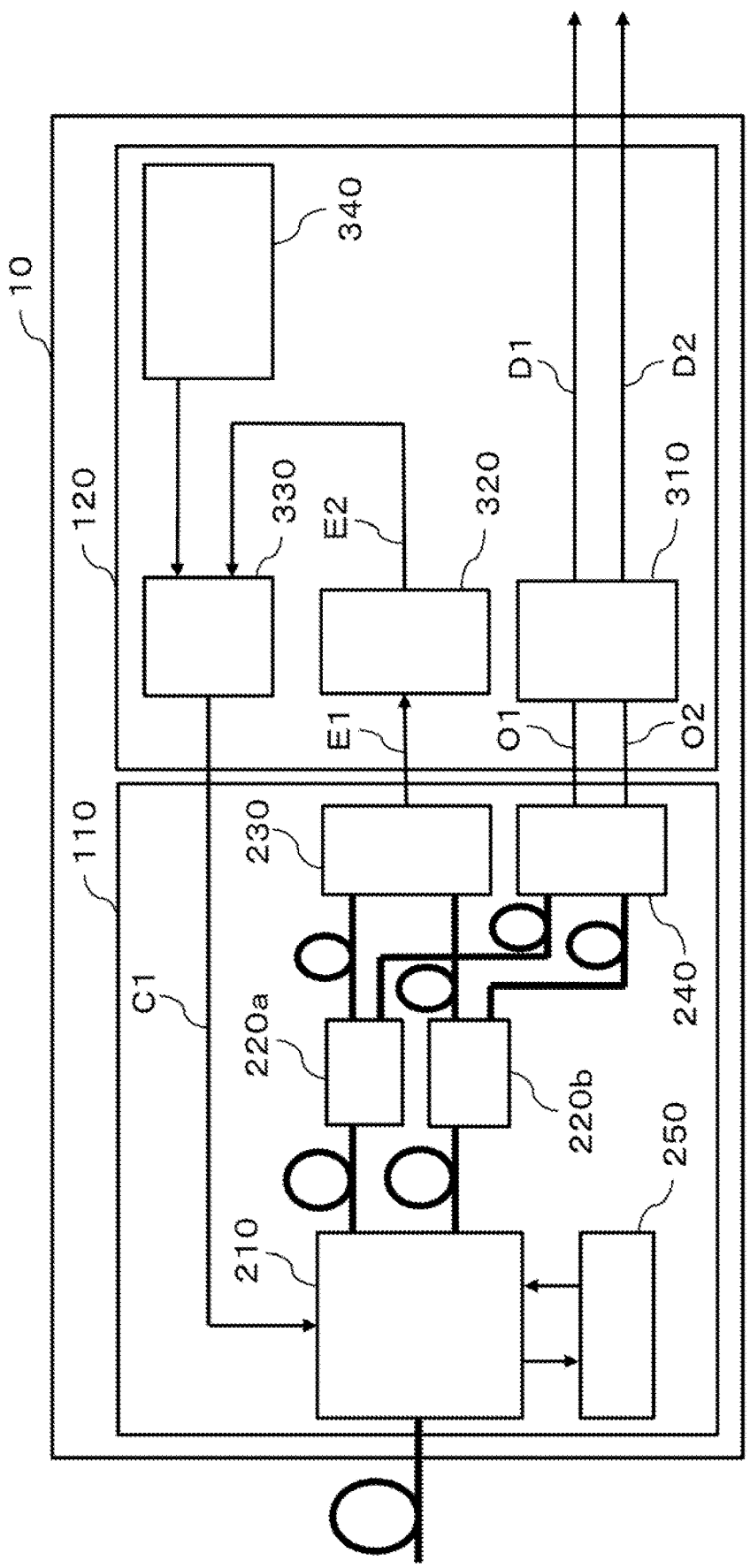
FIG. 1 is a configuration diagram of an optical receiver of a DPSK method according to a first example embodiment.
Figure 2:
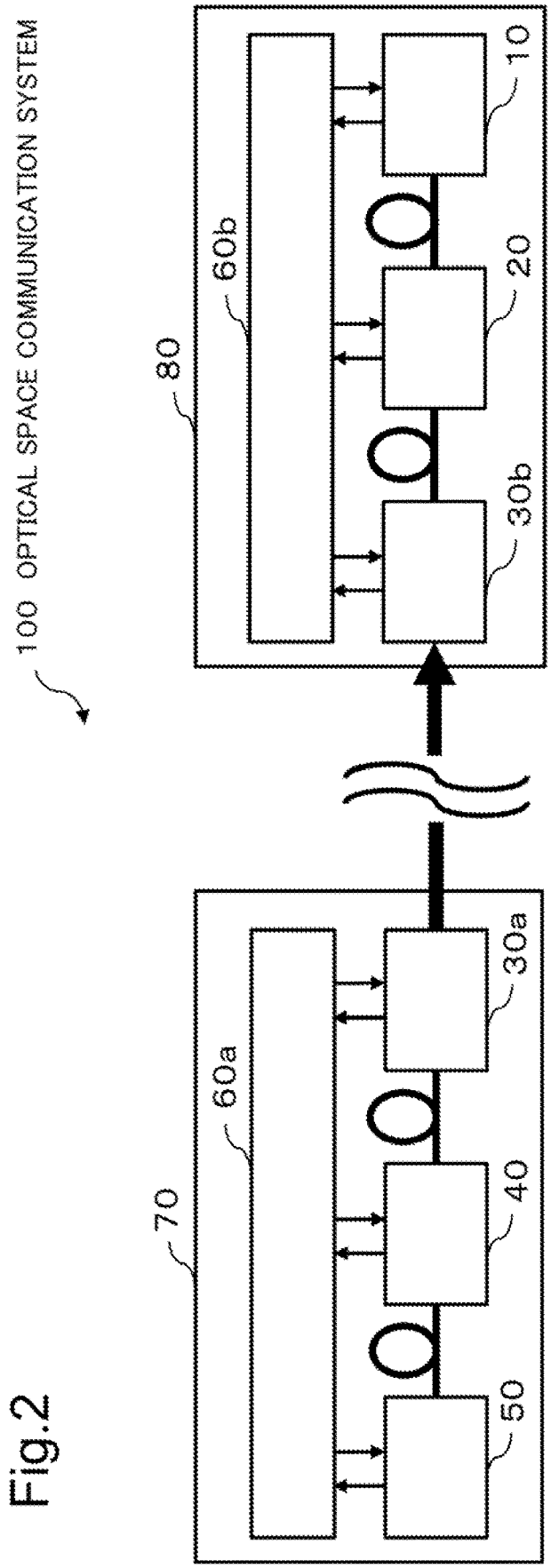
FIG. 2 is a configuration diagram of an optical space communication system according to the first example embodiment.

A first example embodiment of the present invention will be described. FIG. 1 is a configuration diagram of an optical receiver of a DPSK method according to the first example embodiment. Further, FIG. 2 is a configuration diagram of an optical space communication system according to the present example embodiment.

As illustrated in FIG. 1, an optical receiver 10 includes a differential light detection unit 110 and a digital signal processing unit 120. Further, as illustrated in FIG. 2, an optical space communication system 100 according to the first example embodiment includes an optical space communication-optical transmission device 70 and an optical space communication-optical reception device 80. The optical space communication-optical transmission device 70 includes an optical transmitter 50, a high output optical amplifier 40, an optical acquisition and tracking device 30a, and a control device 60a. The optical space communication-optical reception device 80 includes the optical receiver 10 in FIG. 1, a low noise optical amplifier 20, an optical acquisition and tracking device 30b, and a control device 60b.

The high output optical amplifier 40 performs high output amplification on an optical signal output from the optical transmitter 50. The optical signal on which high output amplification is performed is input to the optical acquisition and tracking device 30a. The optical acquisition and tracking device 30a transmits the input optical signal to the optical space communication-optical reception device 80 in such a way that the input optical signal reaches the optical space communication-optical reception device 80 from the optical space communication-optical transmission device 70 through a free space. Further, the control device 60a controls the optical transmitter 50, the high output optical amplifier 40, and the optical acquisition and tracking device 30a by using telemetry command transmission/reception to and from a ground station.

The optical signal input to the optical space communication-optical reception device 80 is input to the optical acquisition and tracking device 30b. The optical signal input to the optical acquisition and tracking device 30b is input to the low noise optical amplifier 20. The low noise optical amplifier 20 performs low noise optical amplification. The optical receiver 10 receives the optical signal on which low noise optical amplification is performed. Further, the control device 60b controls the optical receiver 10, the low noise optical amplifier 20, and the optical acquisition and tracking device 30b by performing transmission/reception on a telemetry command to and from a ground station and using the telemetry command.

Referring back to FIG. 1, a configuration of the optical receiver 10 will be described in detail. An optical phase modulation signal is a binary phase modulation signal (BPSK: binary phase shift keying) of single polarization. The differential light detection unit 110 is a functional unit that detects phase information about an optical phase modulation signal by performing optical delay detection on the optical phase modulation signal. The differential light detection unit 110 includes an optical delay interferometer 210, optical branching units 220a and 220b, a peak signal detection unit 230, a wide-band balanced optical detector 240, and a temperature control unit 250. The digital signal processing unit 120 is a functional unit that performs digital signal processing on main signals O1 and O2 and a peak signal E1. The digital signal processing unit 120 includes a data recovery unit 310, a level fluctuation frequency suppression unit 320, an optical delay interference control unit 330, and an overdrive coefficient setting unit 340.

An optical phase modulation signal input to the optical receiver 10 is input to the differential light detection unit 110. The optical phase modulation signal input to the differential light detection unit 110 is input to the optical delay interferometer 210. The optical delay interferometer 210 causes the optical phase modulation signal to interfere between adjacent bits. Specifically, the optical delay interferometer 210 splits the optical phase modulation signal into two optical signals, controls a delay between the split two optical signals to one bit, and causes the two optical signals to interfere with each other.

Figure 3:
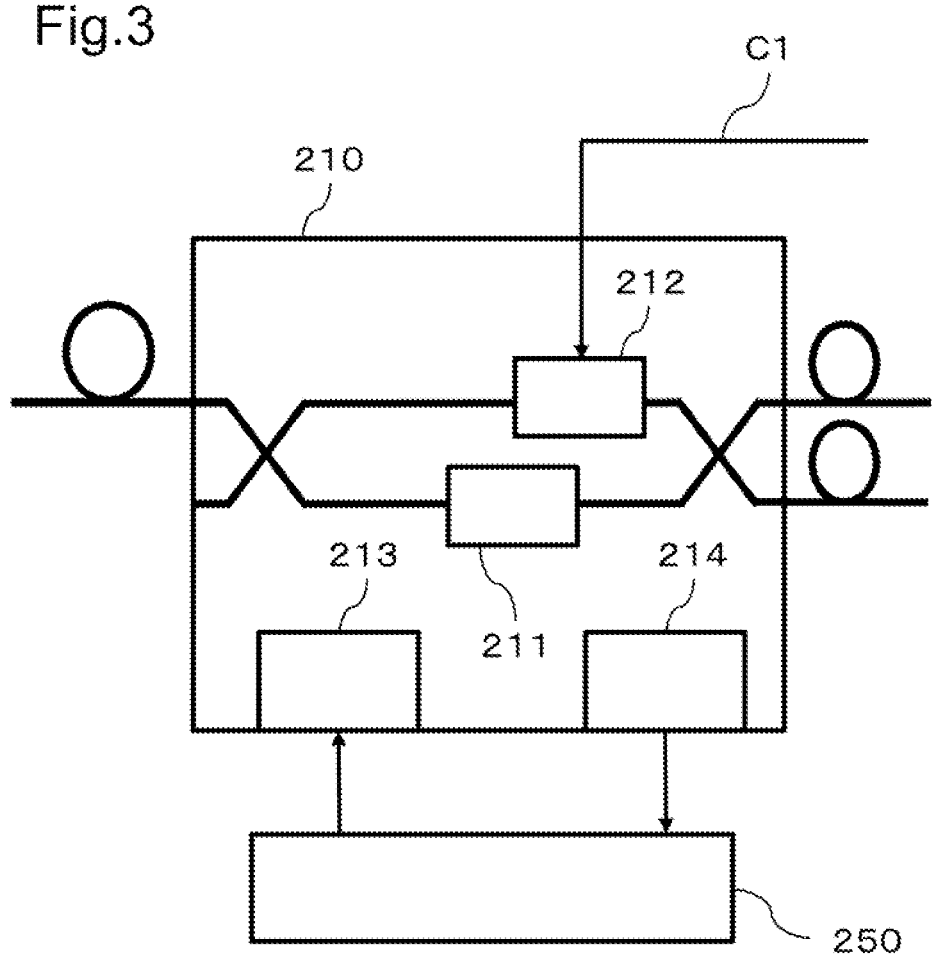
FIG. 3 is one example of a configuration of an optical delay interferometer in FIG. 1.

FIG. 3 is one example of a configuration of the optical delay interferometer in FIG. 1. In FIG. 3, after splitting the optical phase modulation signal into two optical signals, the optical delay interferometer 210 includes an optical delay element 211 that performs an optical delay of one bit on one of waveguides. Further, the optical delay interferometer 210 includes, on another waveguide of a pair of waveguides, an optical phase adjustment unit 212 supplied with a heater and the like. An optical delay interference control signal C1 output from the optical delay interference control unit 330 is input to the optical phase adjustment unit 212, and the heater of the optical phase adjustment unit 212 is controlled by the optical delay interference control signal C1, and thus a delay amount between two optical signals acquired by splitting the optical phase modulation signal into two is adjusted to one bit.

Hereinafter, the adjustment control is also referred to as wavelength tracking. The optical delay interferometer 210 causes the two adjusted optical signals to interfere with each other, and outputs the two optical signals interfering with each other.

Note that, even when a wavelength fluctuation occurs in the optical phase modulation signal, wavelength tracking can be performed in the optical receiver 10 by controlling the heater of the optical phase adjustment unit 212 inside the optical delay interferometer 210 by the optical delay interference control unit 330.

On the other hand, the temperature control unit 250 transmits a control signal for a temperature adjustment to a temperature adjustment element 213 such as a Peltier element. A temperature monitor element 214 transmits a temperature monitor signal to the temperature control unit 250. By the loopback control, control for maintaining a temperature of the optical delay interferometer 210 to be fixed is performed.

As illustrated in FIG. 1, a first optical signal and a second optical signal output from the optical delay interferometer 210 are split by the optical branching unit 220a and the optical branching unit 220b, respectively. One of the optical signals split by the optical branching unit 220a is input to the peak signal detection unit 230. Further, the other optical signal split by the optical branching unit 220a is input to the wide-band balanced optical detector 240. The peak signal detection unit 230 outputs, to the digital signal processing unit 120, the peak signal E1 indicating intensity of differential light of the two optical signals (the first optical signal and the second optical signal) interfering with each other in the optical delay interferometer 210. The wide-band balanced optical detector 240 performs differential light detection on the two optical signals interfering with each other in the optical delay interferometer 210, and outputs the main signals O1 and O2 to the digital signal processing unit 120.

Figure 4:
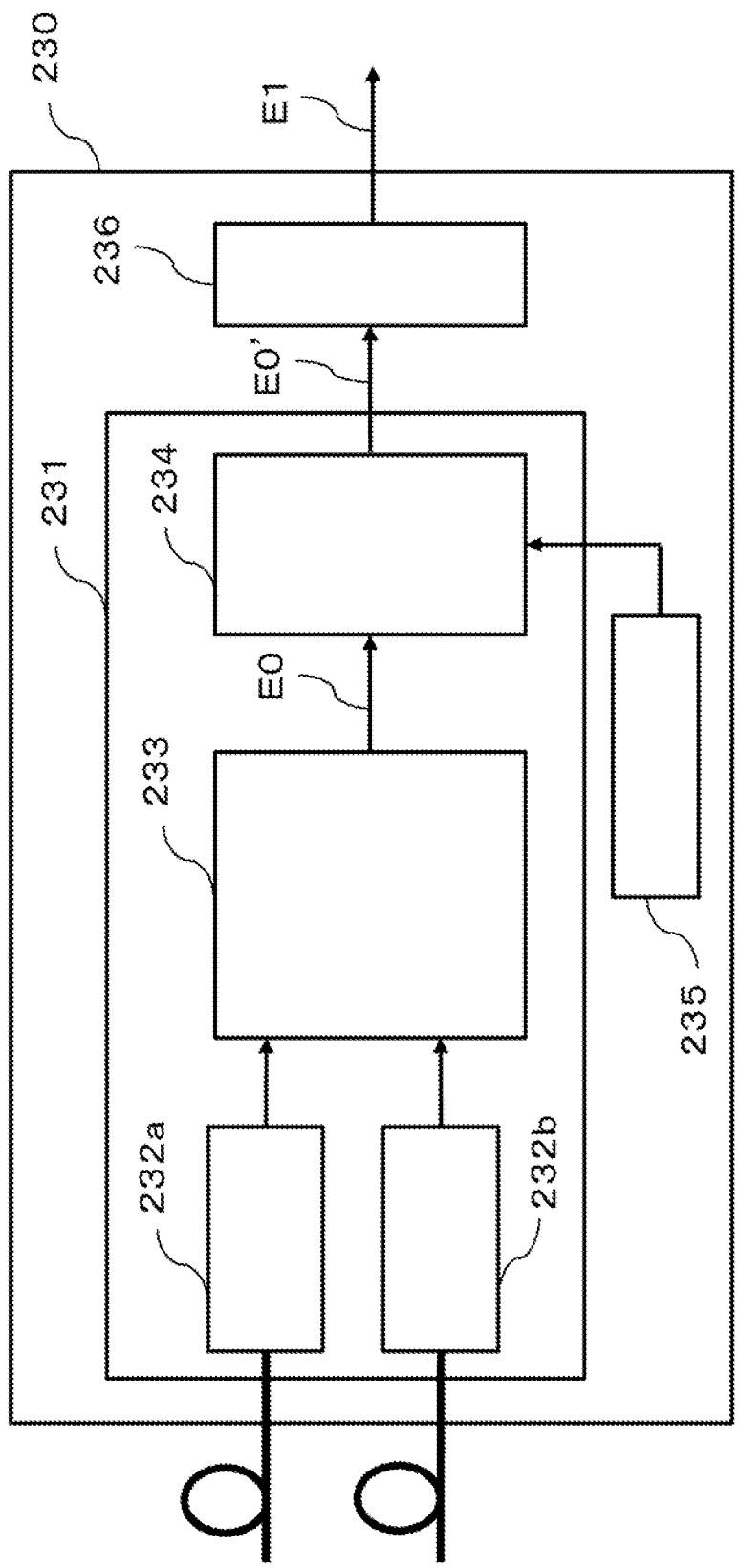
FIG. 4 is a block diagram illustrating a first configuration example of a peak signal detection unit in FIG. 1.

FIG. 4 is a block diagram illustrating a first configuration example of the peak signal detection unit in FIG. 1. As illustrated in FIG. 4, the peak signal detection unit 230 according to the present configuration example includes a balanced optical detector 231, a gain setting unit 235, and an analog-digital converter 236. The balanced optical detector 231 includes photoelectric converters 232a and 232b, a differential detection unit 233, and a signal amplification unit 234.

The two optical signals interfering with each other in the optical delay interferometer 210 are input to the peak signal detection unit 230. The two optical signals input to the peak signal detection unit 230 are input to the balanced optical detector 231, and are each input to the photoelectric converters 232a and 232b. The photoelectric converter 232a and the photoelectric converter 232b perform photoelectric conversion on each of the two input optical signals, and output two electric signals (a first electric signal and a second electric signal) to the differential detection unit 233. The differential detection unit 233 generates a peak signal E0 being a differential signal of the two input electric signals, and outputs the generated peak signal E0 to the signal amplification unit 234. The signal amplification unit 234 is, for example, a transimpedance amplifier. The signal amplification unit 234 amplifies the peak signal E0 by a gain set in the gain setting unit 235. The gain of the signal amplification unit 234 is set to a gain at which a peak signal E0' output from the signal amplification unit 234 changes in a linear region with respect to optical input power of the optical phase modulation signal received by the optical receiver 10 within a range of the optical input power. The peak signal E0' amplified by the signal amplification unit 234 is output to the analog-digital converter 236. The analog-digital converter 236 outputs the peak signal E1 converted into a digital electric signal.

A gain of the signal amplification unit 234 set in the gain setting unit 235 may be stored in advance in a recording device such as a memory, or may be set by a telemetry command transmitted from a ground station via the control device 60.

Figure 5:
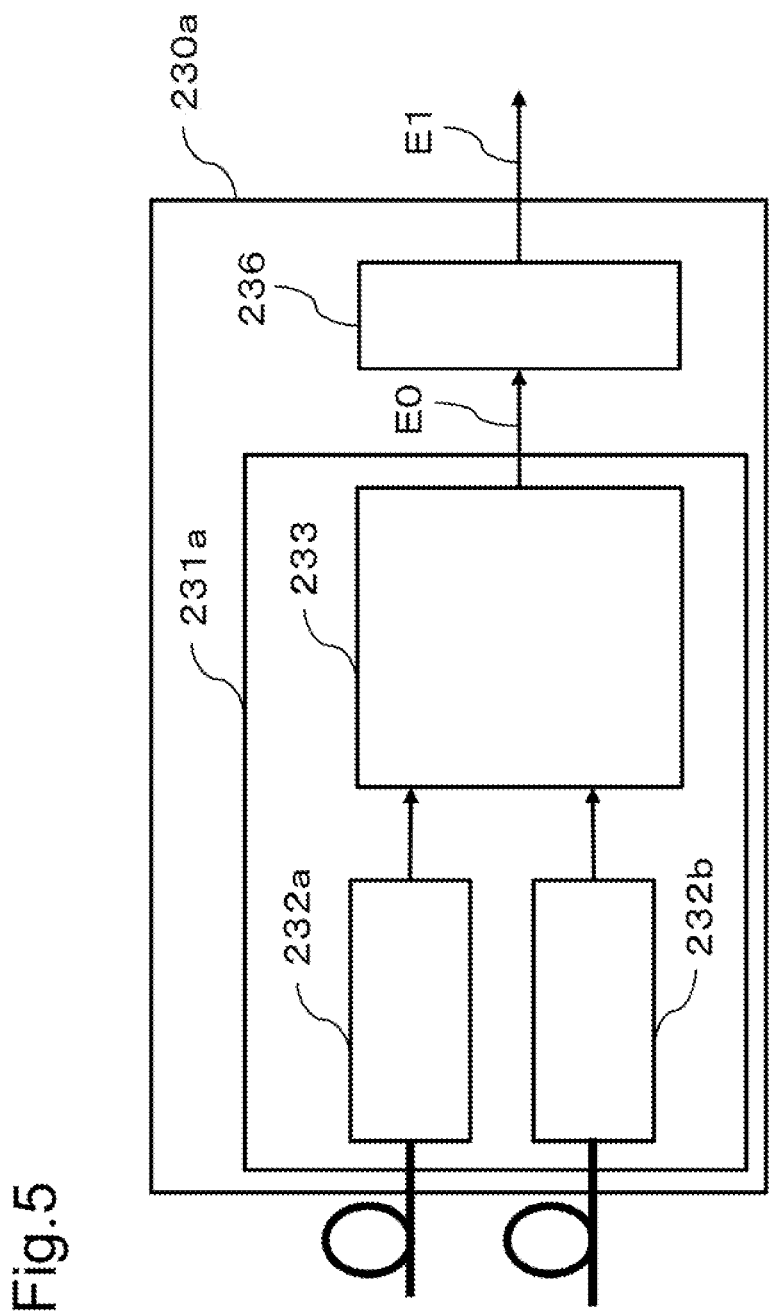
FIG. 5 is a block diagram illustrating a second configuration example of the peak signal detection unit in FIG. 1.

FIG. 5 is a block diagram illustrating a second configuration example of the peak signal detection unit in FIG. 1. As illustrated in FIG. 5, a peak signal detection unit 230a according to the present configuration example includes a balanced optical detector 231a and an analog-digital converter 236. The balanced optical detector 231a includes photoelectric converters 232a and 232b and a differential detection unit 233.

Two optical signals interfering with each other in the optical delay interferometer 210 are input to the peak signal detection unit 230a. The two optical signals are input to the balanced optical detector 231, and are each input to the photoelectric converters 232a and 232b. The photoelectric converter 232a and the photoelectric converter 232b output, to the differential detection unit, two electric signals acquired by performing photoelectric conversion on each of the two input optical signals. The differential detection unit 233 outputs a peak signal E0 being a differential signal of the two input electric signals to the analog-digital converter 236. The analog-digital converter 236 outputs a peak signal E1 converted into the digital electric signal.

Figure 6:
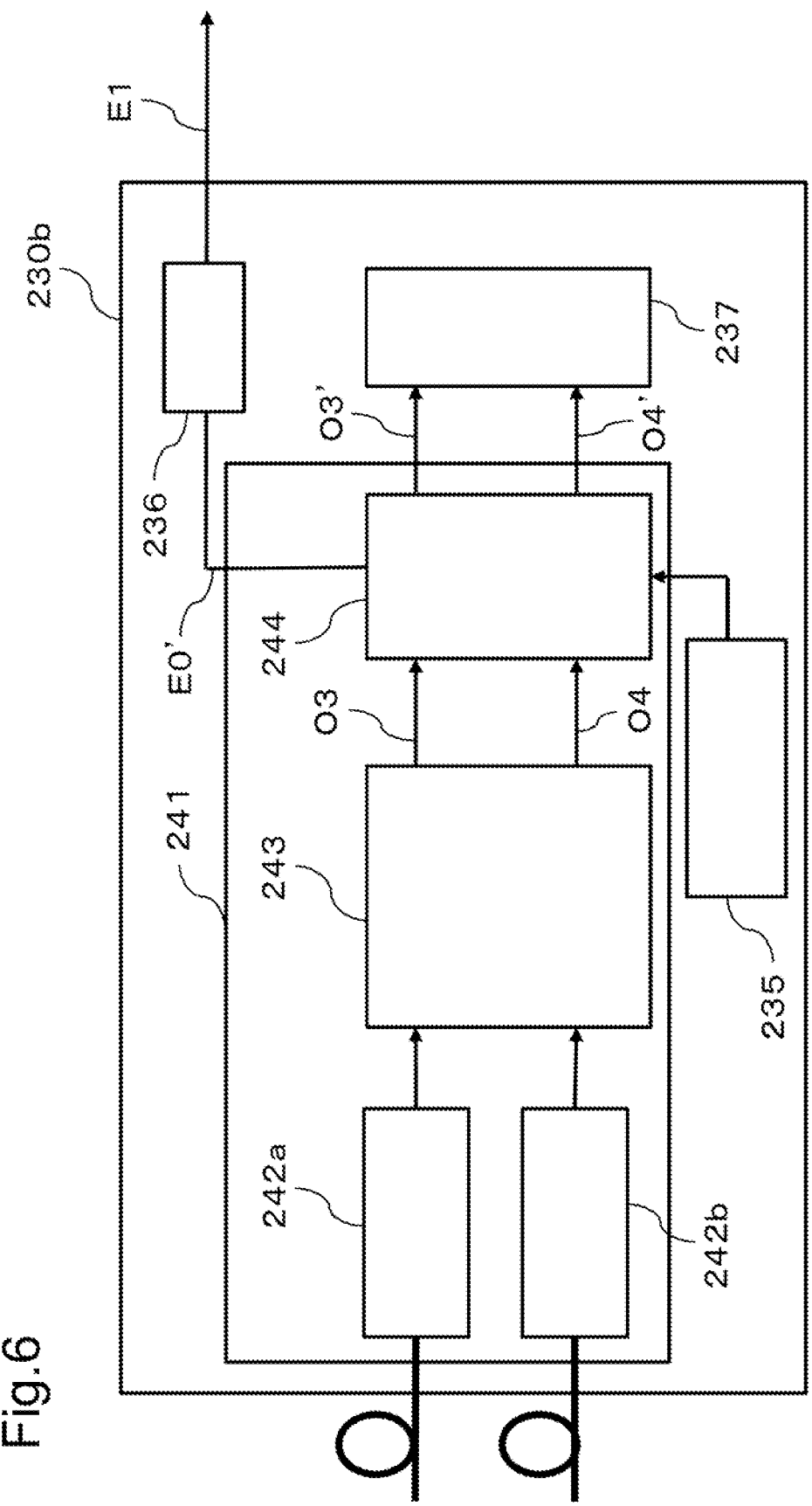
FIG. 6 is a block diagram illustrating a third configuration example of the peak signal detection unit in FIG. 1.

FIG. 6 is a block diagram illustrating a third configuration example of the peak signal detection unit in FIG. 1. As illustrated in FIG. 6, a peak signal detection unit 230b according to the present configuration example includes a wide-band balanced optical detector 241, a gain setting unit 235, an analog-digital converter 236, and a terminal unit 237. The wide-band balanced optical detector 241 includes wide-band photoelectric converters 242a and 242b, a wide-band differential detection unit 243, and a wide-band signal amplification unit 244.

Two optical signals interfering with each other in the optical delay interferometer 210 are input to the peak signal detection unit 230b. The two optical signals input to the peak signal detection unit 230b are input to the wide-band balanced optical detector 241, and are each input to the wide-band photoelectric converter 242a and the wide-band photoelectric converter 242b. The wide-band photoelectric converter 242a and the wide-band photoelectric converter 242b output, to the wide-band differential detection unit 243, electric signals acquired by performing photoelectric conversion on each of the input optical signals. The wide-band differential detection unit 243 performs differential detection on the two input electric signals, and outputs main signals O3 and O4 to the wide-band signal amplification unit 244. The wide-band signal amplification unit 244 is, for example, a transimpedance amplifier. The wide-band signal amplification unit 244 amplifies the main signals O3 and O4 by a gain set in the gain setting unit 235, and outputs the amplified main signals O3 and O4 to the terminal unit 237. The gain of the wide-band signal amplification unit 244 is set to a gain at which the main signals O3 and O4 output from the wide-band signal amplification unit 244 changes in a linear region with respect to optical input power of the optical phase modulation signal received by the optical receiver 10 within a range of the optical input power. Main signals O3' and O4' amplified by the wide-band signal amplification unit 244 are terminated by the terminal unit 237.

Further, the wide-band signal amplification unit 244 converts the main signals O3 and O4 into a peak signal E0' of an analog electric signal, and outputs the peak signal E0' to the analog-digital converter 236. The wide-band signal amplification unit 244 may output the main signal O3 as the peak signal E0', for example. The analog-digital converter 236 converts the input peak signal E0' into a digital electric signal, and outputs the peak signal E1.

A gain of the wide-band signal amplification unit 244 set in the gain setting unit 235 may be stored in advance in a recording device such as a memory, or may be set by a telemetry command transmitted from a ground station via the control device 60.

Figure 7:
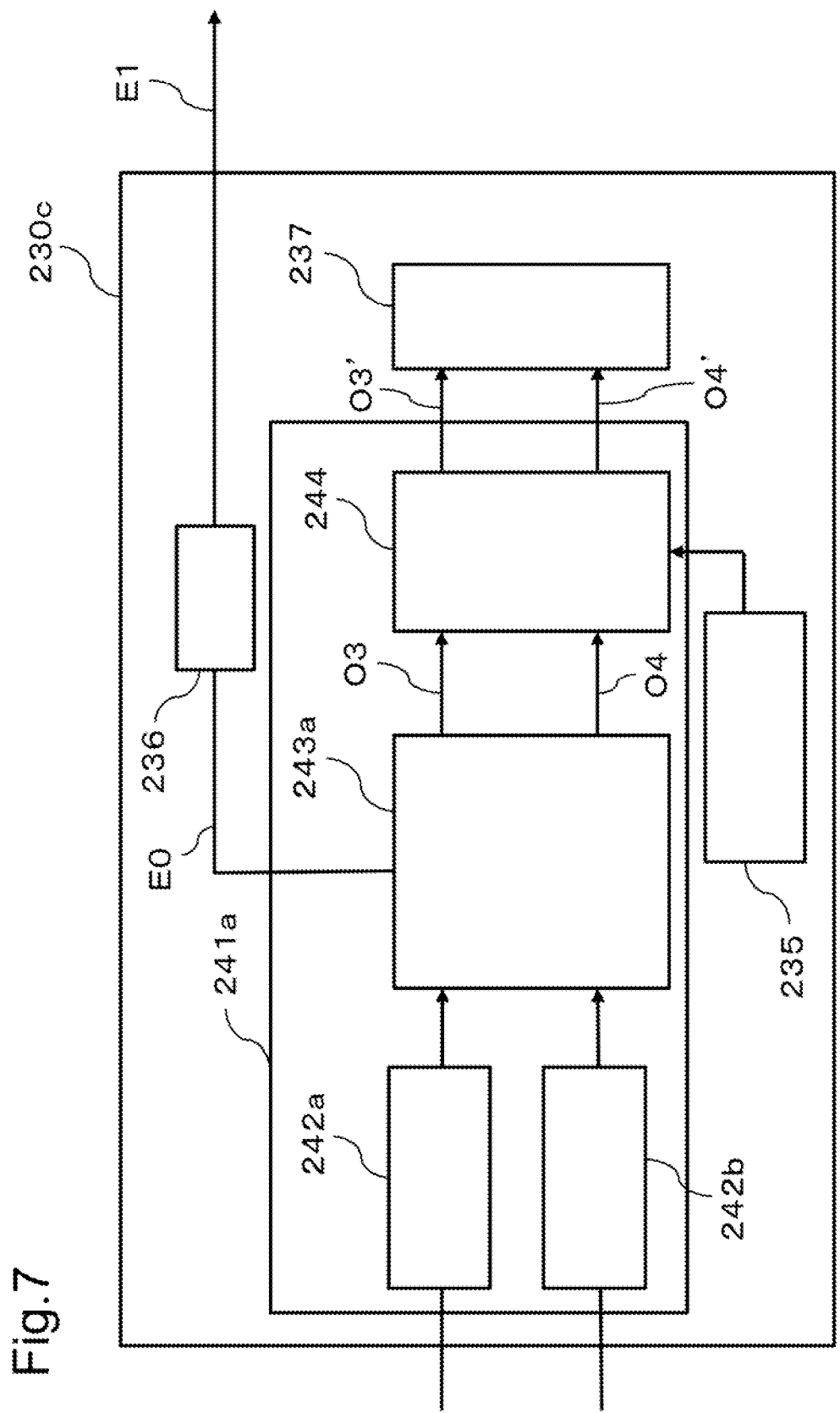
FIG. 7 is a block diagram illustrating a fourth configuration example of the peak signal detection unit in FIG. 1.

FIG. 7 is a block diagram illustrating a fourth configuration example of the peak signal detection unit in FIG. 1. As illustrated in FIG. 7, a peak signal detection unit 230*c* according to the present configuration example includes a wide-band balanced optical detector 241*a*, a gain setting unit 235, an analog-digital converter 236, and a terminal unit 237. The wide-band balanced optical detector 241*a* includes wide-band photoelectric converters 242*a* and 242*b*, a wide-band differential detection unit 243*a*, and a wide-band signal amplification unit 244.

Two optical signals interfering with each other in the optical delay interferometer 210 are input to the peak signal detection unit 230*c*. The two optical signals input to the peak signal detection unit 230*c* are input to the wide-band balanced optical detector 241*a*, and are each input to the wide-band photoelectric converter 242*a* and the wide-band photoelectric converter 242*b*. The wide-band photoelectric converter 242*a* and the wide-band photoelectric converter 242*b* output, to the wide-band differential detection unit 243*a*, electric signals acquired by performing photoelectric conversion on each of the input optical signals. The wide-band differential detection unit 243*a* performs differential detection on the two input electric signals, and outputs main signals O3 and O4 to the wide-band signal amplification unit 244. Further, the wide-band differential detection unit 243*a* outputs a peak signal E0 being a differential signal of the two input electric signals to the analog-digital converter 236. The wide-band signal amplification unit 244 amplifies the input main signals O3 and O4 by a gain set in the gain setting unit 235, and outputs the amplified main signals O3 and O4 to the terminal unit 237. Main signals O3' and O4' amplified by the wide-band signal amplification unit 244 are terminated by the terminal unit 237. Further, the wide-band differential detection unit 243*a* converts the two input electric signals into the peak signal E0 of an analog electric signal, and outputs the peak signal E0 to the analog-digital converter 236. The wide-band differential detection unit 243*a* may output a differential signal of the two input electric signals as the peak signal E0 to the analog-digital converter 236. The analog-digital converter 236 outputs a peak signal E1 acquired by converting the peak signal E0 of the analog electric signal into a digital electric signal.

A gain of the wide-band signal amplification unit 244 set in the gain setting unit 235 may be stored in advance in a recording device such as a memory, or may be set by a telemetry command transmitted from a ground station via the control device 60.

Referring back to FIG. 1, the configuration of the optical receiver 10 will be described. The main signal O1 and the main signal O2 input to the digital signal processing unit 120 are input to the data recovery unit 310. The data recovery unit 310 is, for example, a clock data regenerator, and recovers and outputs output data D1 and D2 by performing clock recovery, based on the main signals O1 and O2, and latching data by the recovered clock.

Further, the peak signal E1 input to the digital signal processing unit 120 is input to the level fluctuation frequency suppression unit 320. The level fluctuation frequency suppression unit 320 detects a frequency at which a peak level of the peak signal E1 fluctuates, suppresses a peak fluctuation component of the frequency, and outputs a peak signal E2 to the optical delay interference control unit 330.

Note that, hereinafter, the peak fluctuation component described above is referred to as a level fluctuation frequency component.

Figure 8:
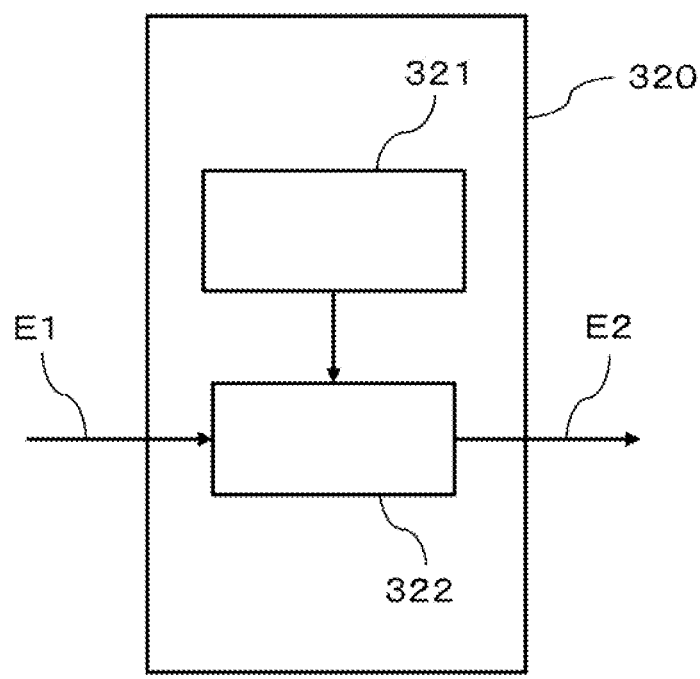
FIG. 8 is a block diagram illustrating a first configuration example of a level fluctuation frequency suppression unit in FIG. 1.

FIG. 8 is a block diagram illustrating a first configuration example of the level fluctuation frequency suppression unit in FIG. 1. As illustrated in FIG. 8, the level fluctuation frequency suppression unit 320 according to the present configuration example includes a filter band setting unit 321 and a filter processing unit 322.

The filter band setting unit 321 sets a filter band in which a level fluctuation frequency component of the peak signal E1 is suppressed.

The peak signal E1 is input to the level fluctuation frequency suppression unit 320. The filter processing unit 322 performs, on the peak signal E1, filter processing for suppressing a level fluctuation frequency component in the filter band set in the filter band setting unit 321. In this way, the peak signal E2 having the level fluctuation frequency component being suppressed is output from the level fluctuation frequency suppression unit 320.

Figure 9:
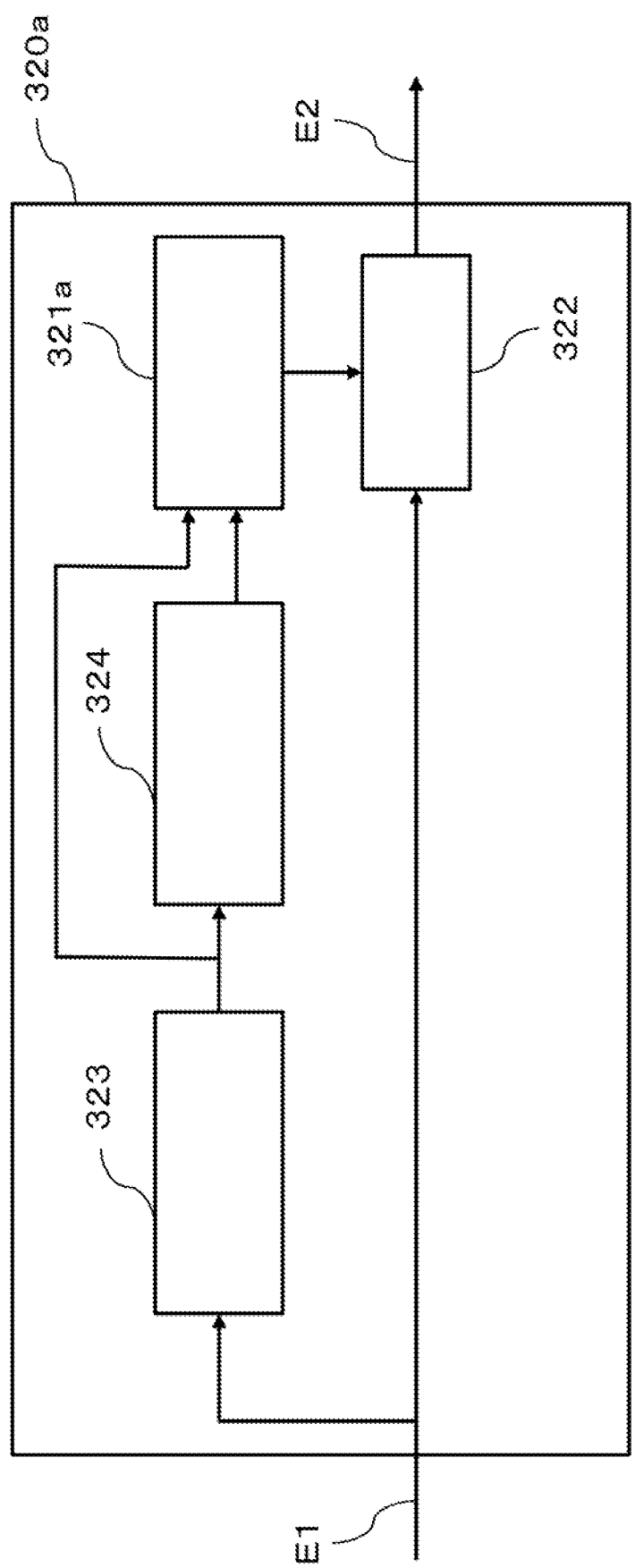
FIG. 9 is a block diagram illustrating a second configuration example of the level fluctuation frequency suppression unit in FIG. 1.

FIG. 9 is a block diagram illustrating a second configuration example of the level fluctuation frequency suppression unit in FIG. 1. As illustrated in FIG. 9, a level fluctuation frequency suppression unit 320*a* according to the present configuration example includes a filter band setting unit 321*a*, a filter processing unit 322, a frequency domain conversion unit 323, and a level fluctuation frequency detection unit 324.

The peak signal E1 is input to the level fluctuation frequency suppression unit 320*a*, and the input peak signal E1 is input to the frequency domain conversion unit 323. The frequency domain conversion unit 323 converts the peak signal E1 into a frequency spectrum by performing fast Fourier transform (FFT) and the like, and outputs the frequency spectrum of the peak signal E1 to the level fluctuation frequency detection unit 324 and the filter band setting unit 321*a*. The level fluctuation frequency detection unit 324 detects a level fluctuation frequency component from the frequency spectrum of the peak signal E1. The filter band setting unit 321*a* sets a filter band in which the level fluctuation frequency component is suppressed, based on the frequency spectrum of the peak signal E1 being an output from the frequency domain conversion unit 323 and the level fluctuation frequency component detected by the level fluctuation frequency detection unit 324. The filter processing unit 322 performs, on the peak signal E1, filter processing for suppressing the level fluctuation frequency component in the filter band set in the filter band setting unit 321*a*. In this way, the level fluctuation frequency suppression unit 320*a* outputs the peak signal E2 having the level fluctuation frequency component being suppressed.

Figure 10:
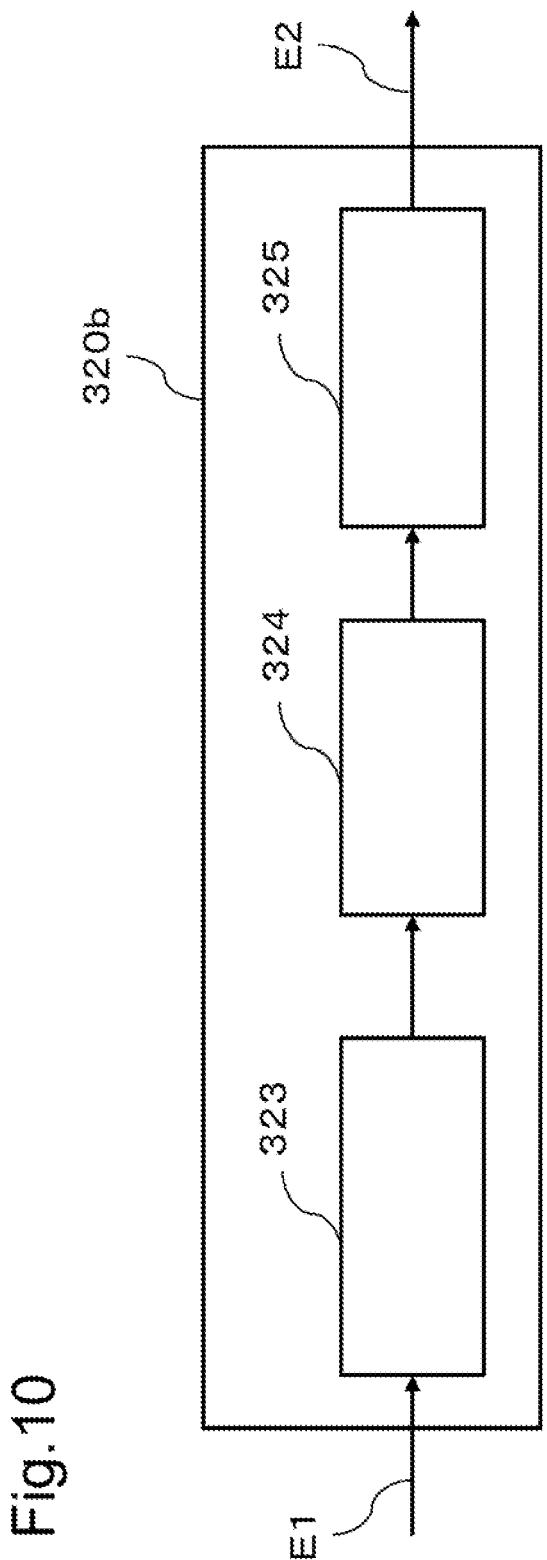
FIG. 10 is a block diagram illustrating a third configuration example of the level fluctuation frequency suppression unit in FIG. 1.

FIG. 10 is a block diagram illustrating a third configuration example of the level fluctuation frequency suppression unit. As illustrated in FIG. 8, a level fluctuation frequency suppression unit 320*b* according to the present configuration example includes a frequency domain conversion unit 323, a level fluctuation frequency detection unit 324, and a time domain conversion unit 325.

The peak signal E1 is input to the level fluctuation frequency suppression unit 320*b*. The peak signal E1 is input to the frequency domain conversion unit 323, and the frequency domain conversion unit 323 converts the peak signal E1 into a frequency spectrum by performing fast Fourier transform (FFT) and the like, and outputs the frequency spectrum of the peak signal E1 to the level fluctuation frequency detection unit 324. The level fluctuation frequency detection unit 324 detects a level fluctuation frequency component from the frequency spectrum of the peak signal E1. The level fluctuation frequency detection unit 324 removes only the detected level fluctuation frequency component from the frequency spectrum of the peak signal E1, and outputs the frequency spectrum to the time domain conversion unit 325. The time domain conversion unit 325 converts the frequency spectrum from the level fluctuation frequency detection unit 324 into the peak signal E2 by performing inverse fast Fourier transform (IFFT) and the like, and outputs the peak signal E2 having the level fluctuation frequency component being suppressed. In this way, the level fluctuation frequency suppression unit 320b outputs the peak signal E2 having the level fluctuation frequency component being suppressed.

Figure 11:
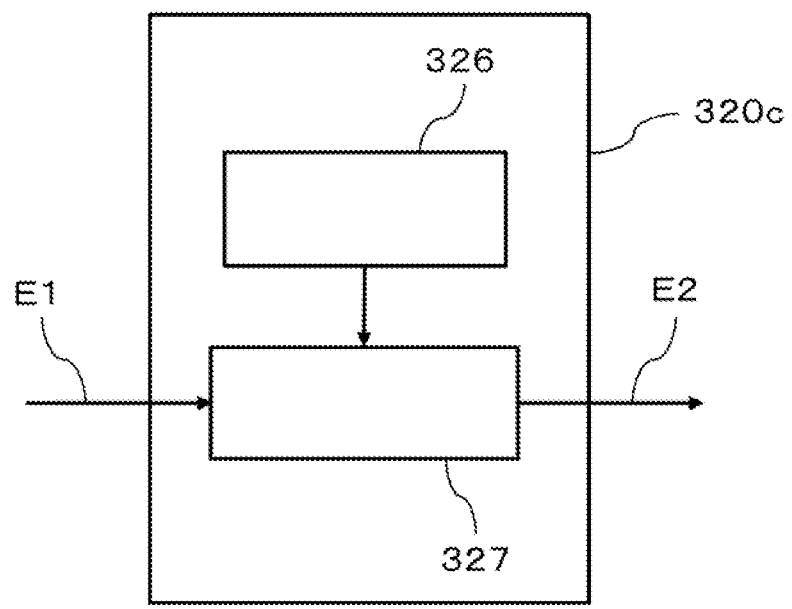
FIG. 11 is a block diagram illustrating a fourth configuration example of the level fluctuation frequency suppression unit in FIG. 1.

FIG. 11 is a block diagram illustrating a fourth configuration example of the level fluctuation frequency suppression unit in FIG. 1. As illustrated in FIG. 11, a level fluctuation frequency suppression unit 320c according to the present configuration example includes an equalization number setting unit 326 and an equalization processing unit 327.

The peak signal E1 is input to the level fluctuation frequency suppression unit 320c. The equalization processing unit 327 performs equalization processing for suppressing a level fluctuation frequency component on the peak signal E1, based on equalization number information of the equalization processing unit 327 being set in the equalization number setting unit 326. In this way, the level fluctuation frequency suppression unit 320c outputs the peak signal E2 having the level fluctuation frequency component being suppressed.

Referring back to FIG. 1, the configuration of the optical receiver 10 will be further described. The optical delay interference control unit 330 generates, based on an output level of the peak signal E2 having the level fluctuation frequency component being suppressed and information from the overdrive coefficient setting unit 340, the optical delay interference control signal C1 for controlling a delay amount in the optical delay interferometer 210 and on which overdrive amplification is performed. The optical delay interference control unit 330 generates, based on an output level of the peak signal E2 and information from the overdrive coefficient setting unit 340, the optical delay interference control signal C1 having a waveform acquired by momentarily performing overdrive amplification on a signal at a fixed level being set in such a way as to increase a peak of the peak signal E2. The optical delay interference control signal C1 being an output from the optical delay interference control unit 330 is applied to the optical delay interferometer 210.

In this way, by performing feedback control on the optical delay interferometer 210, a delay between the two optical signals split by the optical delay interferometer 210 can be controlled, and an output level of a peak signal can be increased.

Information set in the overdrive coefficient setting unit 340 may be stored in advance in a recording device such as a memory, or may be set by a telemetry command transmitted from a ground station via the control device 60.

Figure 12:
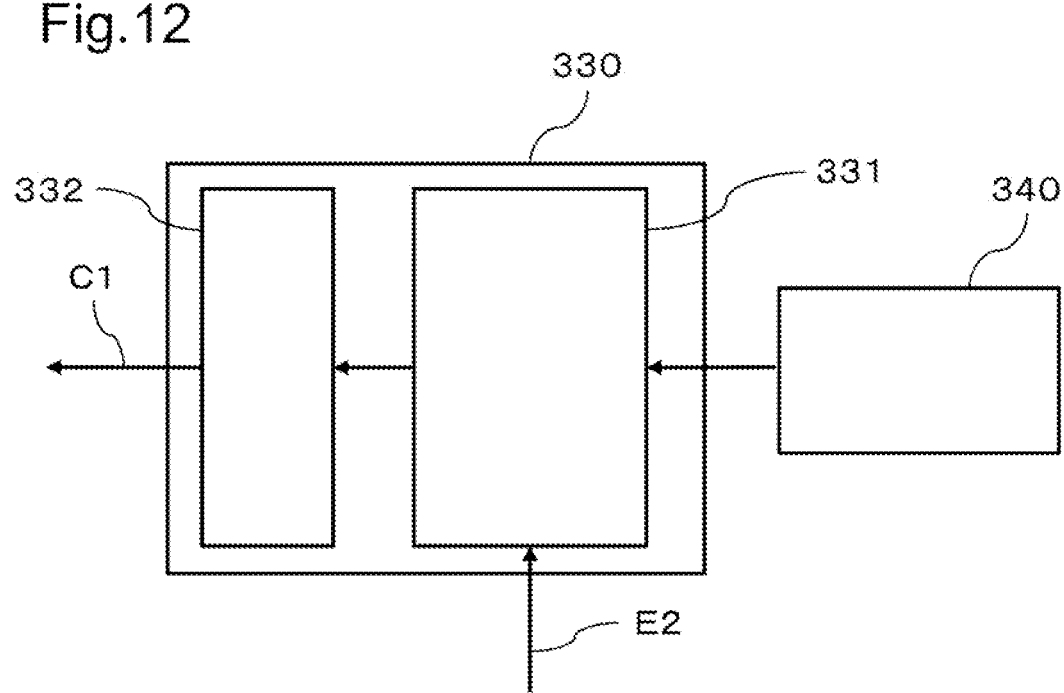
FIG. 12 is a block diagram illustrating a configuration example of an optical delay interference control unit in FIG. 1.

FIG. 12 is a block diagram illustrating a configuration example of the optical delay interference control unit in FIG. 1. As illustrated in FIG. 12, the optical delay interference control unit 330 according to the present configuration example includes a control signal generation unit 331 and a digital-analog converter 332.

The peak signal E2 having the level fluctuation frequency component being suppressed is input to the optical delay interference control unit 330, and is input to the control signal generation unit 331. The control signal generation unit 331 first sets, based on an output level of the input peak signal E2 and information from the overdrive coefficient setting unit 340, a level of an optical delay interference control signal C0 output to the digital-analog converter 332 in such a way as to increase a peak of the peak signal E2, based on an output level of the peak signal E2 and information from the overdrive coefficient setting unit 340.

For example, the control signal generation unit 331 refers to, at a predetermined period, a history of a level of the peak signal E2 and a level of the optical delay interference control signal C0 being stored, based on the input peak signal E2, and determines a level changed by a predetermined level in a direction in which the peak signal is increased from a level in a previous step. Note that, when the control signal generation unit 331 sets the optical delay interference control signal C0, the control signal generation unit 331 stores a level of the peak signal E2 and a level of the optical delay interference control signal C0 in association with each other.

In a case where a level of the peak signal E2 increases this time from a previous time, the control signal generation unit 331 sets a level of the optical delay interference control signal C0 to a level increased by a predetermined level from a previous level when a level of the optical delay interference control signal C0 is increased in a previous step. Further, in a case where a level of the peak signal E1 decreases this time from a previous time, the control signal generation unit 331 sets a level of the optical delay interference control signal C0 to a level decreased by a predetermined level from a previous level when a level of the optical delay interference control signal C0 is increased in a previous step.

Subsequently, the control signal generation unit 331 generates the optical delay interference control signal C0 of a digital electric signal having a waveform acquired by momentarily performing overdrive amplification on the signal at the set level by push and pull, based on information from the overdrive coefficient setting unit 340, and outputs the optical delay interference control signal C0 to the digital-analog converter 332. The digital-analog converter 332 outputs the optical delay interference control signal C1 acquired by converting the input optical delay interference control signal C0 of the digital electric signal into an analog electric signal.

Figure 13:
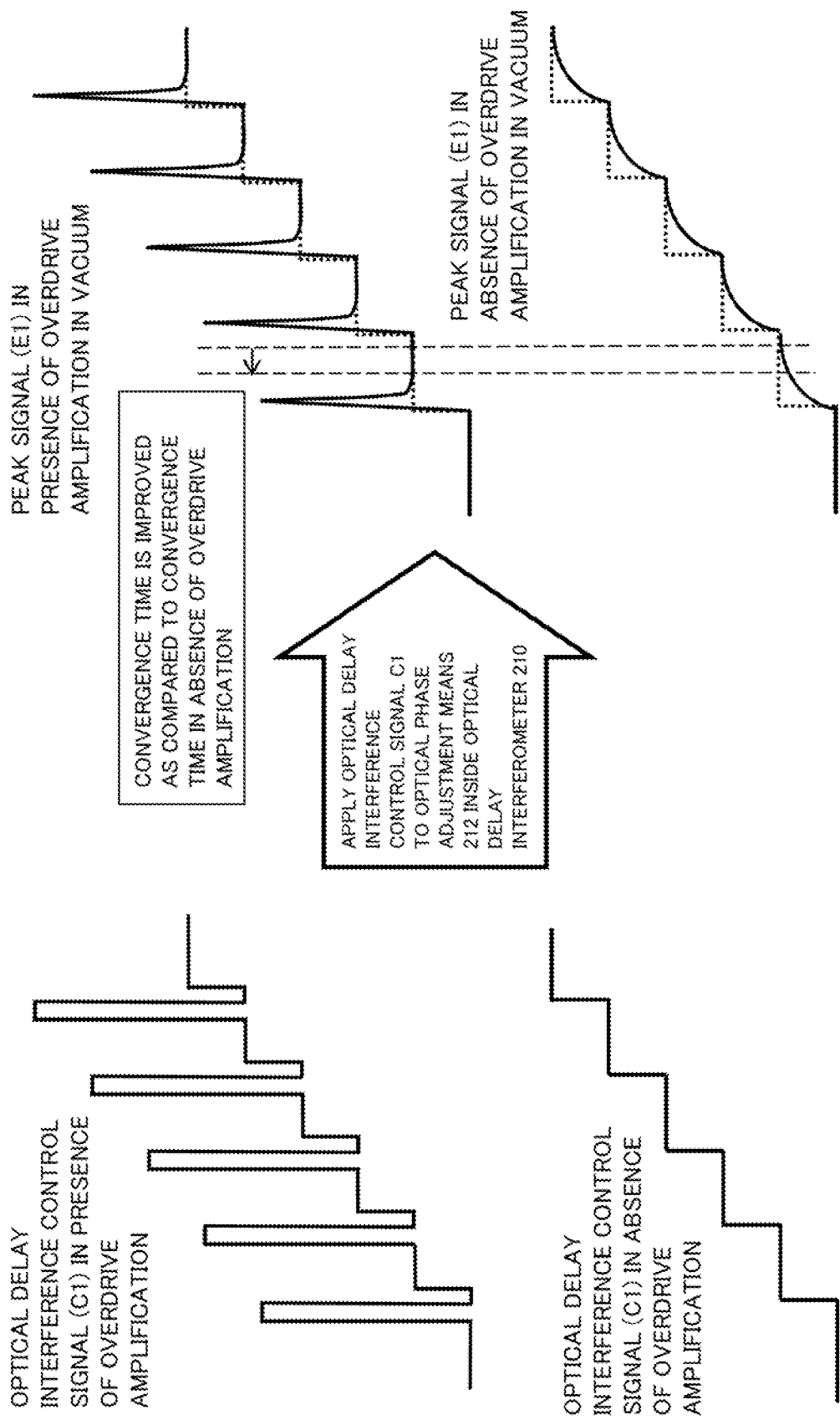
FIG. 13 is an optical delay interference control signal C1 increasing in presence and absence of overdrive amplification, and a peak signal E1 in presence and absence of overdrive amplification in a vacuum.

FIG. 13 is the optical delay interference control signal C1 increasing in presence and absence of overdrive amplification, and the peak signal E1 in presence and absence of overdrive amplification in a vacuum. As illustrated in FIG. 13, in a vacuum, when the optical delay interference control signal C1 increasing in absence of overdrive amplification is applied to the optical phase adjustment unit 212 inside the optical delay interferometer, the peak signal E1 is increased by overdrive amplification. Thus, a convergence time of the peak signal E1 in presence of overdrive amplification is improved as compared to the peak signal E1 in absence of overdrive amplification.

Figure 14:
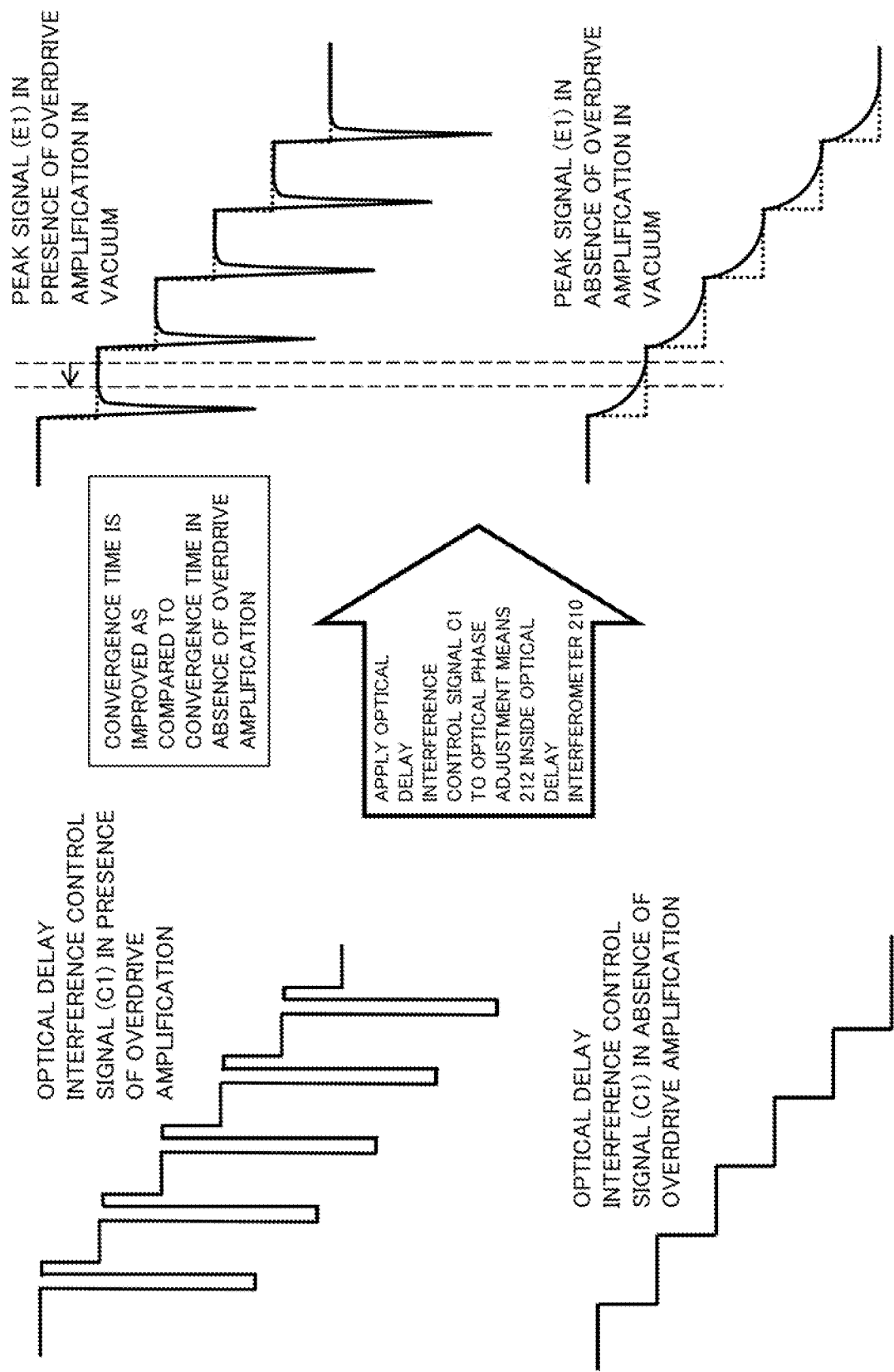
FIG. 14 is the optical delay interference control signal C1 decreasing in presence and absence of overdrive amplification, and the peak signal E1 in presence and absence of overdrive amplification in a vacuum.

FIG. 14 is the optical delay interference control signal C1 decreasing in presence and absence of overdrive amplification, and the peak signal E1 in presence and absence of overdrive amplification in a vacuum. As illustrated in FIG. 14, in a vacuum, when the optical delay interference control signal C1 increasing in absence of overdrive amplification is applied to the optical phase adjustment unit 212 inside the optical delay interferometer, the peak signal E1 is increased by overdrive amplification. Thus, a convergence time of the peak signal E1 in presence of overdrive amplification is improved as compared to the peak signal E1 in absence of overdrive amplification.

Figure 15:
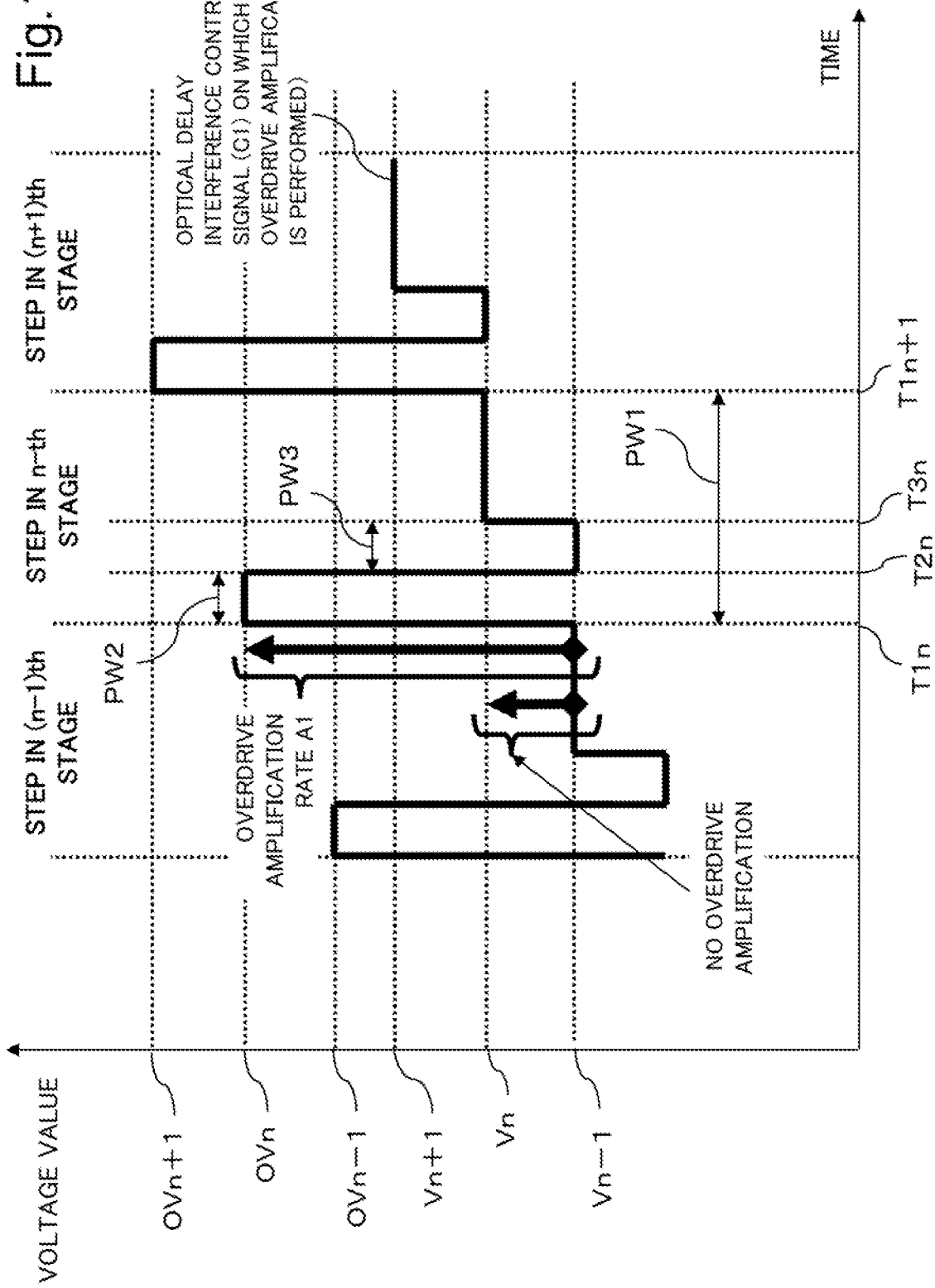
FIG. 15 is a diagram illustrating a setting condition related to the optical delay interference control signal C1 increasing on which overdrive amplification is performed.

FIG. 15 is a diagram illustrating a setting condition related to the optical delay interference control signal C1 increasing on which overdrive amplification is performed. A step voltage value in an n-th stage is Vn, and an overdrive voltage value in the n-th step is OVn. T1$n$ is a time at which a voltage value rises from Vn−1 to OVn, T2$n$ is a time at which a voltage value falls from OVn to Vn−1, and T3$n$ is a time at which a voltage value rises from Vn−1 to Vn. One step width PW1 is PW1=T1$n$+1−T1$n$.

A pulse width PW2 is

PW2=T2$n$−T1$n$.

A pulse width PW3 is

PW3=T3$n$−T2$n$.

An overdrive amplification rate A1 is

A1={(OVn)$^2$−(Vn−1)$^2$}/{(Vn)$^2$−(Vn−1)$^2$}.

A condition set in the overdrive coefficient setting unit 340 is, for example, the pulse width PW2, the pulse width PW3, and the overdrive amplification rate A1. Since responsiveness of a heater inside an individual optical delay interferometer varies, the overdrive amplification rate A1 needs to be set for each individual optical delay interferometer.

Information set in the overdrive coefficient setting unit 340 may be stored in advance in a recording device such as a memory, or may be set by a telemetry command transmitted from a ground station via the control device 60.

Figure 16:
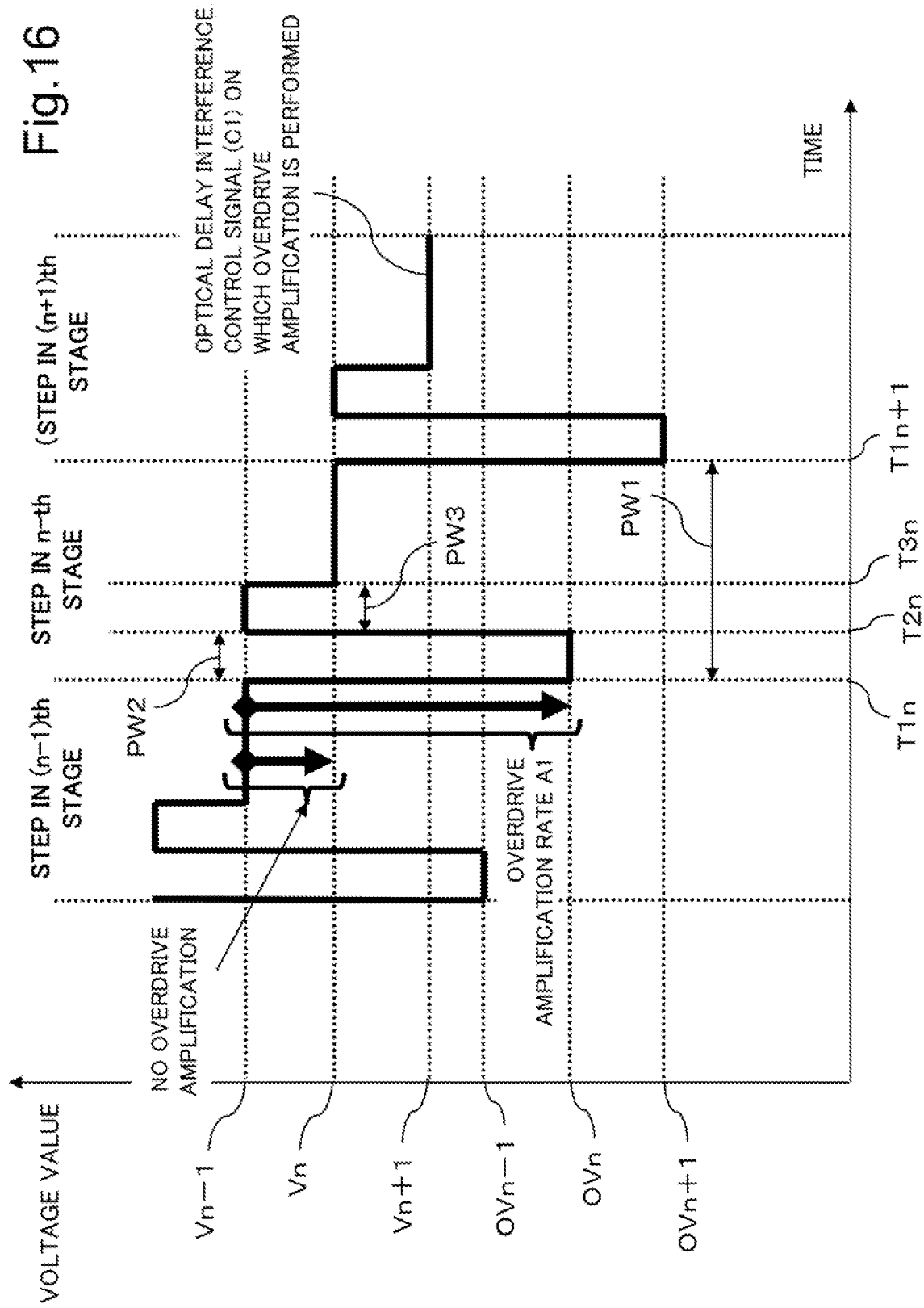
FIG. 16 is a diagram illustrating a setting condition related to the optical delay interference control signal C1 decreasing on which overdrive amplification is performed.

FIG. 16 is a diagram illustrating a setting condition related to the optical delay interference control signal C1 decreasing on which overdrive amplification is performed. A step voltage value in an n-th stage is Vn, and an overdrive voltage value in the n-th step is OVn. T1$n$ is a time at which a voltage value falls from Vn−1 to OVn, T2$n$ is a time at which a voltage value rises from OVn to Vn−1, and T3$n$ is a time at which a voltage value falls from Vn−1 to Vn. One step width PW1 is PW1=T1$n$+1−T1$n$.

A pulse width PW2 is

PW2=T2$n$−T1$n$.

A pulse width PW3 is

PW3=T3$n$−T2$n$.

An overdrive amplification rate A1 is

A1={(OVn)$^2$−(Vn−1)$^2$}/{(Vn)$^2$−(Vn−1)$^2$}.

A condition set in the overdrive coefficient setting unit 340 is, for example, the pulse width PW2, the pulse width PW3, and the overdrive amplification rate A1. Since responsiveness of a heater inside an individual optical delay interferometer varies, the overdrive amplification rate A1 needs to be set for each individual optical delay interferometer.

Information set in the overdrive coefficient setting unit 340 may be stored in advance in a recording device such as a memory, or may be set by a telemetry command transmitted from a ground station via the control device 60.

Effect of First Example Embodiment

Figure 33:
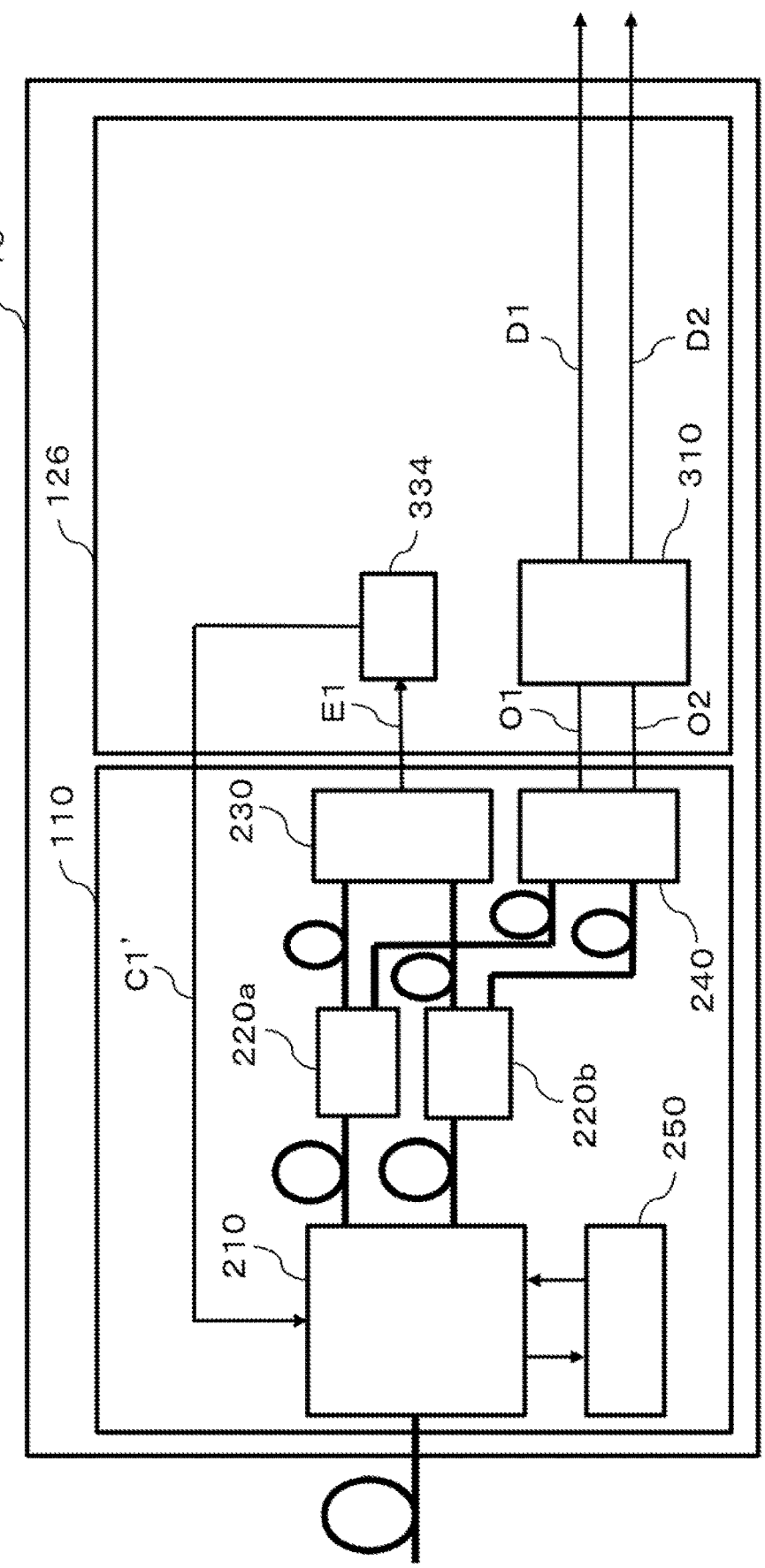
FIG. 33 is a configuration diagram of an optical receiver according to a comparison example for comparison with the optical receiver in FIG. 1.

FIG. 33 is a configuration diagram of an optical receiver according to a comparison example for comparison with the optical receiver in FIG. 1. In FIG. 33, an optical receiver 16 according to the comparison example does not include a level fluctuation frequency suppression unit 320 and an overdrive coefficient setting unit 340 in a digital signal processing unit 126. Further, in the digital signal processing unit 126 according to the comparison example, a peak signal E1 output from a peak signal detection unit 230 is directly input to an optical delay interference control unit 334. In other words, the peak signal E1 output from the peak signal detection unit 230 is input to the optical delay interference control unit 334 without suppressing a level fluctuation of the peak signal E1 due to an external level fluctuation factor such as an optical disturbance caused by control of an optical acquisition and tracking device and an optical beam propagation fluctuation due to a medium such as an atmosphere. Further, the optical delay interference control unit 334 according to the comparison example sets an optical delay interference control signal C1' at a fixed level during a period of each step without performing overdrive amplification.

In such a configuration according to the comparison example, application of a differential phase modulation/demodulation method for satellite mounting has the following problems.

Figure 34:
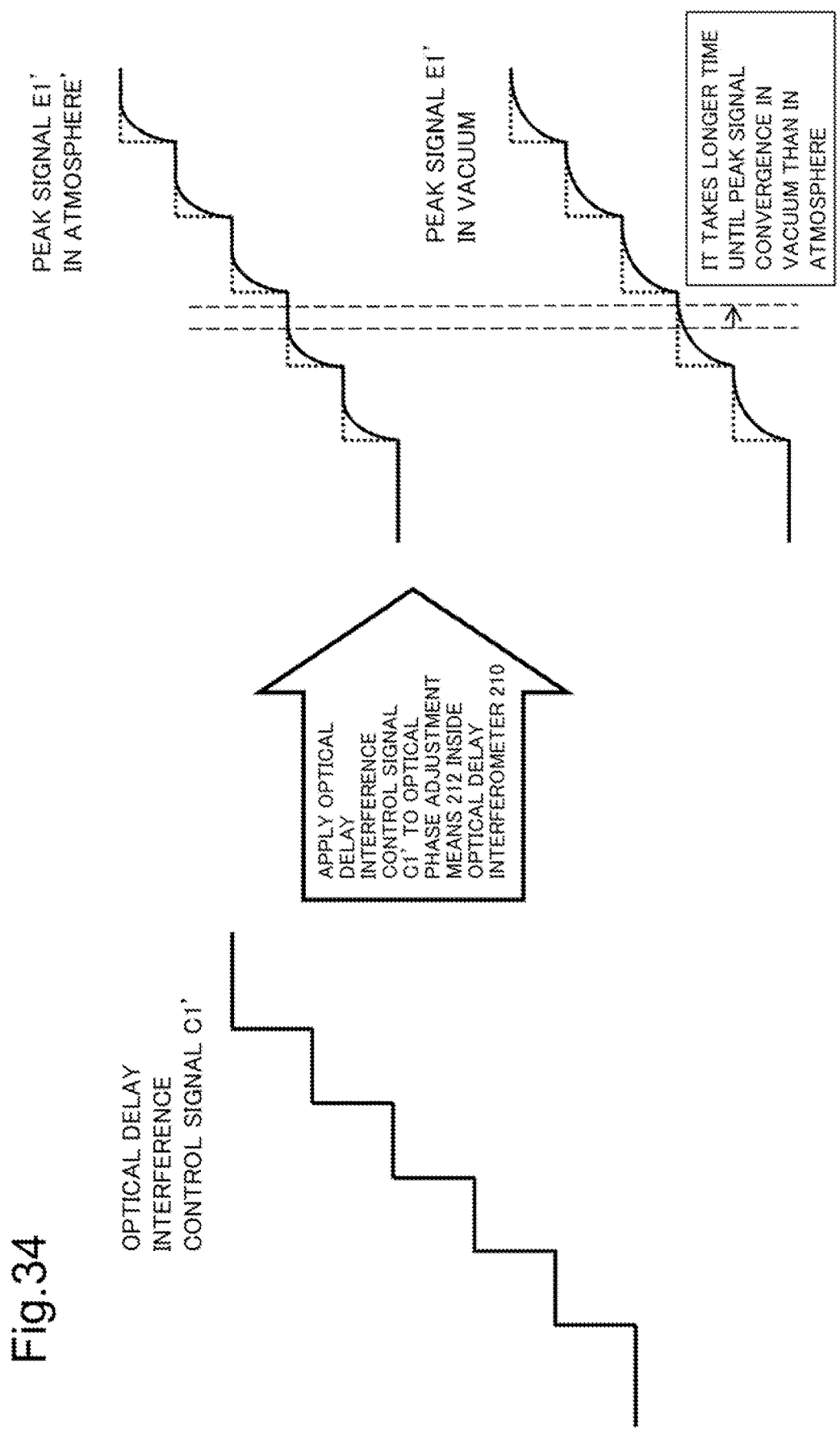
FIG. 34 is a diagram illustrating a peak signal E1' in an atmosphere and in a vacuum when an optical delay interference control signal C1' increasing is applied to an optical phase adjustment unit inside an optical delay interferometer in the comparison example.

A first problem is that responsiveness of a heater inside an optical delay interferometer 210 becomes poor due to a vacuum environment. In this way, a heat transmission characteristic to an optical branching path of an optical phase adjustment unit 212 becomes poor as compared to that in an environment in an atmosphere. FIG. 34 is a diagram illustrating the peak signal E1 in an atmosphere and in a vacuum when the optical delay interference control signal C1' increasing is applied to the optical phase adjustment unit inside the optical delay interferometer 210 in the comparison example. FIG. 35 is a diagram illustrating the peak signal E1 in an atmosphere and in a vacuum when the optical delay interference control signal C1' decreasing is applied to the optical phase adjustment unit inside the optical delay interferometer in the comparison example. As illustrated in FIGS. 34 and 35, a heat transmission characteristic becomes poor in a vacuum, and thus it takes a longer time until peak signal convergence than in an atmosphere. Thus, wavelength tracking does not become stable on a reception side in a heater adjustment of the optical phase adjustment unit 212 inside the optical delay interferometer 210 via the optical delay interference control unit 334, and it takes a long time to converge wavelength tracking. Further, there is variation in responsiveness of the heater of the optical phase adjustment unit 212 inside the optical delay interferometer 210, depending on an individual.

A second problem is that, in a case where a transimpedance amplifier inside a wide-band balanced optical detector 240 has a non-linear characteristic in which an output level becomes saturated when an input becomes equal to or more than predetermined power, an influence of the non-linear characteristic also appears in a peak signal, and wavelength tracking becomes impossible. In order to perform wavelength tracking, a peak signal from the wide-band balanced optical detector needs to be detected in a linear region in which an output amplitude of the wide-band balanced optical detector 240 linearly changes with respect to power of an optical signal of an optical phase modulation signal received by the wide-band balanced optical detector 240 or the optical delay interferometer 210.

A third problem is that a level fluctuation occurs in the peak signal E1 from the wide-band balanced optical detector 240 due to an external level fluctuation factor such as an optical disturbance caused by control of an optical acquisition and tracking device and an optical beam propagation fluctuation due to a medium such as an atmosphere. Wavelength tracking is performed in the optical phase adjustment unit 212 inside the optical delay interferometer 210, based on a correspondence with a level of the optical delay interference control signal C1', by referring to the peak signal E1 from the wide-band balanced optical detector 240, and thus, when a fluctuation occurs in a peak signal level, an adjustment to a delay amount between two optical signals interfering with each other becomes unstable, and the delay amount does not converge to a delay amount of one bit.

For the problems in the comparison example described above, the first example embodiment can improve detection capacity of a peak signal by including the level fluctuation frequency suppression unit 320, and inputting, to the optical delay interference control unit 330, the peak signal E2 having the level fluctuation frequency component being suppressed. Furthermore, by performing feedback control on the optical delay interferometer 210 by the optical delay interference control signal C1 on which overdrive amplification is performed, responsiveness of wavelength tracking in the optical delay interferometer 210 in a vacuum environment can be improved. As a result, in an optical receiver of a differential phase modulation/demodulation method and an optical space communication system, a peak fluctuation of a differential signal of an optical signal output from a one-bit delay interferometer can be suppressed, and the differential phase modulation/demodulation method can be applied to a space environment for satellite mounting.

Modification Example of First Example Embodiment

Figure 17:
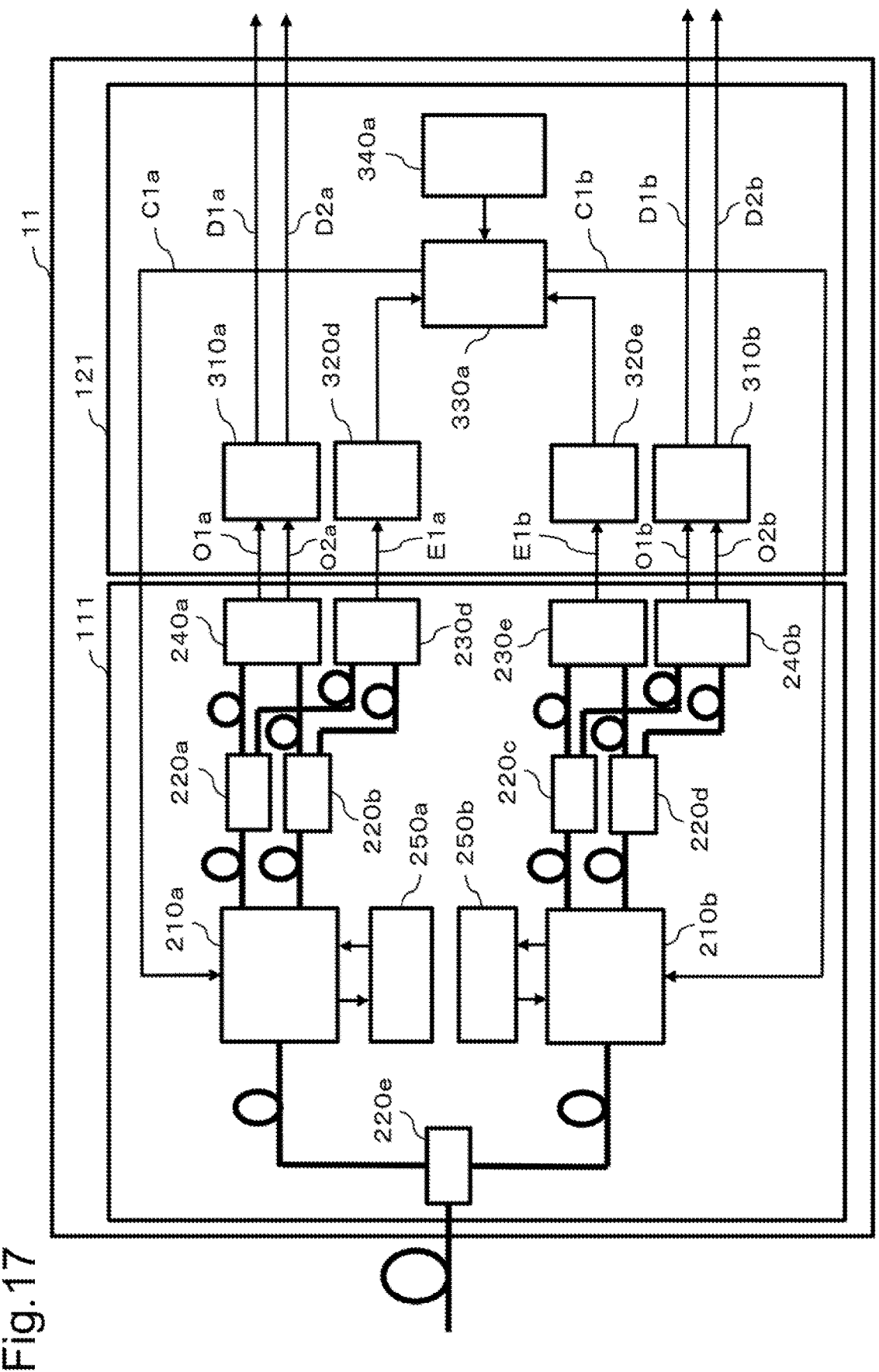
FIG. 17 is a configuration diagram of an optical receiver of a DQPSK method according to a modification example of the first example embodiment.

Next, a modification example according to the first example embodiment will be described. FIG. 17 is a configuration diagram of an optical receiver of a differential quadrature phase modulation/demodulation (DQPSK: differential quadrature phase shift keying) method according to the present modification example. Note that a configuration of an optical space communication system according to the present modification example is similar to that in FIG. 2. An optical phase modulation signal according to the present modification example is a quadrature phase modulation signal (QPSK: quadrature phase shift keying) of single polarization.

As illustrated in FIG. 17, an optical receiver 11 according to the present modification example includes a differential light detection unit 111 and a digital signal processing unit 121. The differential light detection unit 111 is a functional unit that detects phase information about an optical phase modulation signal by performing optical delay detection on the optical phase modulation signal. The differential light detection unit 111 includes optical delay interferometers 210a and 210b, optical branching units 220a, 220b, 220c, 220d, and 220e, peak signal detection units 230d and 230e, wide-band balanced optical detectors 240a and 240b, and temperature control units 250a and 250b.

The digital signal processing unit 121 is a functional unit that performs digital signal processing on main signals O1a, O2a, O1b, and O2b and peak signals E1a and E1b, and includes data recovery units 310a and 310b, level fluctuation frequency suppression units 320d and 320e, an optical delay interference control unit 330a, and an overdrive coefficient setting unit 340a.

An optical phase modulation signal input to the optical receiver 11 is input to the differential light detection unit 111, and the optical phase modulation signal input to the differential light detection unit 111 is split by the optical branching unit 220e. The split optical phase modulation signals are input to the optical delay interferometers 210a and 210b. The optical delay interferometers 210a and 210b each output a pair of interfering optical signals. Therefore, two pairs of the interfering optical signals are output from the optical delay interferometers 210a and 210b. Note that, the optical delay interferometers 210a according to the present modification example splits an input optical phase modulation signal into two and controls, to one bit, a delay amount of the two optical signals split into two, and then performs a π/4 phase shift on one of the signals, and outputs a pair of the optical signals (two optical signals) interfering with each other. Further, the optical delay interferometers 210b according to the present modification example splits an input optical phase modulation signal into two and controls, to one bit, a delay amount of the two optical signals split into two, and then performs a −π/4 phase shift on one of the signals, and outputs a pair of the optical signals (two optical signals) interfering with each other.

The two optical signals output from the optical delay interferometer 210a are each split by the optical branching unit 220a and the optical branching unit 220b similar to those in the first example embodiment. The optical signals split by the optical branching unit 220a are each input to the peak signal detection unit 230d and the wide-band balanced optical detector 240a similar to the wide-band balanced optical detector 240 in the first example embodiment. The optical signals split by the optical branching unit 220b are each input to the peak signal detection unit 230d and the wide-band balanced optical detector 240a. The peak signal detection unit 230d converts the two optical signals interfering with each other in the optical delay interferometer 210a into the peak signal E1a and outputs the peak signal E1a, and the wide-band balanced optical detector 240a converts the two optical signals interfering with each other in the optical delay interferometer 210a into the main signals O1a and O2a and outputs the main signals O1a and O2a. At this time, the main signals O1a and O2a are main signals associated with an I-phase component of the optical phase modulation signal. Note that the peak signal detection unit 230d according to the present modification example may be configured by adding, to any of the configurations of the peak signal detection unit in the first example embodiment described above, a phase shift unit that performs a −π/4 phase shift on one of optical signals on which a π/4 phase shift is performed. The peak signal detection unit 230d may be configured to perform a −π/4 phase shift on one of optical signals on which a π/4 phase shift is performed, and then output, to the digital signal processing unit 121, the peak signal E1 indicating intensity of differential light of the two optical signals by any of the configurations of the peak signal detection unit in the first example embodiment described above.

The two optical signals output from the optical delay interferometer 210b are each split by the optical branching unit 220c and the optical branching unit 220d. The two optical signals split by the optical branching unit 220c are each input to the peak signal detection unit 230e and the wide-band balanced optical detector 240b similar to the wide-band balanced optical detector 240 in the first example embodiment. The optical signals split by the optical branching unit 220d are each input to the peak signal detection unit 230e and the wide-band balanced optical detector 240b. The peak signal detection unit 230e converts the two optical signals interfering with each other in the optical delay interferometer 210b into the peak signal E1b and outputs the peak signal E1b, and the wide-band balanced optical detector 240b converts the two optical signals interfering with each other in the optical delay interferometer 210b into the main signals O1b and O2b and outputs the main signals O1b and O2b. At this time, the main signals O1b and O2b are main signals associated with a Q-phase component of the optical phase modulation signal. Note that the peak signal detection unit 230e according to the present modification example may be configured by adding, to any of the configurations of the peak signal detection unit in the first example embodiment described above, a phase shift unit that performs a $\pi/4$ phase shift on one of optical signals on which a $-\pi/4$ phase shift is performed. The peak signal detection unit 230e may be configured to perform a $\pi/4$ phase shift on one of optical signals on which a $-\pi/4$ phase shift is performed, and then output, to the digital signal processing unit 121, the peak signal E1 indicating intensity of differential light of the two optical signals by any of the configurations of the peak signal detection unit in the first example embodiment described above. Further, the temperature control unit 250a and the temperature control unit 250b have a configuration similar to that of the temperature control unit 250 according to the first example embodiment, and performs a temperature adjustment in such a way as to maintain a temperature of the optical delay interferometers 210a and 210b to be fixed.

The main signal O1a and the main signal O2a associated with the I phase being input to the digital signal processing unit 121 are input to the data recovery unit 310a having a configuration similar to that of the data recovery unit 310 according to the first example embodiment. The data recovery unit 310a recovers and outputs output data D1a and D2a by performing clock recovery, based on the main signals O1a and O2a, and latching data by the recovered clock. The main signal O1b and the main signal O2b associated with the Q phase being input to the digital signal processing unit 120 are input to the data recovery unit 310b having a configuration similar to that of the data recovery unit 310 according to the first example embodiment. The data recovery unit 310b recovers and outputs output data D1b and D2b by performing clock recovery, based on the main signals O1b and O2b, and latching data by the recovered clock.

The peak signal E1a and the peak signal E1b input to the digital signal processing unit 121 are input to the level fluctuation frequency suppression units 320d and 320e, respectively. The level fluctuation frequency suppression unit 320d suppresses a level fluctuation frequency component of the input peak signal E1a and outputs a peak signal E2a to the optical delay interference control unit 330a, and the level fluctuation frequency suppression unit 320e suppresses a level fluctuation frequency component of the input peak signal E1b and outputs a peak signal E2b to the optical delay interference control unit 330a. Note that the level fluctuation frequency suppression unit 320d and the level fluctuation frequency suppression unit 320e may have any configuration of the level fluctuation frequency suppression unit 320 in the first example embodiment described above. The optical delay interference control unit 330a outputs, based on an output level of the peak signals E2a and E2b having the level fluctuation frequency component being suppressed and information from the overdrive coefficient setting unit 340a, optical delay interference control signals C1a and C1b on which overdrive amplification is performed. The overdrive coefficient setting unit 340a may set, for each of the optical delay interference control signal C1a and the optical delay interference control signal C1b, a setting condition similar to the setting condition related to the optical delay interference control signal C1 set by the optical delay interference control unit 330 according to the first example embodiment. Information set in the overdrive coefficient setting unit 340a may be stored in advance in a recording device such as a memory, or may be set by a telemetry command transmitted from a ground station via the control device 60. Further, the optical delay interference control unit 330a outputs, based on an output level of the peak signal E2a having the level fluctuation frequency component being suppressed and information from the overdrive coefficient setting unit 340a, the optical delay interference control signal C1a on which overdrive amplification is performed, by a configuration similar to that of the optical delay interference control unit 330 according to the first example embodiment. Further, the optical delay interference control unit 330a may output, based on an output level of the peak signal E2b having the level fluctuation frequency component being suppressed and information from the overdrive coefficient setting unit 340a, the optical delay interference control signal C1b on which overdrive amplification is performed, by a configuration similar to that of the optical delay interference control unit 330 according to the first example embodiment. The optical delay interference control unit 330a performs feedback control on the optical delay interferometers 210a and 210b by the optical delay interference control signals C1a and C1b being an output from the optical delay interference control unit 330a and on which overdrive amplification is performed.

Also, in the optical receiver of the DQPSK method, similarly to the first example embodiment, the present modification example described above can improve detection capacity of a peak signal, and improve responsiveness of wavelength tracking in the optical delay interferometers 210a and 210b in a vacuum environment. As a result, the differential phase modulation/demodulation method can be applied to a space environment for satellite mounting.

Note that an example for a QPSK signal is illustrated, but the example is also applicable to reception of an optical signal of M-phase shift keying (M-PSK), M-quadrature amplitude modulation (M-QAM), and M-amplitude phase shift keying (M-APSK) in which M is equal to or more than a quaternary.

Second Example Embodiment

Figure 18:
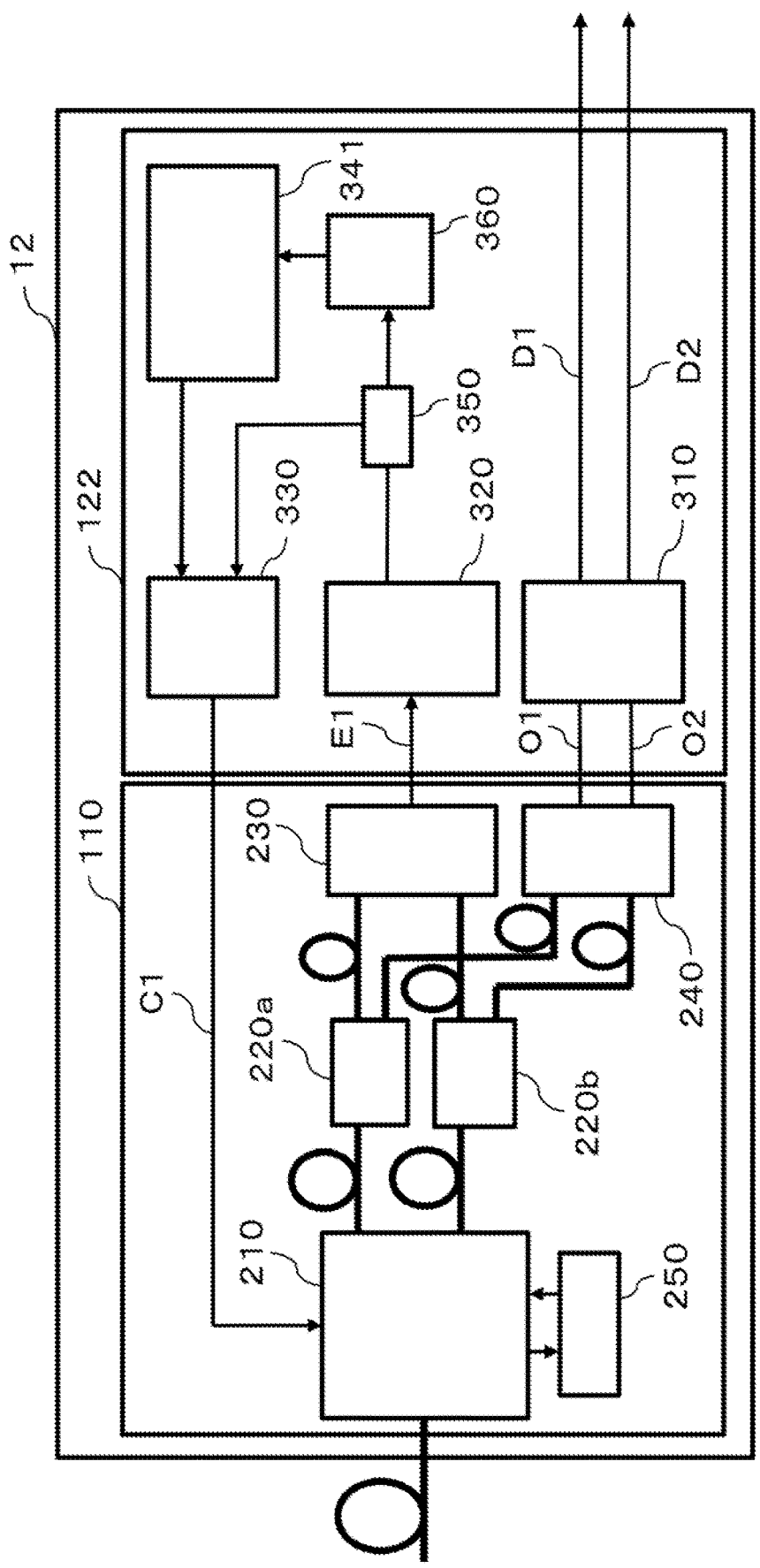
FIG. 18 is a configuration diagram of an optical receiver of a DPSK method according to a second example embodiment.

An optical receiver of a DPSK method according to a second example embodiment of the present invention will be described. FIG. 18 is a configuration diagram of the optical receiver of the DPSK method according to the second example embodiment of the present invention.

A configuration of an optical space communication system according to the present example embodiment is similar to that in FIG. 2. In the present example embodiment, an optical phase modulation signal is a BPSK signal of single polarization. An optical receiver 12 includes a differential light detection unit 110 having a configuration similar to that in the first example embodiment, and a digital signal processing unit 122 different from that in the first example embodiment.

The differential light detection unit 110 is a functional unit that detects phase information about an optical phase modulation signal by performing optical delay detection on the optical phase modulation signal as described above, and includes an optical delay interferometer 210, optical branching units 220a and 220b, a peak signal detection unit 230, a wide-band balanced optical detector 240, and a temperature control unit 250.

The digital signal processing unit 122 is a functional unit that performs digital signal processing on main signals O1 and O2 and a peak signal E1, and includes a data recovery unit 310, a level fluctuation frequency suppression unit 320, an optical delay interference control unit 330, an overdrive coefficient setting unit 341, a signal branching unit 350, and an overdrive amplification rate adjustment unit 360. The data recovery unit 310, the level fluctuation frequency suppression unit 320, and the optical delay interference control unit 333 have a configuration similar to that in the first example embodiment, but the overdrive coefficient setting unit 341 is different from that in the first example embodiment. Further, it is also different from the first example embodiment in a point that the digital signal processing unit 122 according to the present example embodiment includes the signal branching unit 350 and the overdrive amplification rate adjustment unit 360.

Similarly to the first example embodiment, an optical phase modulation signal input to the optical receiver 12 is input to the differential light detection unit 110, and the optical phase modulation signal input to the differential light detection unit 110 is input to the optical delay interferometer 210. Similarly to the first example embodiment, the optical delay interferometer 210 causes the optical phase modulation signal to interfere between adjacent bits, and a first optical signal and a second optical signal interfering with each other are output from the optical delay interferometer 210. Similarly to the first example embodiment, the first optical signal and the second optical signal interfering with each other are split by the optical branching unit 220a and the optical branching unit 220b, and the optical signals split by the optical branching unit 220a and the optical branching unit 220b are each input to the peak signal detection unit 230 and the wide-band balanced optical detector 240. Similarly to the first example embodiment, the peak signal detection unit 230 outputs the peak signal E1, and the wide-band balanced optical detector 240 outputs the main signals O1 and O2. Further, similarly to the first example embodiment, the temperature control unit 250 performs a temperature adjustment in such a way as to maintain a temperature of the optical delay interferometer 210 to be fixed.

Similarly to the first example embodiment, the main signal O1 and the main signal O2 input to the digital signal processing unit 122 are input to the data recovery unit 310, and the data recovery unit 310 recovers and outputs output data D1 and D2 by performing clock recovery, based on the main signals O1 and O2, and latching data by the recovered clock.

Further, the peak signal E1 input to the digital signal processing unit 122 is input to the level fluctuation frequency suppression unit 320 similar to that in the first example embodiment, and the level fluctuation frequency suppression unit 320 suppresses a level fluctuation frequency component of the input peak signal E1 and outputs a peak signal E2. The peak signal E2 is input to and split by the signal branching unit 350, and is input to the optical delay interference control unit 330 and the overdrive amplification rate adjustment unit 360.

Information originally set in the overdrive coefficient setting unit 341 may be stored in advance in a recording device such as a memory, or may be set by a telemetry command transmitted from a ground station via the control device 60.

The overdrive amplification rate adjustment unit 360 gradually changes an overdrive amplification rate A1 being, for example, a condition set in the overdrive coefficient setting unit 341, measures a convergence time of the peak signal E2 split by the signal branching unit 350, and determines an overdrive amplification rate A1a, based on the measured convergence time. The overdrive amplification rate adjustment unit 360 determines the overdrive amplification rate A1 in such a way that the convergence time falls within a predetermined target time, for example. The overdrive amplification rate adjustment unit 360 sets the determined overdrive amplification rate A1 in the overdrive amplification coefficient setting unit 341. The optical delay interference control unit 330 outputs, based on an output level of the peak signal E2 split by the signal branching unit 350 and information from the overdrive coefficient setting unit 341, an optical delay interference control signal C1 on which overdrive amplification is performed. The optical delay interference control unit 330 performs feedback control on the optical delay interferometer 210 by the optical delay interference control signal C1 on which overdrive amplification is performed.

Similarly to the first example embodiment and the modification example thereof, the present example embodiment described above can also improve detection capacity of a peak signal, and improve responsiveness of wavelength tracking in the optical delay interferometer 210 in a vacuum environment. As a result, the differential phase modulation/demodulation method can be applied to a space environment for satellite mounting.

Modification Example of Second Example Embodiment

Figure 19:
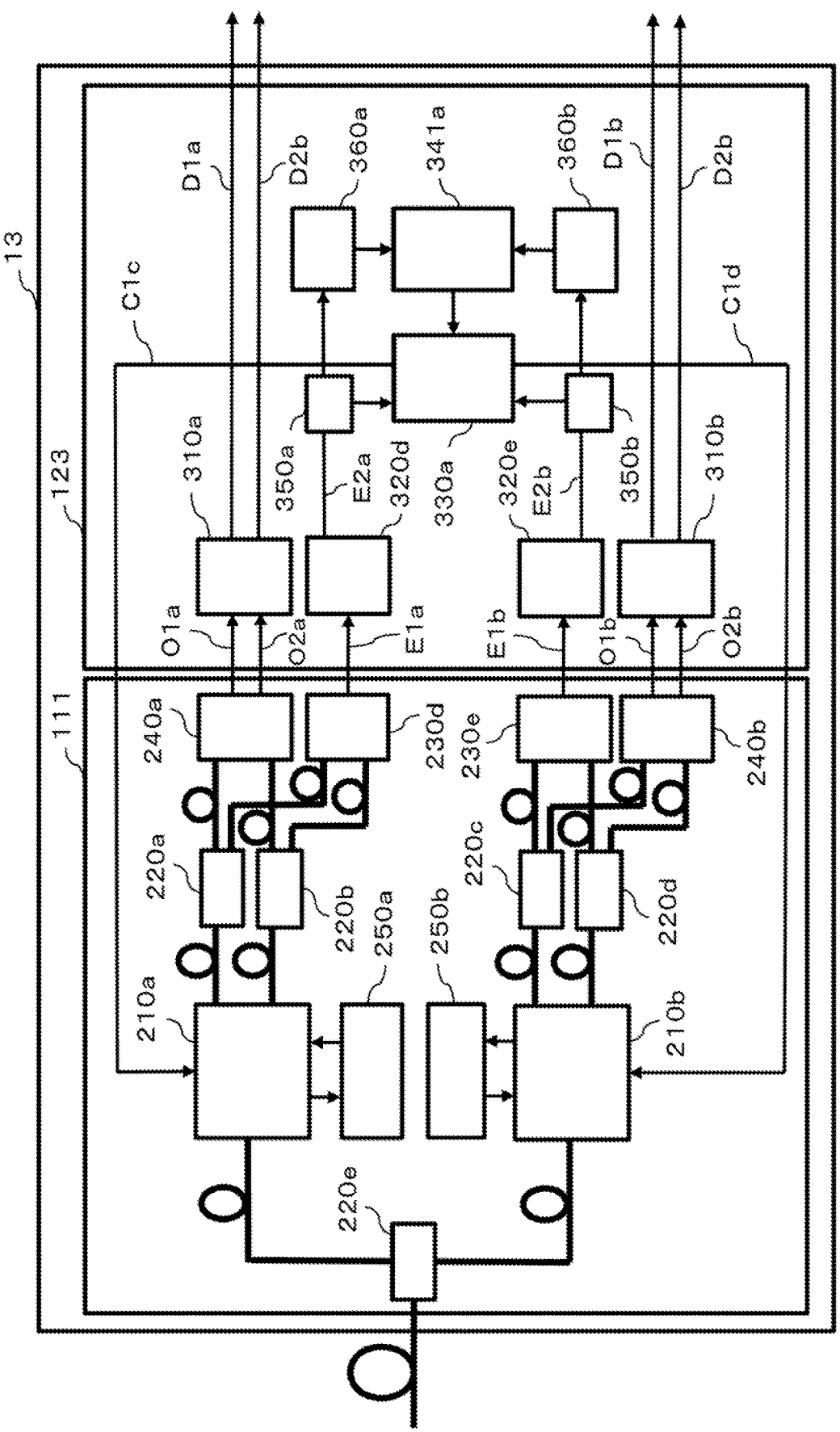
FIG. 19 is a configuration diagram of an optical receiver of a DQPSK method according to a modification example of the second example embodiment.

A modification example of the optical receiver according to the second example embodiment of the present invention will be described. FIG. 19 is a configuration diagram of an optical receiver of a DQPSK method according to the present modification example. Note that a configuration of an optical space communication system according to the present modification example is similar to that in FIG. 2. Similarly to the modification example of the first example embodiment described above, an optical phase modulation signal in the present modification example is a QPSK signal of single polarization. An optical receiver 13 includes a differential light detection unit 111 similar to that in the modification example of the first example embodiment described above, and a digital signal processing unit 123 different from that in the first example embodiment described above, the modification example thereof, and the second example embodiment.

Similarly to the modification example of the first example embodiment described above, the differential light detection unit 111 is a functional unit that detects phase information about an optical phase modulation signal by performing optical delay detection on the optical phase modulation signal. The differential light detection unit 111 includes optical delay interferometers 210a and 210b, optical branching units 220a, 220b, 220c, 220d, and 220e, peak signal detection units 230d and 230e, wide-band balanced optical detectors 240a and 240b, and temperature control units 250a and 250b that are similar to those in the modification example of the first example embodiment described above.

The digital signal processing unit 123 is a functional unit that performs digital signal processing on main signals O1a, O1b, O2a, and O2b and peak signals E1a and E1b. The digital signal processing unit 123 includes data recovery units 310a and 310b, level fluctuation frequency suppression units 320d and 320e, an optical delay interference control unit 330a, an overdrive coefficient setting unit 341a, signal branching units 350a and 350b, and overdrive amplification rate adjustment units 360a and 360b. The data recovery units 310a and 310b, the level fluctuation frequency suppression units 320d and 320e, and the optical delay interference control unit 330a are similar to those in the modification example of the first example embodiment described above, but the overdrive coefficient setting unit 341a is different from the overdrive coefficient setting unit 340a in the modification example of the first example embodiment. Further, it is also different from the modification example of the first example embodiment in a point that the digital signal processing unit 123 according to the present example embodiment includes the signal branching units 350a and 350b and the overdrive amplification rate adjustment units 360a and 360b.

Similarly to the modification example of the first example embodiment, an optical phase modulation signal input to the optical receiver 13 is input to the differential light detection unit 111, the optical phase modulation signal input to the differential light detection unit 111 is split by the optical branching unit 220e, and the split optical phase modulation signals are input to the optical delay interferometers 210a and 210b. Similarly to the modification example of the first example embodiment, the optical delay interferometers 210a and 210b each output a pair (two optical signals) of interfering optical signals. Therefore, similarly to the modification example of the first example embodiment, two pairs of the interfering optical signals are output from the optical delay interferometers 210a and 210b. Similarly to the modification example of the first example embodiment, the optical delay interferometers 210a splits an input optical phase modulation signal into two, performs a one-bit delay on one of the signals and performs a π/4 phase shift on the other signal, and outputs a pair of the optical signals (two optical signals) interfering with each other. Further, similarly to the modification example of the first example embodiment, the optical delay interferometers 210b splits an input optical phase modulation signal into two, performs a one-bit delay on one of the signals and performs a −π/4 phase shift on the other signal, and outputs a pair of the optical signals (two optical signals) interfering with each other.

Similarly to the modification example of the first example embodiment, the two optical signals output from the optical delay interferometer 210a are each split by the optical branching unit 220a and the optical branching unit 220b. The optical signals split by the optical branching unit 220a are each input to the peak signal detection unit 230d similar to the modification example of the first example embodiment and the wide-band balanced optical detector 240a similar to the wide-band balanced optical detector 240 in the first example embodiment. The optical signals split by the optical branching unit 220b are each input to the peak signal detection unit 230d and the wide-band balanced optical detector 240a. Similarly to the modification example of the first example embodiment, the peak signal detection unit 230d converts the two optical signals interfering with each other in the optical delay interferometer 210a into the peak signal E1a and outputs the peak signal E1a, and the wide-band balanced optical detector 240a converts the two optical signals interfering with each other in the optical delay interferometer 210a into the main signals O1a and O2a and outputs the main signals O1a and O2a. At this time, similarly to the modification example of the first example embodiment, the main signals O1a and O2a are main signals associated with an I-phase component of the optical phase modulation signal. Note that, similarly to the modification example of the first example embodiment, the peak signal detection unit 230d according to the present modification example may be configured by adding, to any of the configurations of the peak signal detection unit in the first example embodiment described above, a phase shift unit that performs a −π/4 phase shift on one of optical signals on which a π/4 phase shift is performed.

Similarly to the modification example of the first example embodiment, the two optical signals output from the optical delay interferometer 210b are each split by the optical branching unit 220c and the optical branching unit 220d. Similarly to the modification example of the first example embodiment, the two optical signals split by the optical branching unit 220c are each input to the peak signal detection unit 230e and the wide-band balanced optical detector 240b similar to the wide-band balanced optical detector 240 in the first example embodiment. Similarly to the modification example of the first example embodiment, the optical signals split by the optical branching unit 220d are each input to the peak signal detection unit 230e and the wide-band balanced optical detector 240b. Similarly to the modification example of the first example embodiment, the peak signal detection unit 230e converts the two optical signals interfering with each other in the optical delay interferometer 210b into the peak signal E1b and outputs the peak signal E1b, and the wide-band balanced optical detector 240b converts the two optical signals interfering with each other in the optical delay interferometer 210b into the main signals O1b and O2b and outputs the main signals O1b and O2b. At this time, similarly to the modification example of the first example embodiment, the main signals O1b and O2b are main signals associated with a Q-phase component of the optical phase modulation signal. Note that, similarly to the modification example of the first example embodiment, the peak signal detection unit 230e according to the present modification example may be configured by adding, to any of the configurations of the peak signal detection unit in the first example embodiment described above, a phase shift unit that performs a π/4 phase shift on one of optical signals on which a −π/4 phase shift is performed. Further, similarly to the modification example of the first example embodiment, the temperature control unit 250a and the temperature control unit 250b have a configuration similar to that of the temperature control unit 250 according to the first example embodiment, and performs a temperature adjustment in such a way as to maintain a temperature of the optical delay interferometers 210a and 210b to be fixed.

The main signal O1a and the main signal O2a associated with the I phase being input to the digital signal processing unit 123 are input to the data recovery unit 310a similar to that in the modification example of the first example embodiment. The data recovery unit 310a recovers and outputs output data D1a and D2a by performing clock recovery, based on the main signals O1a and O2a, and latching the main signals O1a and O2a by the recovered clock. Similarly to the modification example of the first example embodiment, the main signal O1b and the main signal O2b associated with the Q phase being input to the digital signal processing unit 123 are input to the data recovery unit 310b. The data recovery unit 310b recovers and outputs output data D1b and D2b by performing clock recovery, based on the main signals O1b and O2b, and latching the main signals O1b and O2b by the recovered clock.

Similarly to the modification example of the first example embodiment, the peak signal E1a input to the digital signal processing unit 123 is input to the level fluctuation frequency suppression unit 320d, and the peak signal E1b input to the digital signal processing unit 123 is input to the level fluctuation frequency suppression unit 320e. Similarly to the modification example of the first example embodiment, the level fluctuation frequency suppression unit 320d suppresses a level fluctuation frequency component of the input peak signal E1a and outputs a peak signal E2a to the signal branching unit 350a, and the level fluctuation frequency suppression unit 320e suppresses a level fluctuation frequency component of the input peak signal E1b and outputs a peak signal E2b to the signal branching unit 350b. The signal branching unit 350a splits the peak signal E2a, and inputs the split peak signal E2a to the optical delay interference control unit 333a and the overdrive amplification rate adjustment unit 360a. The signal branching unit 350b splits the peak signal E2b, and inputs the split peak signal E2b to the optical delay interference control unit 333a and the overdrive amplification rate adjustment unit 360b. Information originally set in the overdrive coefficient setting unit 341a may be stored in advance in a recording device such as a memory, or may be set by a telemetry command transmitted from a ground station via the control device 60. The overdrive amplification rate adjustment unit 360a gradually changes an overdrive amplification rate A1a being a condition set in the overdrive coefficient setting unit 341a, measures a convergence time of the peak signal E2a split by the signal branching unit 350a, and determines the overdrive amplification rate A1a, based on the measured convergence time. The overdrive amplification rate adjustment unit 360a determines the overdrive amplification rate A1a in such a way that the convergence time falls within a predetermined target time, for example. The overdrive amplification rate adjustment unit 360b gradually changes an overdrive amplification rate A1b being a condition set in the overdrive coefficient setting unit 341a, measures a convergence time of the peak signal E2b split by the signal branching unit 350b, and determines the overdrive amplification rate A1b, based on the measured convergence time. The overdrive amplification rate adjustment unit 360b determines the overdrive amplification rate A1b in such a way that the convergence time falls within a predetermined target time, for example. The overdrive amplification rate adjustment units 360a and 360b set the determined overdrive amplification rates Ala and Alb in the overdrive amplification coefficient setting unit 341a.

The optical delay interference control unit 330a outputs, based on an output level of the peak signals E2a and E2b having the level fluctuation frequency component being suppressed and information from the overdrive coefficient setting unit 341a, optical delay interference control signals C1c and C1d on which overdrive amplification is performed. The optical delay interference control unit 330a performs feedback control on the optical delay interferometer 210a by the optical delay interference control signal C1c, and performs feedback control on the optical delay interferometer 210b by the optical delay interference control signal C1d.

Similarly to the first example embodiment, the modification example thereof, and the second example embodiment, the present modification example described above can also improve detection capacity of a peak signal, and improve responsiveness of wavelength tracking in the optical delay interferometer 210 in a vacuum environment. As a result, the differential phase modulation/demodulation method can be applied to a space environment for satellite mounting.

Note that an example for a QPSK signal is illustrated, but the example is also applicable to reception of an optical signal of M-PSK, M-QAM, and M-APSK in which M is equal to or more than a quaternary.

Third Example Embodiment

An optical space communication system according to a third example embodiment of the present invention will be described. A configuration diagram of the optical space communication system according to the present example embodiment is the same as that in FIG. 2.

Figure 20:
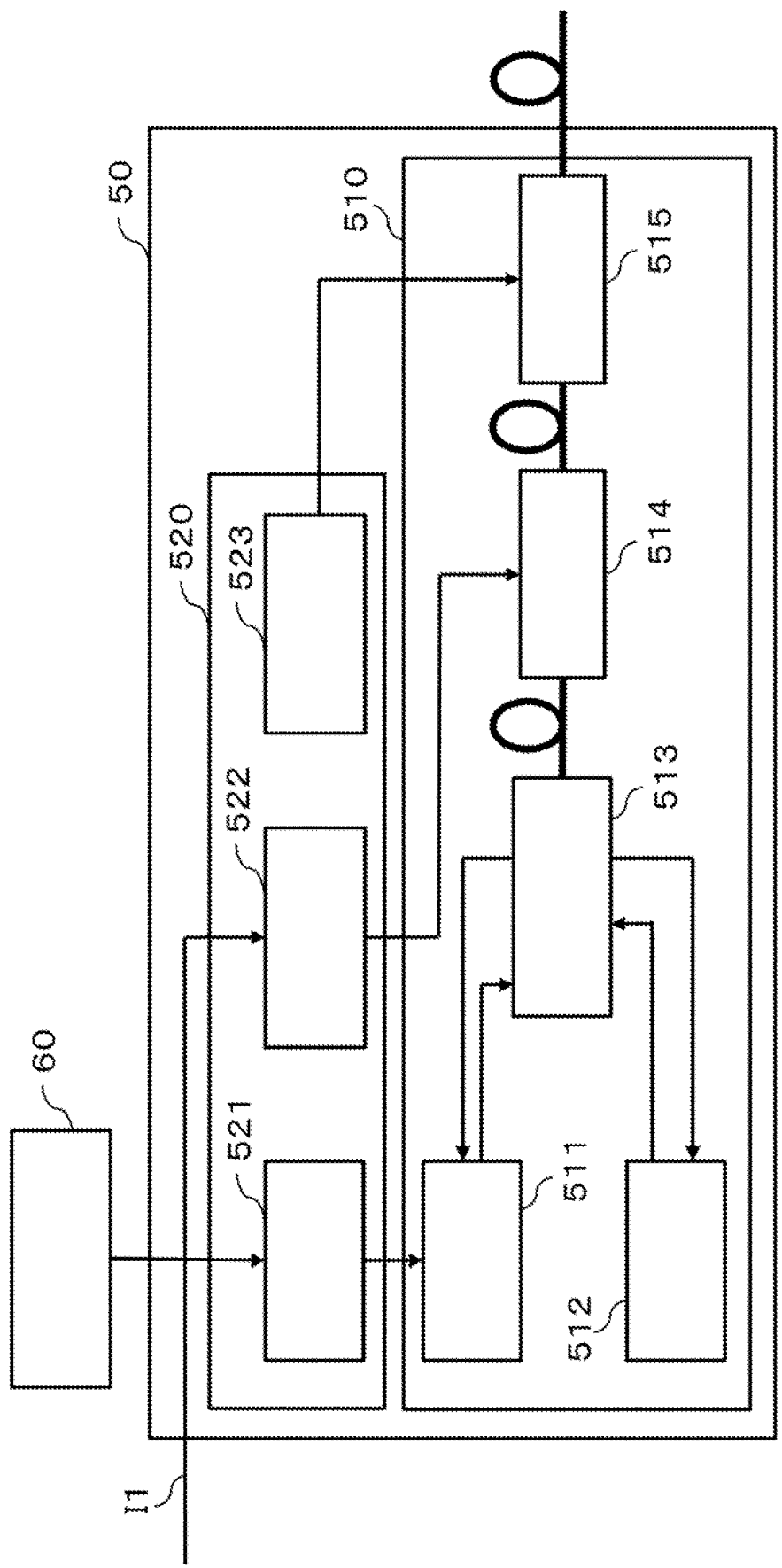
FIG. 20 is a configuration diagram of an optical transmitter constituting an optical space communication system according to a third example embodiment.

FIG. 20 is a configuration diagram of an optical transmitter constituting the optical space communication system according to the third example embodiment of the present invention. An optical phase modulation signal output from an optical transmitter 50 according to the present example embodiment is a BPSK signal of return-to-zero (RZ) of single polarization. The optical transmitter 50 includes an optical transmission unit 510 and a digital signal processing unit 520. Further, a control device 60 inputs, to the optical transmitter 50, satellite orbit information, a Doppler frequency, or a laser drive current value.

The optical transmission unit 510 includes a laser drive current control unit 511, a laser temperature control unit 512, a transmission laser unit 513, an optical phase modulation unit 514, and an optical intensity modulation unit 515.

The digital signal processing unit 520 includes a Doppler frequency control unit 521, a signal generation unit 522, and a clock generation unit 523.

Satellite orbit information, a Doppler frequency, or a laser drive current value is input from the control device 60 to the optical transmitter 50. The satellite orbit information, the Doppler frequency, or the laser drive current value from the control device 60 is input to the digital signal processing unit 520, and the satellite orbit information, the Doppler frequency, or the laser drive current value input to the digital signal processing unit 520 is input to the Doppler frequency control unit 521. The Doppler frequency control unit 521 outputs, to the optical transmission unit 510, the laser drive current value causing an optical wavelength that cancels out the Doppler frequency generated on a satellite orbit, and the laser drive current value output to the optical transmission unit 510 is set in the laser drive current control unit 511. The laser drive current control unit 511 sets, in the transmission laser unit 513, the laser drive current value causing an optical wavelength that cancels out the Doppler frequency generated on the satellite orbit, and causes laser light from the transmission laser unit 513 to be output. On the other hand, the laser temperature control unit 512 controls a temperature of the transmission laser unit 513 to be fixed.

Input data I1 are input to the optical transmitter 50. The input data I1 are input to the digital signal processing unit 520, and the input data I1 input to the digital signal processing unit 520 are input to the signal generation unit 522. The signal generation unit 522 generates an input signal according to the input data I1. The input signal is input to the optical phase modulation unit 514 via the optical transmission unit 510. The optical phase modulation unit 514 performs modulation on the laser light output from the transmission laser unit 513, based on the input signal from the signal generation unit 522. A binary phase modulation signal of non-return-to-zero (NRZ) is output from the optical phase modulation unit 514. A clock signal generated from the clock generation unit 523 constituting the digital signal processing unit 520 is input to the optical transmission unit 510, and the clock signal input to the optical transmission unit 510 is input to the optical intensity modulation unit 515. The optical intensity modulation unit 515 performs modulation of RZ on the BPSK signal of NRZ output from the optical phase modulation unit 514, based on the clock signal from the clock generation unit 523. A binary phase modulation signal of RZ is output from the optical intensity modulation unit 515.

Figure 21:
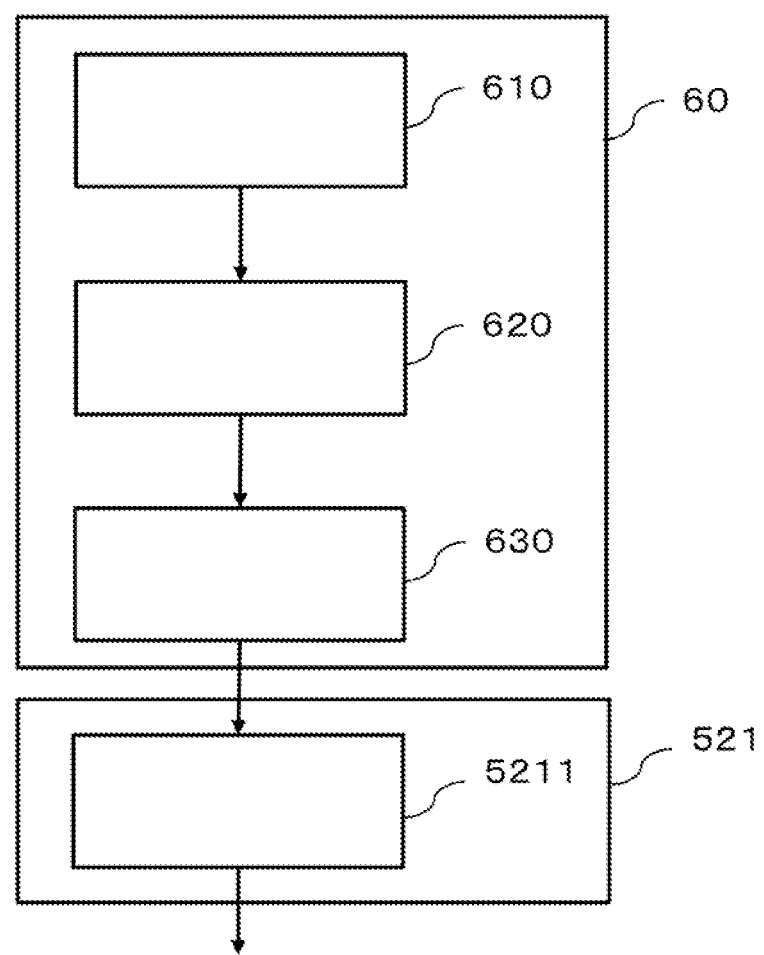
FIG. 21 is a block diagram illustrating a first configuration example of a control device and a Doppler frequency control unit in FIG. 20.

FIG. 21 is a block diagram illustrating a first configuration example of the control device and the Doppler frequency control unit in FIG. 20. As illustrated in FIG. 21, the control device 60 includes a satellite orbit information setting unit 610, a Doppler frequency calculation unit 620, and a laser drive current calculation unit 630, and the Doppler frequency control unit 521 includes a laser drive current setting unit 5211.

The satellite orbit information setting unit 610 constituting the control device 60 inputs satellite orbit information stored in the satellite orbit information setting unit 610 to the Doppler frequency calculation unit 620. The Doppler frequency calculation unit 620 calculates a Doppler frequency generated on a satellite orbit, based on the satellite orbit information. The Doppler frequency calculated by the Doppler frequency calculation unit 620 is input to the laser drive current calculation unit 630. The laser drive current calculation unit 630 calculates a laser drive current value causing an optical wavelength that cancels out the Doppler frequency generated on the satellite orbit, based on the Doppler frequency calculated by the Doppler frequency calculation unit 620. At this time, the laser drive current value is calculated from a relationship between the laser drive current value and an optical wavelength when a temperature is controlled to be fixed by the laser temperature control unit 512. The laser drive current value calculated by the laser drive current calculation unit 630 is output to the Doppler frequency control unit 521, and the laser drive current value output to the Doppler frequency control unit 521 is set in the laser drive current setting unit 5211. The laser drive current value set in the laser drive current setting unit 5211 is passed to the laser drive current control unit 511.

Note that the Doppler frequency calculation unit 620 and the laser drive current calculation unit 630 constituting the control device 60 may be configured to be included in the Doppler frequency control unit 521. Further, only the laser drive current calculation unit 630 constituting the control device 60 may be configured to be included in the Doppler frequency control unit 521.

Satellite orbit information set in the satellite orbit information setting unit 610 set in the control device 60 may be stored in advance in a recording device such as a memory, or may be set by a telemetry command transmitted from a ground station.

Figure 22:
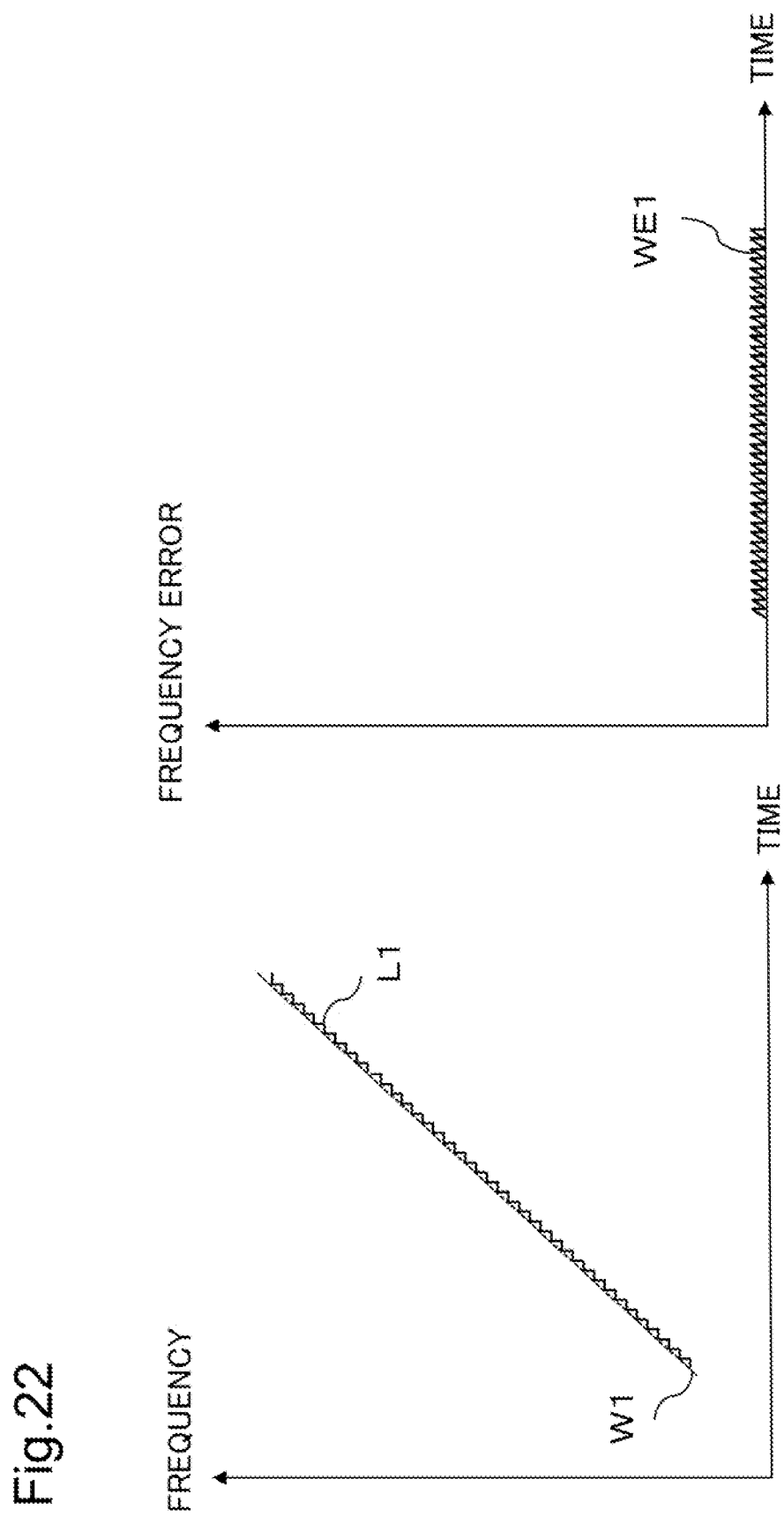
FIG. 22 is a diagram illustrating an optical frequency W1 when being affected by a Doppler frequency on a satellite orbit, an optical frequency L1 that can cancel out the Doppler frequency generated on the satellite orbit when a laser drive current control unit is controlled at a short time interval, and a frequency error WE1 that remains when an optical receiver receives an optical phase modulation signal.

FIG. 22 illustrates an optical frequency W1 when being affected by a Doppler frequency on a satellite orbit, an optical frequency L1 that can cancel out the Doppler frequency generated on the satellite orbit when the laser drive current control unit 511 is controlled at a short time interval, and a frequency error WE1 that remains when an optical receiver 10 receives an optical phase modulation signal. For the sake of simplification, it is assumed that a Doppler frequency fluctuation speed is fixed. At this time, the short time interval is equal to or shorter than one second. The frequency error WE1 is $$WE1=|W1-L1|.$$

$$0 \le WE1 \le +B/4$$

When the relationship described above holds true, the optical receiver 10 can receive an optical phase modulation signal with the frequency error WE1 remaining. Note that B indicates a symbol rate of the optical phase modulation signal.

Note that FIG. 22 illustrates control when W1 has a wavelength longer than that of L1, but a wavelength may be controlled when L1 has a wavelength longer than that of W1.

Figure 23:
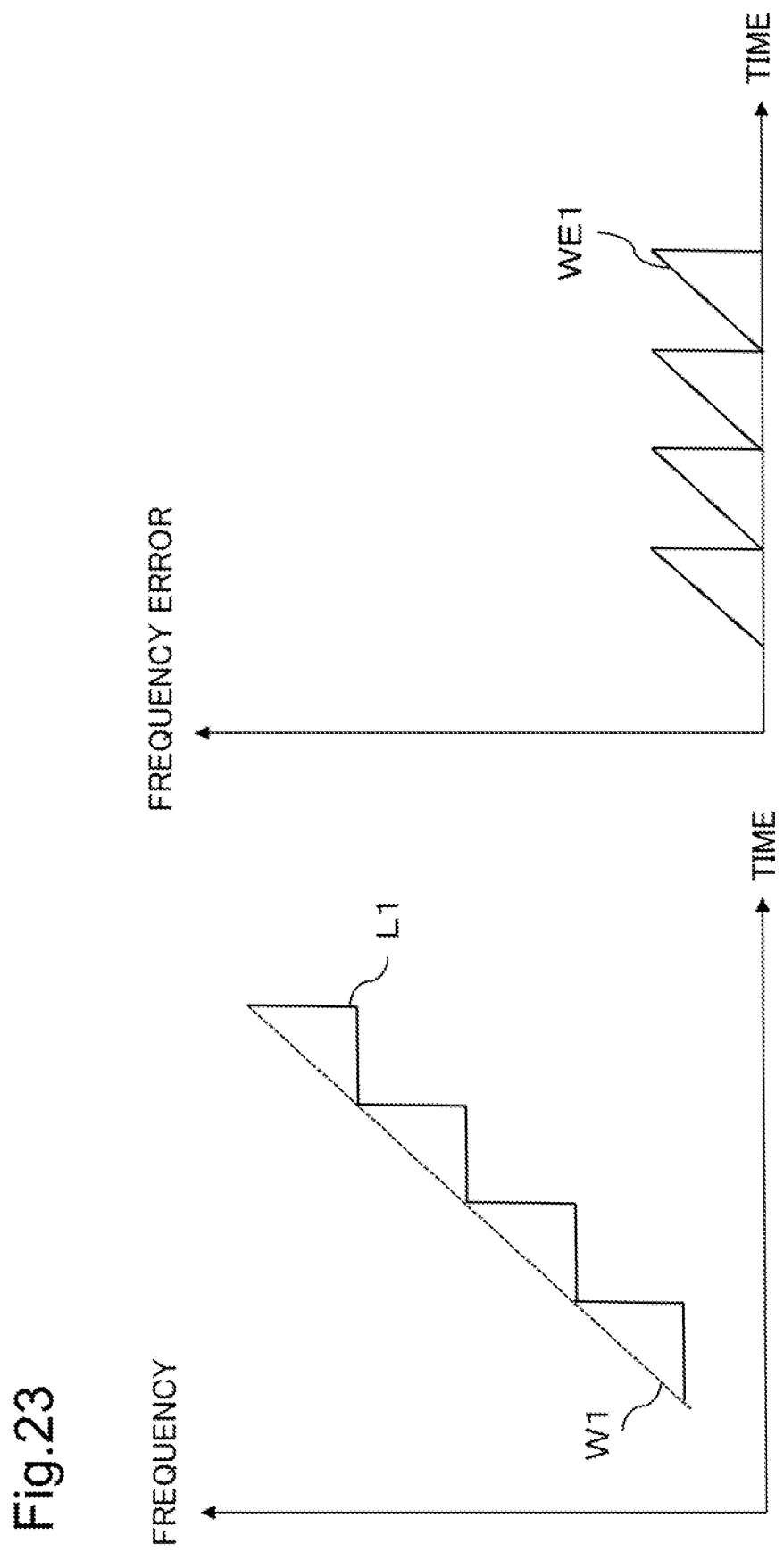
FIG. 23 illustrates an optical frequency W1 when being affected by a Doppler frequency on a satellite orbit, an optical frequency L1 that can cancel out the Doppler frequency generated on the satellite orbit when the laser drive current control unit is controlled at a long time interval, and a frequency error WE1 that remains when the optical receiver receives an optical phase modulation signal.

FIG. 23 illustrates an optical frequency W1 when being affected by a Doppler frequency on a satellite orbit, an optical frequency L1 that can cancel out the Doppler frequency generated on the satellite orbit when the laser drive current control unit is controlled at a long time interval, and a frequency error WE1 that remains when the optical receiver receives an optical phase modulation signal. For the sake of simplification, it is assumed that a Doppler frequency fluctuation speed is fixed. At this time, the long time interval is equal to or longer than one second. The frequency error WE1 is $$WE1=|W1-L1|.$$

$$0 \le WE1 \le +B/4$$

When the relationship described above holds true, the optical receiver 10 can receive an optical phase modulation signal with the frequency error WE1 remaining. Note that B indicates a symbol rate of the optical phase modulation signal.

Note that FIG. 23 illustrates control when W1 has a wavelength longer than that of L1, but a wavelength may be controlled when L1 has a wavelength longer than that of W1.

Figure 24:
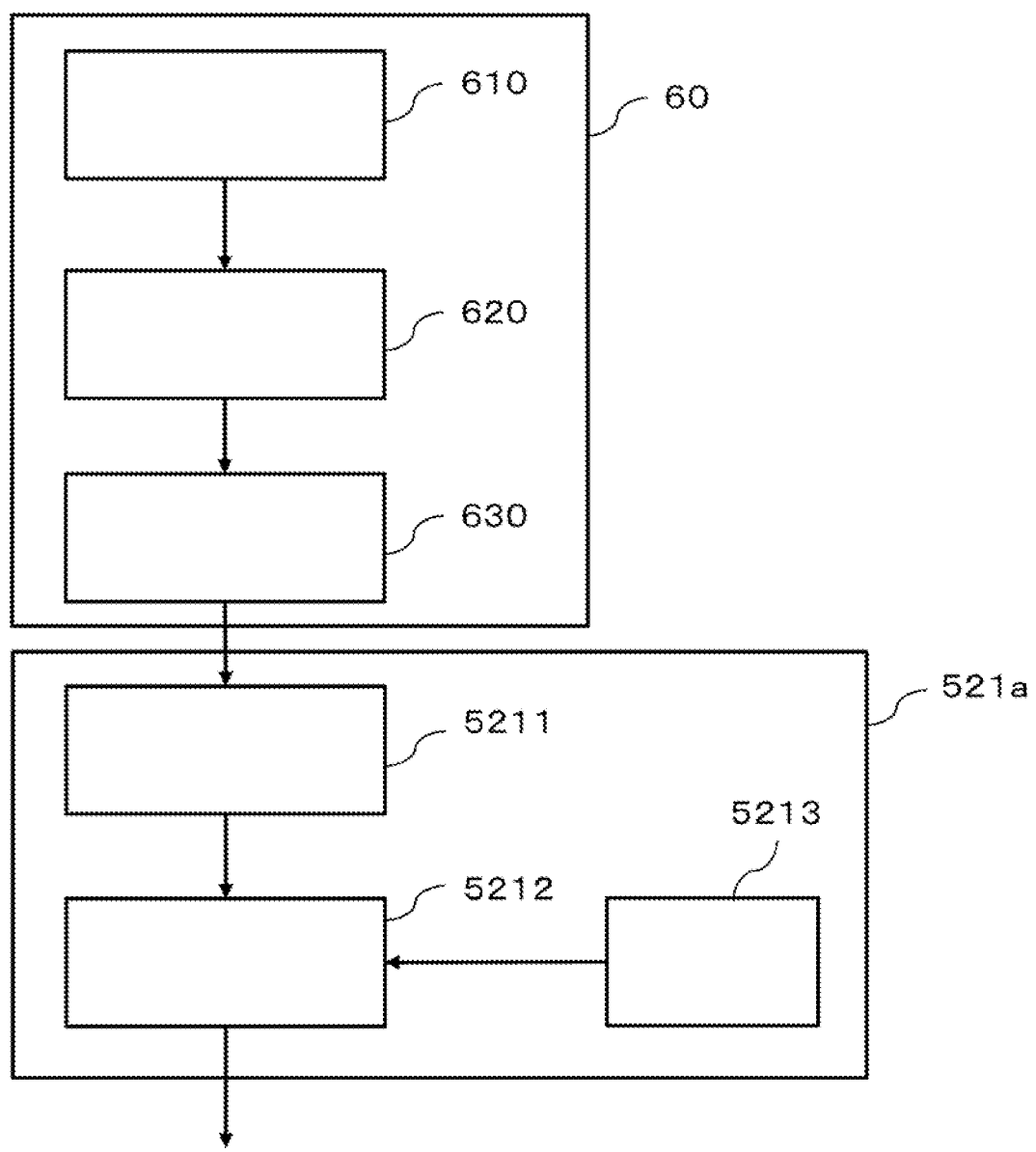
FIG. 24 is a block diagram illustrating a second configuration example of the control device and the Doppler frequency control unit in FIG. 20.

FIG. 24 is a block diagram illustrating a second configuration example of the control device and the Doppler frequency control unit in FIG. 20. As illustrated in FIG. 24, the control device 60 includes a satellite orbit information setting unit 610, a Doppler frequency calculation unit 620, and a laser drive current calculation unit 630, similarly to the first configuration example. Further, a Doppler frequency control unit 521a includes a laser drive current setting unit 5211 similar to that in the first configuration example, and a filter processing unit 5212 and a filter band setting unit 5213 that are not in the first configuration example.

Similarly to the first configuration example, the satellite orbit information setting unit 610 constituting the control device 60 inputs satellite orbit information stored in the satellite orbit information setting unit 610 to the Doppler frequency calculation unit 620. The Doppler frequency calculation unit 620 calculates a Doppler frequency generated on a satellite orbit, based on the satellite orbit information. The Doppler frequency calculated by the Doppler frequency calculation unit 620 is input to the laser drive current calculation unit 630. Similarly to the first configuration example, the laser drive current calculation unit 630 calculates a laser drive current value causing an optical wavelength that cancels out the Doppler frequency generated on the satellite orbit, based on the Doppler frequency calculated by the Doppler frequency calculation unit 620. At this time, similarly to the first configuration example, the laser drive current value is calculated from a relationship between the laser drive current value and an optical wavelength when a temperature is controlled to be fixed by the laser temperature control unit 512. The laser drive current value calculated by the laser drive current calculation unit 630 is input to the Doppler frequency control unit 521a, and the laser drive current value input to the Doppler frequency control unit 521a is set in the laser drive current setting unit 5211. The laser drive current value set in the laser drive current setting unit 5211 is subjected to filter processing in the filter processing unit 5212. By the filter processing of the filter processing unit 5212, a laser drive current value that becomes smooth instead of having a step shape is output. A filter band of the filter processing unit 5212 is set based on filter band information from the filter band setting unit 5213. The laser drive current value that becomes smooth in the filter processing unit 5212 is passed to the laser drive current control unit 511.

Note that the Doppler frequency calculation unit 620 and the laser drive current calculation unit 630 constituting the control device 60 may be configured to be included in the Doppler frequency control unit 521. Further, only the laser drive current calculation unit 630 constituting the control device 60 may be configured to be included in the Doppler frequency control unit 521.

Satellite orbit information set in the satellite orbit information setting unit 610 set in the control device 60 may be stored in advance in a recording device such as a memory, or may be set by a telemetry command transmitted from a ground station. Filter band information set in the filter band setting unit 5213 may be stored in advance in a recording device such as a memory, or may be set by a telemetry command transmitted from a ground station via the control device 60.

Figure 25:
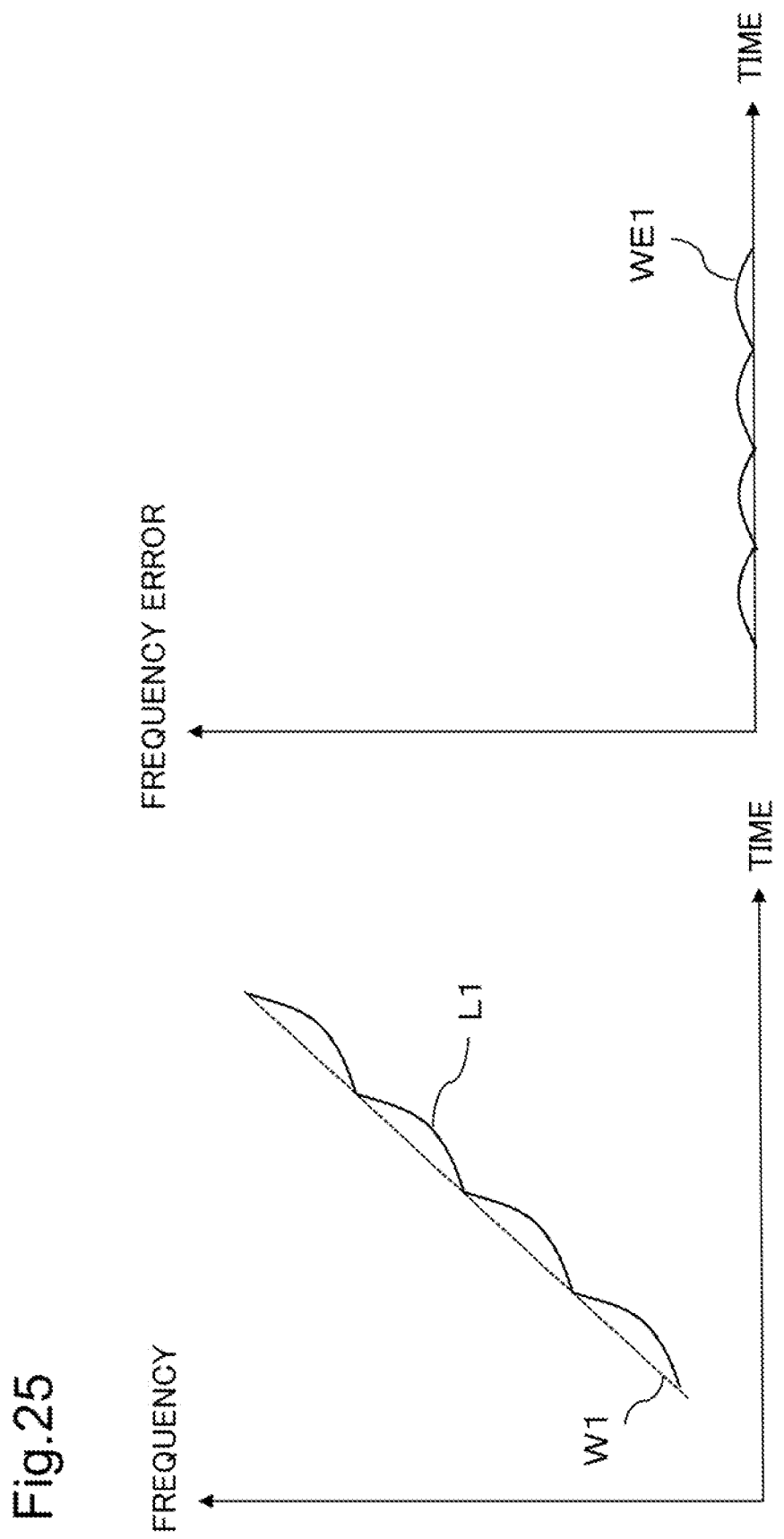
FIG. 25 is a diagram illustrating an optical frequency W1 when being affected by a Doppler frequency on a satellite orbit, an optical frequency L1 that can cancel out the Doppler frequency generated on the satellite orbit when the laser drive current control unit is controlled at a long time interval, and a frequency error WE1 that remains when the optical receiver receives an optical phase modulation signal.

FIG. 25 illustrates an optical frequency W1 when being affected by a Doppler frequency on a satellite orbit, an optical frequency L1 that can cancel out the Doppler frequency generated on the satellite orbit when the laser drive current control unit is controlled at a long time interval, and a frequency error WE1 that remains when the optical receiver receives an optical phase modulation signal. For the sake of simplification, it is assumed that a Doppler frequency fluctuation speed is fixed. At this time, the long time interval is equal to or longer than one second. Further, the transmission laser unit 513 is driven at a laser drive current value that becomes smooth by the filter processing unit 5212, and thus the optical frequency L1 that can cancel out the Doppler frequency generated on the satellite orbit becomes an optical frequency that is smooth as indicated by the optical frequency L1. With the smooth optical frequency L1, the frequency error WE1 in FIG. 25 can become smaller than the frequency error WE1 in FIG. 23. The frequency error WE1 is $$WE1 = |W1 - L1|.$$

$$0 \le WE1 \le +B/4$$

When the relationship described above holds true, the optical receiver 10 can receive an optical phase modulation signal with the frequency error WE1 remaining. Note that B indicates a symbol rate of the optical phase modulation signal.

Note that FIG. 25 illustrates control when W1 has a wavelength longer than that of L1, but a wavelength may be controlled when L1 has a wavelength longer than that of W1.

Effect of Third Example Embodiment

When a transmitter on a satellite orbit transmits an optical signal having a fixed frequency, a frequency fluctuation due to a Doppler effect occurs in an optical signal received by a receiver unless the receiver moves at the same speed in the same direction as the transmitter. Thus, the receiver needs to perform an adjustment to a delay amount according to a Doppler frequency in addition to an adjustment to a delay amount according to an environmental temperature, which becomes a factor that wavelength tracking is difficult to converge in the receiver. Particularly, in optical space communication between orbiting satellites that move in an opposite direction on an orbit, such as inter-satellite optical communication, a great Doppler frequency is generated, and a load on wavelength tracking by the optical delay interferometer 210 increases.

By calculating a Doppler frequency generated on a satellite orbit, based on satellite orbit information, calculating a laser drive current value causing an optical wavelength that cancels out the Doppler frequency, and setting the calculated laser drive current value in the laser drive current setting unit 5211, the third example embodiment can reduce a load on a delay amount adjustment according to the Doppler frequency, and can suppress an influence of the Doppler frequency on wavelength tracking.

Modification Example of Third Example Embodiment

Figure 26:
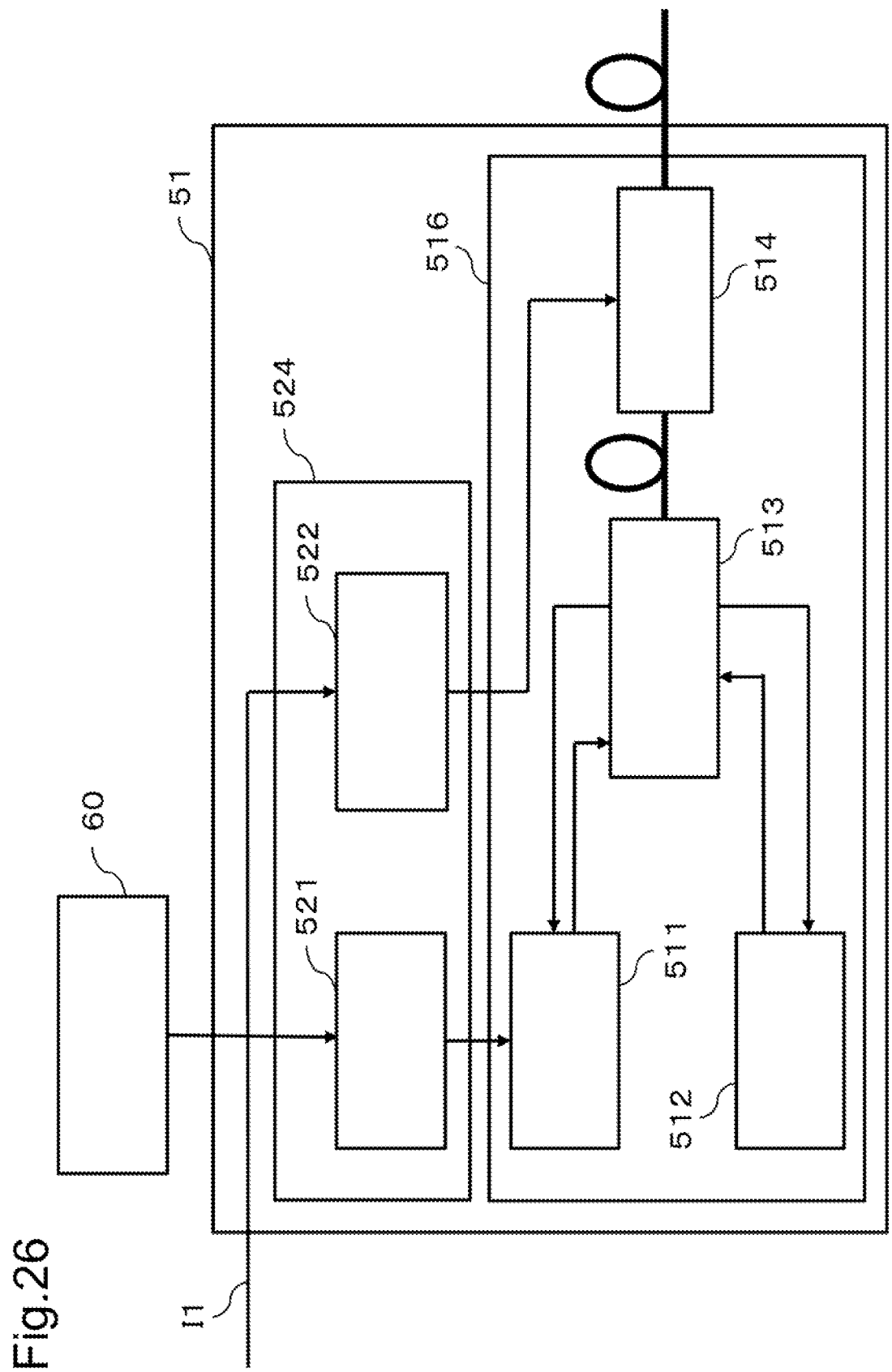
FIG. 26 is a configuration diagram of an optical transmitter that constitutes an optical space communication system according to a first modification example of the third example embodiment, and outputs an optical phase modulation signal being a BPSK signal of NRZ of single polarization.

An optical transmitter constituting an optical space communication system according to a first modification example of the third example embodiment of the present invention will be described. FIG. 26 is a configuration diagram of the optical transmitter constituting the optical space communication system according to the first modification example of the third example embodiment of the present invention. The optical transmitter according to the present modification example outputs an optical phase modulation signal being a BPSK signal of NRZ of single polarization. An optical transmitter 51 according to the present modification example includes an optical transmission unit 516 and a digital signal processing unit 524. Further, similarly to the third example embodiment, a control device 60 inputs, to the optical transmitter 51, satellite orbit information, a Doppler frequency, or a laser drive current value.

The optical transmission unit 516 according to the present modification example includes a laser drive current control unit 511, a laser temperature control unit 512, a transmission laser unit 513, and an optical phase modulation unit 514, but does not include an optical intensity modulation unit 515 in contrast to the third example embodiment. Further, the digital signal processing unit 524 according to the present modification example includes a Doppler frequency control unit 521 and a signal generation unit 522, but does not include a clock generation unit 523 in contrast to the third example embodiment.

Satellite orbit information, a Doppler frequency, or a laser drive current value from the control device 60 is input to the optical transmitter 51. The satellite orbit information, the Doppler frequency, or the laser drive current value from the control device 60 is input to the digital signal processing unit 524, and the satellite orbit information, the Doppler frequency, or the laser drive current value input to the digital signal processing unit 524 is input to the Doppler frequency control unit 521. The Doppler frequency control unit 521 inputs the laser drive current value to the optical transmission unit 516, and the laser drive current value input to the optical transmission unit 516 is set in the laser drive current control unit 511. The laser drive current control unit 511 sets the laser drive current value in the transmission laser unit 513, and causes laser light to be output from the transmission laser unit 513. On the other hand, the laser temperature control unit 512 controls a temperature of the transmission laser unit 513 to be fixed.

Input data I1 are input to the optical transmitter 51. The input data I1 are input to the digital signal processing unit 524, and the input data I1 input to the digital signal processing unit 524 are input to the signal generation unit 522. The signal generation unit 522 generates an input signal according to the input data I1. The input signal is input to the optical transmission unit 516, and the input signal input to the optical transmission unit 516 is input to the optical phase modulation unit 514.

The optical phase modulation unit 514 performs modulation on the laser light output from the transmission laser unit 513, based on the input signal from the signal generation unit 522. A BPSK signal of NRZ is output from the optical phase modulation unit 514.

Figure 27:
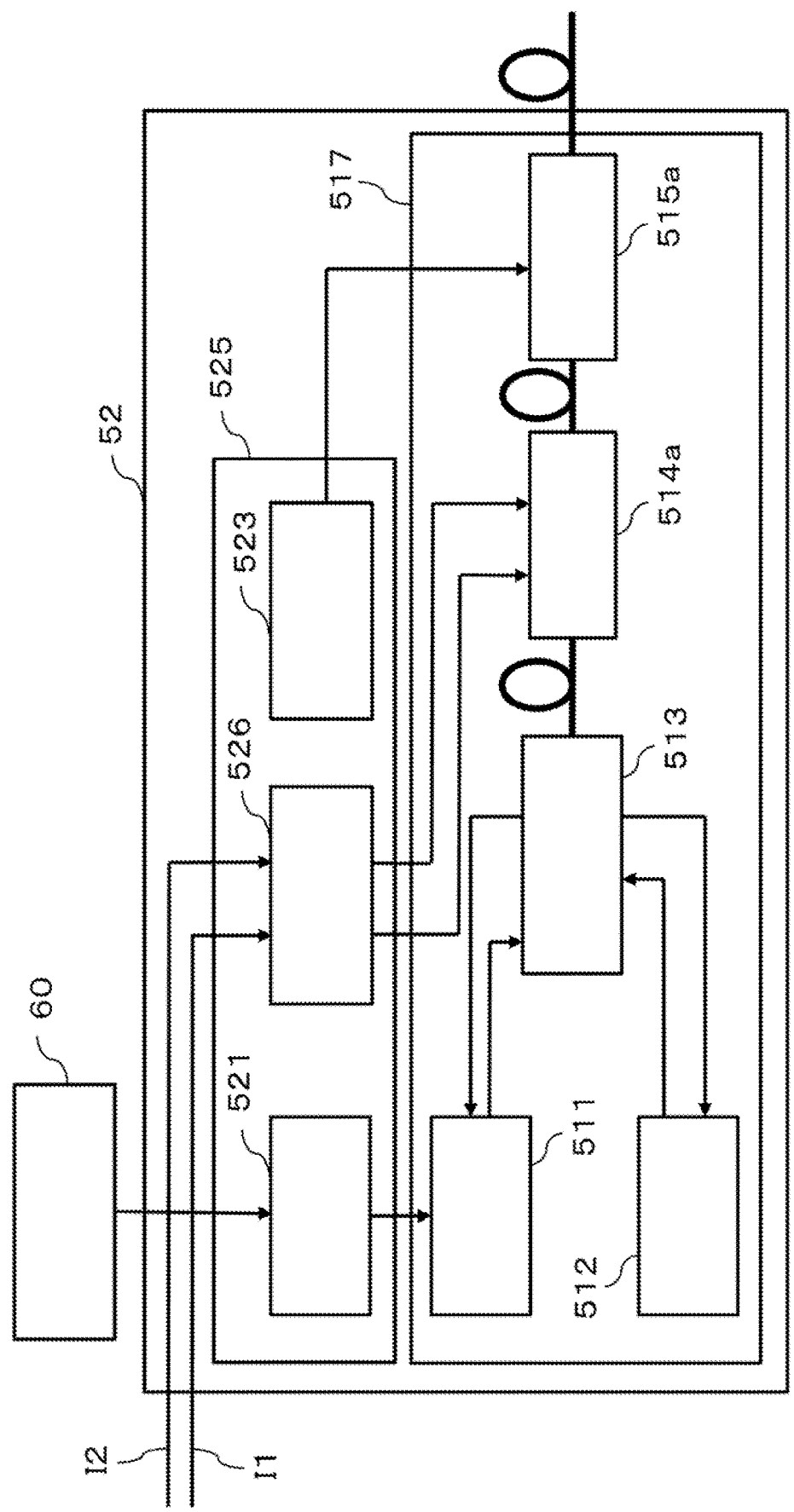
FIG. 27 is a configuration diagram of an optical transmitter that constitutes an optical space communication system according to a second modification example of the third example embodiment, and outputs an optical phase modulation signal being a QPSK signal of RZ of single polarization.

An optical transmitter constituting an optical space communication system according to a second modification example of the third example embodiment of the present invention will be described. FIG. 27 is a configuration diagram of the optical transmitter that constitutes the optical space communication system according to the second modification example of the third example embodiment of the present invention, and outputs an optical phase modulation signal being a QPSK signal of RZ of single polarization. An optical transmitter 52 includes an optical transmission unit 517 and a digital signal processing unit 525. Further, a control device 60 inputs, to the optical transmitter 52, satellite orbit information, a Doppler frequency, or a laser drive current value.

The optical transmission unit 517 according to the present modification example includes a laser drive current control unit 511, a laser temperature control unit 512, a transmission laser unit 513, an optical IQ modulation unit 514a, and an optical intensity modulation unit 515a.

Further, the digital signal processing unit 525 according to the present modification example includes a Doppler frequency control unit 521, a signal generation unit 526, and a clock generation unit 523.

Satellite orbit information, a Doppler frequency, or a laser drive current value from the control device 60 is input to an optical transmitter 50. The satellite orbit information, the Doppler frequency, or the laser drive current value from the control device 60 is input to the digital signal processing unit 525, and the satellite orbit information, the Doppler frequency, or the laser drive current value input to the digital signal processing unit 525 is input to the Doppler frequency control unit 521.

The Doppler frequency control unit 521 inputs the laser drive current value to the optical transmission unit 517, and the laser drive current value input to the optical transmission unit 517 is set in the laser drive current control unit 511. The laser drive current control unit 511 sets the laser drive current value in the transmission laser unit 513, and causes laser light from the transmission laser unit 513 to be output. On the other hand, the laser temperature control unit 512 controls a temperature of the transmission laser unit 513 to be fixed.

Input data I1 and I2 are input to the optical transmitter 52. The input data I1 and I2 are input to the digital signal processing unit 525, and the input data I1 and I2 input to the digital signal processing unit 525 are input to the signal generation unit 526. The signal generation unit 526 generates an input signal according to the input data I1 and I2. The input signal is input to the optical transmission unit 517, and the input signal input to the optical transmission unit 517 is input to the optical IQ modulation unit 514a. The optical IQ modulation unit 514a performs modulation on the laser light output from the transmission laser unit 513, based on the input signal from the signal generation unit 526. A QPSK signal of NRZ is output from the optical IQ modulation unit 514a. A clock signal generated from the clock generation unit 523 constituting the digital signal processing unit 525 is input to the optical transmission unit 517, and is input to the optical intensity modulation unit 515a at the same time. The optical intensity modulation unit 515a performs modulation of RZ on the QPSK signal of NRZ output from the optical IQ modulation unit 514a, based on the clock signal from the clock generation unit 523. A QPSK signal of RZ is output from the optical intensity modulation unit 515a.

Figure 28:
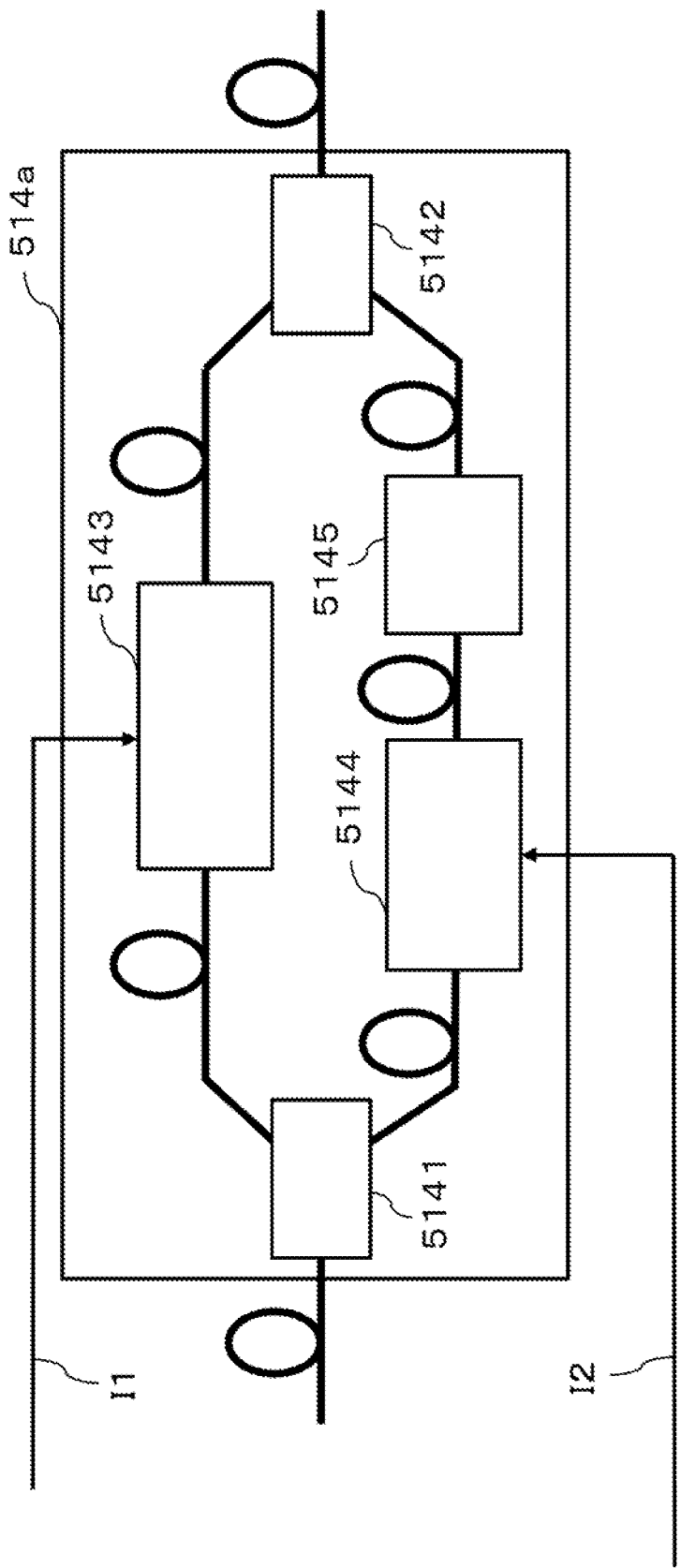
FIG. 28 is a block diagram illustrating one example of an optical IQ modulation unit in FIG. 27.

FIG. 28 illustrates one example of the optical IQ modulation unit in FIG. 27. In FIG. 28, the optical IQ modulation unit 514a includes an optical branching unit 5141, an optical multiplexing unit 5142, optical phase modulation units 5143 and 5144, and an optical phase adjustment unit 5145. Laser light from the transmission laser unit 513 is input to the optical IQ modulation unit 514a, and the laser light input to the optical IQ modulation unit 514a is split by the optical branching unit 5141. Each beam of output light from the optical branching unit 5141 is input to the optical phase modulation units 5143 and 5144. The optical phase modulation units 5143 and 5144 perform modulation on the output light from the optical branching unit 5141, based on the input data I1 and I2, and outputs a binary optical phase modulation signal. The binary optical phase modulation signal from the optical phase modulation unit 5144 is input to the optical phase adjustment unit 5145. The optical phase adjustment unit 5145 performs a phase shift of $\pi/2$ on the binary optical phase modulation signal. The binary optical phase modulation signal being an output from the optical phase modulation unit 5143 and the binary optical phase modulation signal being an output from the optical phase modulation unit 5145 and on which the phase shift of $\pi/2$ is performed are multiplexed by the optical multiplexing unit 5142. In this way, a quaternary optical phase modulation signal of NRZ is output from the optical multiplexing unit 5142.

An example for a QPSK signal is illustrated, but the example is also applicable to reception of an optical signal of M-PSK, M-QAM, and M-APSK in which M is equal to or more than a quaternary.

Figure 29:
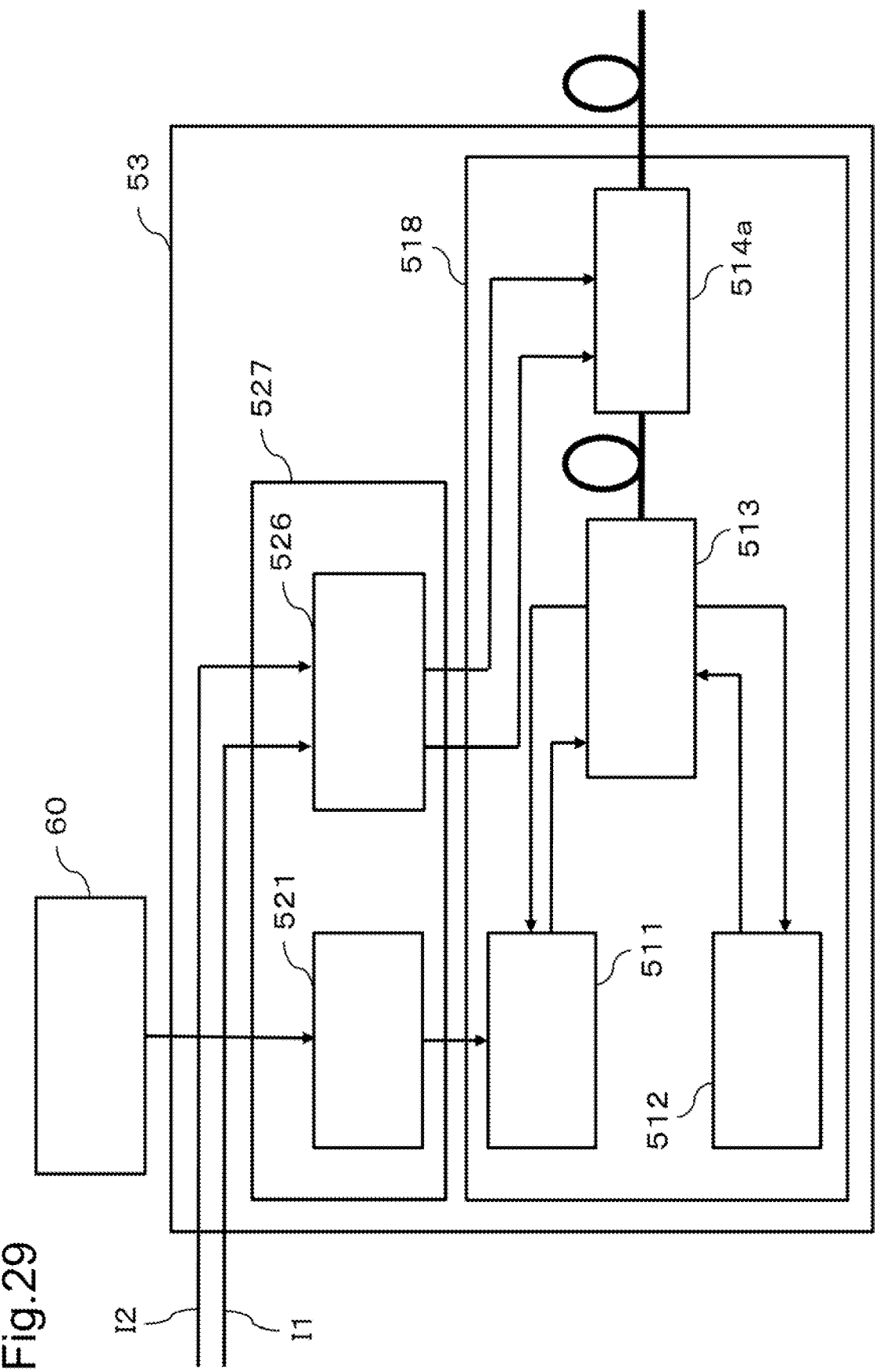
FIG. 29 is a configuration diagram of an optical transmitter that constitutes an optical space communication system according to a third modification example of the third example embodiment, and outputs an optical phase modulation signal being a QPSK signal of NRZ of single polarization.

An optical transmitter constituting an optical space communication system according to a third modification example of the third example embodiment of the present invention will be described. FIG. 29 is a configuration diagram of the optical transmitter that constitutes the optical space communication system according to the third modification example of the third example embodiment of the present invention, and outputs an optical phase modulation signal being a QPSK signal of NRZ of single polarization. An optical transmitter 53 includes an optical transmission unit 518 and a digital signal processing unit 527. Further, a control device 60 inputs, to the optical transmitter 53, satellite orbit information, a Doppler frequency, or a laser drive current value.

The optical transmission unit 518 according to the present modification example includes a laser drive current control unit 511, a laser temperature control unit 512, a transmission laser unit 513, and an optical IQ modulation unit 514a. Further, the digital signal processing unit 527 according to the present modification example includes a Doppler frequency control unit 521 and a signal generation unit 526.

Satellite orbit information, a Doppler frequency, or a laser drive current value from the control device 60 is input to the optical transmitter 53. The satellite orbit information, the Doppler frequency, or the laser drive current value from the control device 60 is input to the digital signal processing unit 527, and the satellite orbit information, the Doppler frequency, or the laser drive current value input to the digital signal processing unit 527 is input to the Doppler frequency control unit 521.

The Doppler frequency control unit 521 inputs the laser drive current value to an optical transmission unit 510, and the laser drive current value input to the optical transmission unit 510 is set in the laser drive current control unit 511. The laser drive current control unit 511 sets the laser drive current value in the transmission laser unit 513, and causes laser light from the transmission laser unit 513 to be output. On the other hand, the laser temperature control unit 512 controls a temperature of the transmission laser unit 513 to be fixed.

Input data I1 and I2 are input to the optical transmitter 53. The input data I1 and I2 are input to the digital signal processing unit 527, and the input data I1 and I2 input to the digital signal processing unit 527 are input to the signal generation unit 526. The signal generation unit 526 generates two input signals according to the input data I1 and I2. The two input signals are input to the optical transmission unit 510, and the two input signals input to the optical transmission unit 510 are input to the optical phase modulation unit 514. The optical IQ modulation unit 514a performs modulation on the laser light output from the transmission laser unit 513, based on the two input signals from the signal generation unit 526. A QPSK signal of NRZ is output from the optical IQ modulation unit 514a.

An example for a QPSK signal is illustrated, but the example is also applicable to reception of an optical signal of M-PSK, M-QAM, and M-APSK in which M is equal to or more than a quaternary.

Figure 30:
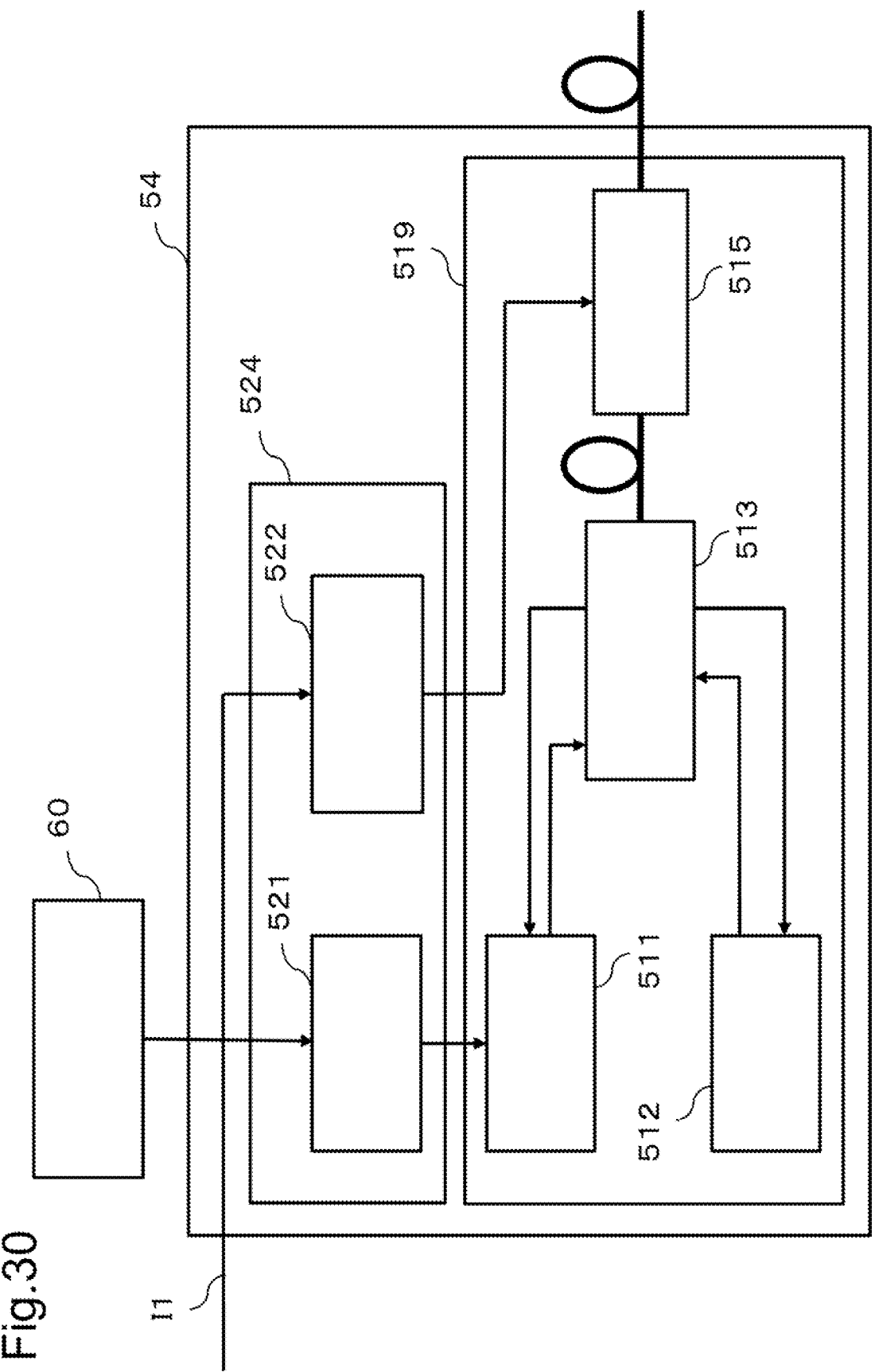
FIG. 30 is a configuration diagram of an optical transmitter that constitutes an optical space communication system according to a fourth modification example of the third example embodiment, and outputs an intensity modulation signal of NRZ or RZ of single polarization.

An optical transmitter constituting an optical space communication system according to a fourth modification example of the third example embodiment of the present invention will be described. FIG. 30 is a configuration diagram of the optical transmitter that constitutes the optical space communication system according to the fourth modification example of the third example embodiment, and outputs an intensity modulation signal of NRZ or RZ of single polarization. An optical transmitter 54 includes an optical transmission unit 519 and a digital signal processing unit 524. Further, a control device 60 inputs, to the optical transmitter 54, satellite orbit information, a Doppler frequency, or a laser drive current value.

The optical transmission unit 519 according to the present modification example includes a laser drive current control unit 511, a laser temperature control unit 512, a transmission laser unit 513, and an optical intensity modulation unit 515.

Further, the digital signal processing unit 524 according to the present modification example includes a Doppler frequency control unit 521 and a signal generation unit 522.

Satellite orbit information, a Doppler frequency, or a laser drive current value from the control device 60 is input to the optical transmitter 54. The satellite orbit information, the Doppler frequency, or the laser drive current value from the control device 60 is input to a digital signal processing unit 520, and the satellite orbit information, the Doppler frequency, or the laser drive current value input to the digital signal processing unit 520 is input to the Doppler frequency control unit 521. The Doppler frequency control unit 521 inputs the laser drive current value to an optical transmission unit 510, and the laser drive current value input to the optical transmission unit 510 is set in the laser drive current control unit 511. The laser drive current control unit 511 sets the laser drive current value in the transmission laser unit 513, and causes laser light to be output from the transmission laser unit 513. On the other hand, the laser temperature control unit 512 controls a temperature of the transmission laser unit 513 to be fixed.

Input data I1 are input to the optical transmitter 54. The input data I1 are input to the digital signal processing unit 524, and the input data I1 input to the digital signal processing unit 524 are input to the signal generation unit 522. The signal generation unit 522 generates an input signal according to the input data I1. The input signal is input to the optical transmission unit 519, and the input signal input to the optical transmission unit 519 is input to the optical intensity modulation unit 515. The optical intensity modulation unit 515 performs modulation on the laser light output from the transmission laser unit 513, based on the input signal from the signal generation unit 522. An optical intensity modulation signal of NRZ is output from the optical intensity modulation unit 515.

Figure 31:
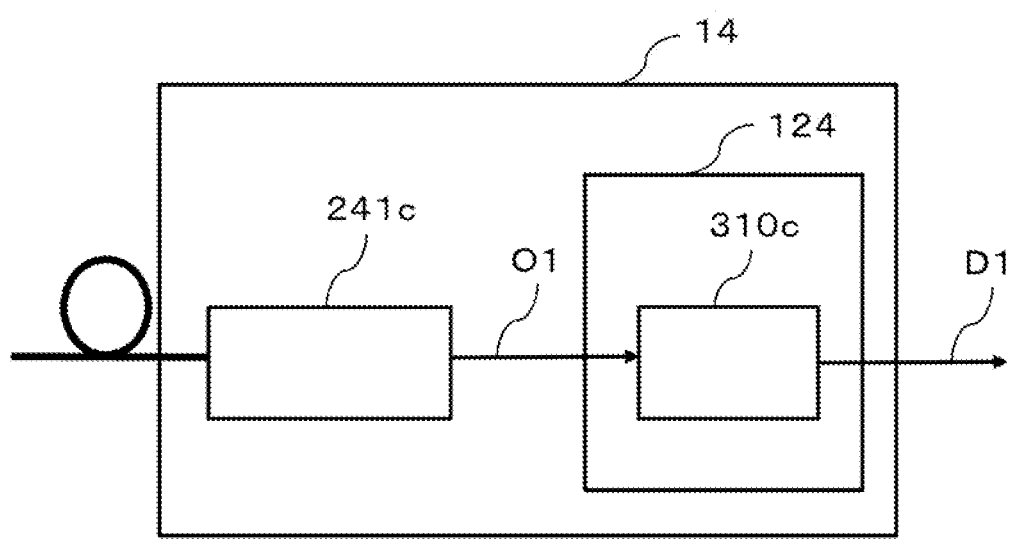
FIG. 31 is a configuration diagram of an optical receiver that receives and demodulates an intensity modulation signal of NRZ or RZ of single polarization.

FIG. 31 is a configuration diagram of one example of an optical receiver that receives and demodulates an optical intensity modulation signal of NRZ of single polarization. An optical receiver 14 includes a wide-band balanced optical detector 241c, and a digital signal processing unit 124 including a data recovery unit 310c. The wide-band balanced optical detector 241c outputs a main signal O1. The main signal O1 input to the digital signal processing unit 124 is input to the data recovery unit 310c. The data recovery unit 310c recovers and outputs output data D1, based on the main signal O1. The optical receiver 14 illustrated in FIG. 31 receives an optical intensity modulation signal of NRZ or RZ of single polarization, and recovers data.

Figure 32:
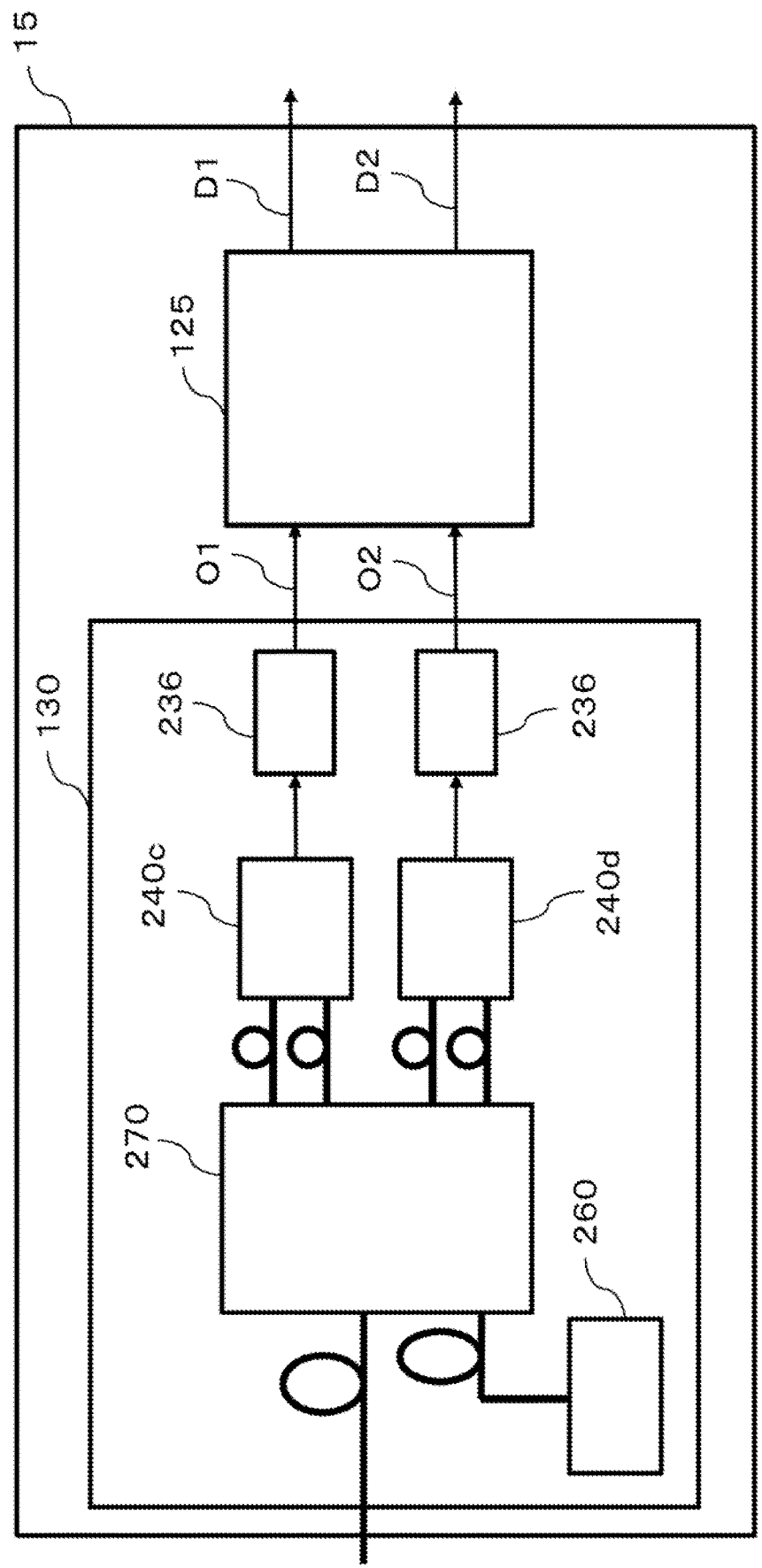
FIG. 32 is a configuration diagram of an optical receiver of a digital coherent optical communication method that receives an optical signal of single polarization.

A binary phase modulation signal and an optical signal including M-PSK, M-QAM, and M-APSK in which M is equal to or more than a quaternary, being output from the optical transmitter 50 illustrated above, can also be received by an optical receiver 15 of a digital coherent optical communication method. FIG. 32 is a configuration diagram of an optical receiver of a digital coherent optical communication method of single polarization. As illustrated in FIG. 32, the optical receiver 15 includes a coherent optical detection unit 130 and a digital signal processing unit 125. The coherent optical detection unit 130 includes a local light emission source 260, an optical frequency mixer 270, a balanced optical detector 240c, and analog-digital converters 236. The optical frequency mixer 270 causes a binary phase modulation signal to interfere with laser light (local emission light) from the local light emission source 260, and then performs a one-bit delay on one of two optical signals split into two and causes the optical signals to interfere with each other, and outputs the two optical signals to each of the balanced optical detectors 240c and 240d. The balanced optical detector 240c converts the two optical signals output from the optical frequency mixer 270 into electric signals, converts the electric signals into a main signal O1, and outputs the main signal O1 to the analog-digital converter 236. The balanced optical detector 240d converts the two optical signals output from the optical frequency mixer 270 into electric signals, converts the electric signals into a main signal O2, and outputs the main signal O2 to the analog-digital converter 236. The analog-digital converters 236 convert the main signals O1 and O2 output from the balanced optical detectors 240c and 240d into digital signals, and output the digital signals. The digital signal processing unit 125 recovers and outputs output data D1 and D2, based on the input main signals O1 and O2.

Note that, even when a polarization multiplexing configuration is applied to the optical transmitter 50, a binary phase modulation signal and an optical signal including M-PSK, M-QAM, and M-APSK in which M is equal to or more than a quaternary can be received by applying the optical receiver 10 of the digital coherent optical communication method illustrated in FIG. 32 for polarization multiplexing.

The optical space communication system according to the third example embodiment of the present invention can also be applied to a wavelength multiplexing configuration. The optical space communication system can be applied to a wavelength multiplexing configuration by multiplexing, in an optical multiplexing unit, N optical signals having different wavelengths being transmitted from N (N is two or more) optical transmitters 50, setting the optical signals as a wavelength multiplexing optical signal, demultiplexing the wavelength multiplexing optical signal in an optical demultiplexing unit, setting the wavelength multiplexing optical signal as N optical signals having different wavelengths, and receiving the N optical signals having different wavelengths by N optical receivers 10.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims. This application is based upon and claims the benefit of priority from Japanese patent application No. 2018-223133, filed on Nov. 29, 2018, the disclosure of which is incorporated herein in its entirety by reference.

<Supplementary Note>

A part or the whole of the above-described example embodiments may also be described as in supplementary notes below. An outline of the optical receiver and the like according to the present invention will be described below. However, the present invention is not limited to a configuration below.

(Supplementary Note 1)

An optical receiver that receives an optical phase modulation signal, the optical receiver including:

a differential light detection unit including an optical delay interferometer that outputs a first optical signal and a second optical signal interfering with each other by controlling, to one bit, a delay between two optical signals acquired by splitting the optical phase modulation signal, a first optical detector that performs differential light detection on the first optical signal and the second optical signal, and outputs a first main signal, and a peak signal detection unit that outputs a peak signal indicating intensity of differential light of the first optical signal and the second optical signal; and a digital signal processing unit including a level fluctuation frequency suppression unit that suppresses a level fluctuation frequency component of the peak signal, an optical delay interference control unit that generates, based on a peak signal having the level fluctuation frequency component being suppressed, an optical delay interference control signal on which overdrive amplification is performed, and applies the generated optical delay interference control signal to the optical delay interferometer, and a data recovery unit that recovers output data, based on the first main signal from the optical detector.

(Supplementary Note 2)

The optical receiver according to supplementary note 1, further including an overdrive coefficient setting unit that sets a pulse width and an overdrive amplification rate of overdrive amplification in the optical delay interference control signal.

(Supplementary Note 3)

The optical receiver according to supplementary note 2, further including:

a signal branching unit that performs signal branching of a peak signal having the level fluctuation frequency component being suppressed; and an overdrive amplification rate adjustment unit that adjusts the overdrive amplification rate, based on a convergence time of a peak signal being split by the signal branching unit and having the level fluctuation frequency component being suppressed.

(Supplementary Note 4)

The optical receiver according to any of supplementary notes 1 to 3, wherein the peak signal detection unit includes an optical detector including a photoelectric converter that outputs a first electric signal and a second electric signal being acquired by performing photoelectric conversion on the first optical signal and the second optical signal, a differential detection unit that outputs a differential signal of the first electric signal and a second electric signal, and a signal amplification unit that amplifies the differential signal, and outputs the peak signal, and a gain setting unit that sets, in the signal amplification unit, a gain value at which the peak signal is output in a linear region with respect to optical input power of the optical phase modulation signal within a range of the optical input power.

(Supplementary Note 5)

The optical receiver according to any of supplementary notes 1 to 3, wherein the peak signal detection unit includes an optical detector including a photoelectric converter that outputs a first electric signal and a second electric signal being acquired by performing photoelectric conversion on the first optical signal and the second optical signal, and a differential detection unit that outputs, as the peak signal, a differential signal of the first electric signal and a second electric signal.

(Supplementary Note 6)

The optical receiver according to any of supplementary notes 1 to 3, wherein the peak signal detection unit includes an optical detector including a photoelectric converter that outputs a first electric signal and a second electric signal being acquired by performing photoelectric conversion on the first optical signal and the second optical signal, a differential detection unit that performs differential detection on the first electric signal and a second electric signal, and outputs a second main signal, and a signal amplification unit that amplifies the second main signal, and outputs the peak signal, based on the second main signal, and a gain setting unit that sets, in the signal amplification unit, a gain value at which the signal amplification unit operates in a linear region in which an output linearly changes with respect to optical input power of the optical phase modulation signal within a range of the optical input power.

(Supplementary Note 7)

The optical receiver according to any of supplementary notes 1 to 3, wherein
the peak signal detection unit includes
an optical detector including
a photoelectric converter that outputs a first electric signal and a second electric signal being acquired by performing photoelectric conversion on the first optical signal and the second optical signal,
a differential detection unit that performs differential detection on the first electric signal and the second electric signal, outputs a second main signal, and outputs, as the peak signal, a differential signal of the first electric signal and a second electric signal, and
a signal amplification unit that amplifies the second main signal, and
a gain setting unit that sets, in the signal amplification unit, a gain value at which the signal amplification unit operates in a linear region in which an output linearly changes with respect to optical input power of the optical phase modulation signal within a range of the optical input power.

(Supplementary Note 8)

The optical receiver according to any of supplementary notes 1 to 7, wherein
the level fluctuation frequency suppression unit includes
a filter band setting unit that sets a filter band in which the level fluctuation frequency component of the peak signal is suppressed, and
a filter processing unit that performs filter processing of the filter band on the peak signal.

(Supplementary Note 9)

The optical receiver according to any of supplementary notes 1 to 7, wherein
the level fluctuation frequency suppression unit includes
a frequency domain conversion unit that converts the peak signal into a frequency spectrum,
a level fluctuation frequency detection unit that detects the level fluctuation frequency component from the frequency spectrum,
a filter band setting unit that sets a filter band in which the level fluctuation frequency component is suppressed, based on the level fluctuation frequency component detected by the level fluctuation frequency detection unit, and
a filter processing unit that performs filter processing on the peak signal in the filter band.

(Supplementary Note 10)

The optical receiver according to any of supplementary notes 1 to 7, wherein
the level fluctuation frequency suppression unit includes
a frequency domain conversion unit that converts the peak signal into the frequency spectrum,
the level fluctuation frequency detection unit that detects the level fluctuation frequency component from the frequency spectrum, and removes the detected level fluctuation frequency component, and
a time domain conversion unit that converts, into a time domain, the frequency spectrum having the level fluctuation frequency component being removed, and outputs the peak signal having the level fluctuation frequency component being suppressed.

(Supplementary Note 11)

The optical receiver according to any of claims 1 to 7, wherein
the level fluctuation frequency suppression unit includes
an equalization number setting unit that sets equalization number information for suppressing the level fluctuation frequency component of the peak signal, and
an equalization processing unit that performs equalization processing, based on the equalization number information.

(Supplementary Note 12)

An optical space communication system, including:
an optical reception device including the optical receiver according to any of supplementary notes 1 to 11; and
an optical transmission device that transmits the optical phase modulation signal, wherein
the optical transmission device includes an optical transmitter that outputs the optical phase modulation signal, and
an acquisition and tracking device that performs acquisition and tracking of the optical phase modulation signal, and
the optical transmitter includes
a digital signal processing unit including
a transmission control unit that outputs a laser drive current value causing an optical wavelength that cancels out a Doppler frequency generated on a satellite orbit,
a signal generation unit that generates an input signal, based on input data, and
a clock generation unit that generates a clock signal, and
an optical transmission unit including
a laser drive current control unit that performs control of a laser drive current, based on the laser drive current value,
a transmission laser unit that outputs laser light by the laser drive current, and
an optical modulation unit that performs modulation on the laser light, based on the input signal and the clock signal, and outputs the optical phase modulation signal.

(Supplementary Note 13)

The optical space communication system according to supplementary note 12, further including
a filter processing unit that performs filter processing on the laser drive current value, wherein
the laser drive current control unit performs control of a laser drive current, based on a laser drive current value that becomes smooth by the filter processing.

(Supplementary Note 14)

The optical space communication system according to supplementary note 12 or 13, wherein
the transmission control unit includes
a satellite orbit information setting unit that stores satellite orbit information,
a Doppler frequency calculation unit that calculates the Doppler frequency, based on the satellite orbit information, and
a laser drive current calculation unit that calculates the laser drive current value, based on the Doppler frequency.

INDUSTRIAL APPLICABILITY

The present invention is usable in, for example, an optical space communication system between satellites, an optical space communication system between the ground and a satellite, and an optical space communication system on the ground.

REFERENCE SIGNS LIST 10, 11, 12, 13, 14, 15, 16 Optical receiver
20 Low noise optical amplifier
30a, 30b Optical acquisition and tracking device
40 High output optical amplifier
50, 51, 52, 53, 54 Optical transmitter
60, 60a, 60b Control device
70 Optical space communication-optical transmission device
80 Optical space communication-optical reception device
100 Optical space communication system
110, 111 Differential light detection unit
120, 121, 122, 123, 124, 125, 126 Digital signal processing unit
130 Coherent optical detection unit
210 Optical delay interferometer
210a, 210b Optical delay interferometer
211 Optical delay element
212 Optical phase adjustment unit
213 Temperature adjustment element
214 Temperature monitor element
220a, 220b, 220c, 220d, 220e Optical branching unit
230, 230a, 230b, 230c, 230d, 230e Peak signal detection unit
231, 231a Balanced optical detector
232a, 232b Photoelectric converter
233 Differential detection unit
234 Signal amplification unit
235 Gain setting unit
236 Analog-digital converter
237 Terminal unit
240, 240a, 240b Wide-band balanced optical detector
240c, 240d Balanced optical detector
241, 241a, 241c Wide-band balanced optical detector
242a, 242b Wide-band photoelectric converter
243, 243a Wide-band differential detection unit
244 Wide-band signal amplification unit
250, 250a, 250b Temperature control unit
260 Local light emission source
270 Optical frequency mixer
310, 310a, 310b, 310c Data recovery unit
320, 320a, 320b, 320c, 320d, 320e Level fluctuation frequency suppression unit
321, 321a Filter band setting unit
322 Filter processing unit
323 Frequency domain conversion unit
324 Level fluctuation frequency detection unit
325 Time domain conversion unit
326 Equalization number setting unit
327 Equalization processing unit
330, 330a, 333, 333a, 334 Optical delay interference control unit
331 Control signal generation unit
332 Digital-analog converter
340, 340a, 341, 341a Overdrive coefficient setting unit
350, 350a, 350b Signal branching unit
360, 360a, 360b Overdrive amplification rate adjustment unit
510 Optical transmission unit
511 Laser drive current control unit
512 Laser temperature control unit
513 Transmission laser unit
514 Optical phase modulation unit
514a Optical IQ modulation unit
515, 515a Optical intensity modulation unit
516, 517, 518, 519 Optical transmission unit
520 Digital signal processing unit
521, 521a Doppler frequency control unit
522 Signal generation unit
523 Clock generation unit
524, 525, 527 Digital signal processing unit
526 Signal generation unit
610 Satellite orbit information setting unit
620 Doppler frequency calculation unit
630 Laser drive current calculation unit
5141 Optical branching unit
5142 Optical multiplexing unit
5143, 5144 Optical phase modulation unit
5145 Optical phase adjustment unit
5211 Laser drive current setting unit
5212 Filter processing unit
5213 Filter band setting unit

What is claimed is:

1. An optical receiver that receives an optical phase modulation signal, the optical receiver comprising:
a differential light detector configured to include
an optical delay interference portion configured to output a first optical signal and a second optical signal interfering with each other by controlling, to one bit, a delay between two optical signals acquired by splitting the optical phase modulation signal,
a first optical detector configured to perform differential light detection on the first optical signal and the second optical signal, and output a first main signal, and
a peak signal detector configured to output a peak signal indicating intensity of differential light of the first optical signal and the second optical signal; and
a digital signal processor configured to include
a level fluctuation frequency suppressor configured to suppress a level fluctuation frequency component of the peak signal,
an optical delay interference controller configured to generate, based on a peak signal having the level fluctuation frequency component being suppressed, an optical delay interference control signal on which overdrive amplification is performed, and apply the generated optical delay interference control signal to the optical delay interference portion, and
a data recovery portion configured to recover output data, based on the first main signal from the optical detector.

2. The optical receiver according to claim 1, further comprising
an overdrive coefficient setting portion configured to set a pulse width and an overdrive amplification rate of overdrive amplification in the optical delay interference control signal.

3. The optical receiver according to claim 2, further comprising:
a signal branch portion configured to perform signal branching of a peak signal having the level fluctuation frequency component being suppressed; and
a overdrive amplification rate adjuster configured to adjust the overdrive amplification rate, based on a convergence time of a peak signal being split by the signal branch portion and having the level fluctuation frequency component being suppressed.

4. The optical receiver according to claim 1, wherein the peak signal detector includes
- an optical detector configured to include
  - a photoelectric converter configured to output a first electric signal and a second electric signal being acquired by performing photoelectric conversion on the first optical signal and the second optical signal,
  - a differential detector configured to output a differential signal of the first electric signal and a second electric signal, and
  - a signal amplifier configured to amplify the differential signal, and output the peak signal, and
- a gain setting portion configured to, in the signal amplifier, a gain value at which the peak signal is output in a linear region with respect to optical input power of the optical phase modulation signal within a range of the optical input power.

5. The optical receiver according to claim 1, wherein the peak signal detector includes
- an optical detector configured to include
  - a photoelectric converter configured to output a first electric signal and a second electric signal being acquired by performing photoelectric conversion on the first optical signal and the second optical signal, and
  - a differential detector configured to output, as the peak signal, a differential signal of the first electric signal and a second electric signal.

6. The optical receiver according to claim 1, wherein the peak signal detector includes
- an optical detector configured to include
  - a photoelectric converter configured to output a first electric signal and a second electric signal being acquired by performing photoelectric conversion on the first optical signal and the second optical signal,
  - a differential detector configured to perform differential detection on the first electric signal and a second electric signal, and output a second main signal, and
  - a signal amplifier configured to amplify the second main signal, and output the peak signal, based on the second main signal, and
- a gain set portion configured to set, in the signal amplifier, a gain value at which the signal amplifier operates in a linear region in which an output linearly changes with respect to optical input power of the optical phase modulation signal within a range of the optical input power.

7. The optical receiver according to claim 1, wherein the peak signal detector includes
- an optical detector configured to include
  - a photoelectric converter configured to output a first electric signal and a second electric signal being acquired by performing photoelectric conversion on the first optical signal and the second optical signal,
  - a differential detector configured to perform differential detection on the first electric signal and the second electric signal, output a second main signal, and output, as the peak signal, a differential signal of the first electric signal and a second electric signal, and
  - a signal amplifier configured to amplify the second main signal, and
- a gain set portion configured to set, in the signal amplifier, a gain value at which the signal amplifier operates in a linear region in which an output linearly changes with respect to optical input power of the optical phase modulation signal within a range of the optical input power.

8. The optical receiver according to claim 1, wherein the level fluctuation frequency suppressor includes
- a filter band set portion configured to set a filter band in which the level fluctuation frequency component of the peak signal is suppressed, and
- a filter processor configured to perform filter processing of the filter band on the peak signal.

9. The optical receiver according to claim 1, wherein the level fluctuation frequency suppressor includes
- a frequency domain converter configured to convert the peak signal into a frequency spectrum,
- a level fluctuation frequency detector configured to detect the level fluctuation frequency component from the frequency spectrum,
- a filter band set portion configured to set a filter band in which the level fluctuation frequency component is suppressed, based on the level fluctuation frequency component detected by the level fluctuation frequency detector, and
- a filter processor configured to perform filter processing on the peak signal in the filter band.

10. The optical receiver according to claim 1, wherein the level fluctuation frequency suppressor includes
- a frequency domain converter configured to convert the peak signal into the frequency spectrum,
- the level fluctuation frequency detector configured to detect detection the level fluctuation frequency component from the frequency spectrum, and remove the detected level fluctuation frequency component, and
- a time domain converter configured to convert, into a time domain, the frequency spectrum having the level fluctuation frequency component being removed, and output the peak signal having the level fluctuation frequency component being suppressed.

11. The optical receiver according to claim 1, wherein the level fluctuation frequency suppressor includes
- an equalization number set portion configured to set equalization number information for suppressing the level fluctuation frequency component of the peak signal, and
- an equalization processor configured to perform equalization processing, based on the equalization number information.

12. An optical space communication system, comprising:
an optical reception device including the optical receiver according to claim 1; and
an optical transmission device that transmits the optical phase modulation signal, wherein
the optical transmission device includes an optical transmitter that outputs the optical phase modulation signal, and an acquisition and tracking device that performs acquisition and tracking of the optical phase modulation signal, and
the optical transmitter includes
- a digital signal processor configured to include
  - a transmission controller configured to output a laser drive current value causing an optical wavelength that cancels out a Doppler frequency generated on a satellite orbit,
  - a signal generator configured to generate an input signal, based on input data, and a clock generator configured to generate a clock signal, and an optical transmitter configured to include
a laser drive current controller configured to perform control of a laser drive current, based on the laser drive current value,
a transmission laser configured to output laser light by the laser drive current, and
an optical modulator configured to perform modulation on the laser light, based on the input signal and the clock signal, and output the optical phase modulation signal.

13. The optical space communication system according to claim 12, further comprising
a filter processor configured to perform filter processing on the laser drive current value, wherein
the laser drive current controller performs control of a laser drive current, based on a laser drive current value that becomes smooth by the filter processing.

14. The optical space communication system according to claim 12, wherein
the transmission controller includes
a satellite orbit information set portion configured to store satellite orbit information,
a Doppler frequency calculator configured to calculate the Doppler frequency, based on the satellite orbit information, and
a laser drive current calculator configured to calculate the laser drive current value, based on the Doppler frequency.

* * * * *